US012632959B2

(12) United States Patent
Uno et al.

(10) Patent No.: US 12,632,959 B2
(45) Date of Patent: May 19, 2026

(54) IMAGE PROCESSING APPARATUS, METHOD FOR CONTROLLING SAME, AND STORAGE MEDIUM

(71) Applicant: CANON KABUSHIKI KAISHA, Tokyo (JP)

(72) Inventors: Yukiko Uno, Kanagawa (JP); Tomoya Asanuma, Kanagawa (JP); Hiroto Oka, Kanagawa (JP); Taketsugu Yamashita, Tokyo (JP); Yuuya Miyake, Kanagawa (JP); Tokichi Minami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 18/314,032

(22) Filed: May 8, 2023

(65) Prior Publication Data

US 2023/0274431 A1     Aug. 31, 2023

Related U.S. Application Data

(63) Continuation of application No. PCT/JP2021/041064, filed on Nov. 9, 2021.

(30) Foreign Application Priority Data

Nov. 13, 2020     (JP) ................................. 2020-189503
Aug. 13, 2021     (JP) ................................. 2021-132009

(51) Int. Cl.
| | |
|---|---|
| *G06K 9/00* | (2022.01) |
| *G06T 7/00* | (2017.01) |
| *G06T 7/55* | (2017.01) |
| *G06T 7/73* | (2017.01) |

(52) U.S. Cl.
CPC .............. *G06T 7/0012* (2013.01); *G06T 7/55* (2017.01); *G06T 7/75* (2017.01); *G06T 2207/30036* (2013.01)

(58) Field of Classification Search
CPC .................................... G06K 9/00; A61B 1/24
USPC ....... 382/100, 103, 106, 128, 132, 154, 156, 382/168, 173, 181, 189, 199, 209, 224, 382/219, 254, 285–291, 305, 321; 433/24, 215
See application file for complete search history.

(56) References Cited

U.S. PATENT DOCUMENTS

| | | | |
|---|---|---|---|
| 2020/0297187 A1* | 9/2020 | Wakazome | .............. A61B 1/24 |
| 2021/0212806 A1* | 7/2021 | Sorimoto | ........... A61B 1/00101 |
| 2021/0264611 A1* | 8/2021 | Xue | ..................... G06T 7/0012 |

(Continued)

FOREIGN PATENT DOCUMENTS

| | | |
|---|---|---|
| JP | 2010051349 A | 3/2010 |
| JP | 2019155027 A | 9/2019 |

(Continued)

*Primary Examiner* — Seyed H Azarian
(74) *Attorney, Agent, or Firm* — Canon U.S.A., Inc., IP Division

(57) ABSTRACT

An image processing apparatus includes a first reading unit configured to read a first image to read a visible light image of an occlusal surface in a mouth cavity, a second reading unit configured to read a second image to read a visible light image in a state where teeth are occluded, a determination unit configured to determine dentition and states of the respective teeth based on the first image, the second image, and a trained model, and an output unit configured to output a result of a determination made by the determination unit.

9 Claims, 71 Drawing Sheets

(56)         References Cited

U.S. PATENT DOCUMENTS

| | | | |
|---|---|---|---|
| 2022/0215547 A1* | 7/2022 | Salah | A61B 5/0022 |
| 2024/0029265 A1* | 1/2024 | Brown | G06T 7/0012 |
| 2024/0144598 A1* | 5/2024 | Ripoche | G06T 5/70 |
| 2024/0325115 A1* | 10/2024 | Farkash | G16H 50/50 |
| 2025/0049544 A1* | 2/2025 | Sabina | A61B 5/0086 |

FOREIGN PATENT DOCUMENTS

| | | | |
|---|---|---|---|
| JP | 2020054646 A | 4/2020 | |
| JP | 2020516335 A | 6/2020 | |
| JP | 2020179173 A | 11/2020 | |
| JP | 2021137127 A | 9/2021 | |

* cited by examiner

*300*

HARDWARE CONFIGURATION OF
IMAGE PROCESSING APPARATUS

*301*        *302*        *303*        *304*

| CPU | ROM | RAM | DISPLAY |

*308*

*305*        *306*        *307*

| HDD | INPUT DEVICE | I/F |

*350*

SOFTWARE CONFIGURATION OF
IMAGE PROCESSING APPARATUS

*352*                          *351*

| DATA STORAGE AND ACQUISITION UNIT | COMMUNICATION UNIT |

*353*              *354*                    *355*

| TRAINING UNIT | INFERENCE UNIT | RESULT DETERMINATION UNIT |

START

S401

READ ORAL IMAGES

S402

READ MODELS FOR INFERRING
TOOTH POSITIONS AND
DENTAL FORMULA NUMBERS

S403

INFER TOOTH POSITIONS AND
DENTAL FORMULA NUMBERS

S404

READ MODELS FOR INFERRING
TOOTH POSITIONS AND STATES

S405

INFER TOOTH
POSITIONS AND STATES

S406

ASSOCIATE DENTAL FORMULA
NUMBERS WITH TOOTH STATES

S407

OUTPUT ALL COMBINATIONS
OF DENTAL FORMULA
NUMBERS AND STATES

END

FIG.5

| Processing list | Image filename | Imaging plane registration information | State of execution of inference |
|---|---|---|---|
| 1 | IMG_001.jpg | Front view | True |
| 2 | IMG_002.jpg | Right side view | True |
| 3 | IMG_003.jpg | Left side view | False |
| 4 | IMG_004.jpg | Occlusal view (upper jaw) | False |
| 5 | IMG_005.jpg | Occlusal view (lower jaw) | False |

| DETERMINATION PROCESSING LIST (701) | UPPER/LOWER JAW (702) | DENTAL FORMULA NUMBER (703) | OCCLUSAL VIEW (704) | FRONT VIEW (705) | LEFT SIDE VIEW (706) | RIGHT SIDE VIEW (707) | COMPREHENSIVE DETERMINATION (708) |
|---|---|---|---|---|---|---|---|
| 1 | UPPER JAW | LEFT UPPER 1 | HEALTHY | DECAYED/WSD | DECAYED/WSD | -- | DECAYED/WSD |
| 2 | | LEFT UPPER 2 | HEALTHY | WSD | WSD | -- | WSD |
| 3 | | LEFT UPPER 3 | HEALTHY | WSD | WSD | -- | WSD |
| 4 | | LEFT UPPER 4 | HEALTHY | HEALTHY | HEALTHY | -- | HEALTHY |
| 5 | | LEFT UPPER 5 | HEALTHY | HEALTHY | HEALTHY | -- | HEALTHY |
| 6 | | LEFT UPPER 6 | METAL PROSTHESIS | METAL PROSTHESIS | METAL PROSTHESIS | -- | METAL PROSTHESIS |
| 7 | | LEFT UPPER 7 | DECAYED | HEALTHY | HEALTHY | -- | DECAYED |
| 8 | | LEFT UPPER 8 | MISSING | MISSING | MISSING | -- | MISSING |
| 9 | | RIGHT UPPER 1 | HEALTHY | DECAYED/WSD | -- | DECAYED/WSD | DECAYED/WSD |
| 10 | | RIGHT UPPER 2 | HEALTHY | WSD | -- | WSD | WSD |
| 11 | | RIGHT UPPER 3 | HEALTHY | WSD | -- | WSD | WSD |
| 12 | | RIGHT UPPER 4 | HEALTHY | HEALTHY | -- | HEALTHY | HEALTHY |
| 13 | | RIGHT UPPER 5 | HEALTHY | HEALTHY | -- | HEALTHY | HEALTHY |
| 14 | | RIGHT UPPER 6 | FMR | FMR | -- | FMR | FMR |
| 15 | | RIGHT UPPER 7 | MISSING | MISSING | -- | MISSING | MISSING |
| 16 | | RIGHT UPPER 8 | MISSING | MISSING | -- | MISSING | MISSING |
| 17 | LOWER JAW | LEFT LOWER 1 | HEALTHY | WSD | WSD | -- | WSD |
| 18 | | LEFT LOWER 2 | HEALTHY | WSD | WSD | -- | WSD |
| 19 | | LEFT LOWER 3 | HEALTHY | HEALTHY | HEALTHY | -- | HEALTHY |
| 20 | | LEFT LOWER 4 | METAL PROSTHESIS | HEALTHY | HEALTHY | -- | METAL PROSTHESIS |
| 21 | | LEFT LOWER 5 | HEALTHY | HEALTHY | HEALTHY | -- | HEALTHY |
| 22 | | LEFT LOWER 6 | WHITE PROSTHESIS | HEALTHY | HEALTHY | -- | WHITE PROSTHESIS |
| 23 | | LEFT LOWER 7 | MISSING | MISSING | MISSING | -- | MISSING |
| 24 | | LEFT LOWER 8 | MISSING | MISSING | MISSING | -- | MISSING |
| 25 | | RIGHT LOWER 1 | HEALTHY | WSD | -- | WSD | WSD |
| 26 | | RIGHT LOWER 2 | HEALTHY | WSD | -- | WSD | WSD |
| 27 | | RIGHT LOWER 3 | HEALTHY | HEALTHY | -- | HEALTHY | HEALTHY |
| 28 | | RIGHT LOWER 4 | WHITE PROSTHESIS | HEALTHY | -- | HEALTHY | WHITE PROSTHESIS |
| 29 | | RIGHT LOWER 5 | WHITE PROSTHESIS | HEALTHY | -- | HEALTHY | WHITE PROSTHESIS |
| 30 | | RIGHT LOWER 6 | METAL PROSTHESIS | METAL PROSTHESIS | -- | METAL PROSTHESIS | METAL PROSTHESIS |
| 31 | | RIGHT LOWER 7 | METAL PROSTHESIS | HEALTHY | -- | HEALTHY | METAL PROSTHESIS |
| 32 | | RIGHT LOWER 8 | MISSING | MISSING | MISSING | -- | MISSING |

| DETERMINATION PROCESSING LIST _751 | UPPER/ LOWER JAW _752 | DENTAL FORMULA NUMBER _753 | OCCLUSAL VIEW: STATE _754 | OCCLUSAL VIEW: POSITION OF STATE 1 _755 | OCCLUSAL VIEW: POSITION OF STATE 2 _756 | FRONT VIEW: STATE _757 |
|---|---|---|---|---|---|---|
| 1 | UPPER JAW | LEFT UPPER 1 | HEALTHY | --- | --- | DECAYED/WSD |
| 2 | | LEFT UPPER 2 | HEALTHY | --- | --- | WSD |
| 3 | | LEFT UPPER 3 | HEALTHY | --- | --- | WSD |
| 4 | | LEFT UPPER 4 | HEALTHY | --- | --- | HEALTHY |
| 5 | | LEFT UPPER 5 | HEALTHY | --- | --- | HEALTHY |
| 6 | | LEFT UPPER 6 | METAL PROSTHESIS | OCCLUSAL SURFACE | --- | METAL PROSTHESIS |
| 7 | | LEFT UPPER 7 | DECAYED | OCCLUSAL SURFACE | --- | HEALTHY |
| 8 | | LEFT UPPER 8 | MISSING | --- | --- | MISSING |
| 9 | | RIGHT UPPER 1 | HEALTHY | --- | --- | DECAYED/WSD |
| 10 | | RIGHT UPPER 2 | HEALTHY | --- | --- | WSD |
| 11 | | RIGHT UPPER 3 | HEALTHY | --- | --- | WSD |
| 12 | | RIGHT UPPER 4 | HEALTHY | --- | --- | HEALTHY |
| 13 | | RIGHT UPPER 5 | HEALTHY | --- | --- | HEALTHY |
| 14 | | RIGHT UPPER 6 | FMC | --- | --- | FMC |
| 15 | | RIGHT UPPER 7 | MISSING | --- | --- | MISSING |
| 16 | | RIGHT UPPER 8 | MISSING | --- | --- | MISSING |
| 17 | LOWER JAW | LEFT LOWER 1 | HEALTHY | --- | --- | WSD |
| 18 | | LEFT LOWER 2 | HEALTHY | --- | --- | WSD |
| 19 | | LEFT LOWER 3 | HEALTHY | --- | --- | HEALTHY |
| 20 | | LEFT LOWER 4 | METAL PROSTHESIS | OCCLUSAL SURFACE | --- | HEALTHY |
| 21 | | LEFT LOWER 5 | HEALTHY | --- | --- | HEALTHY |
| 22 | | LEFT LOWER 6 | WHITE PROSTHESIS | OCCLUSAL SURFACE | --- | HEALTHY |
| 23 | | LEFT LOWER 7 | MISSING | --- | --- | MISSING |
| 24 | | LEFT LOWER 8 | MISSING | --- | --- | MISSING |
| 25 | | RIGHT LOWER 1 | HEALTHY | --- | --- | WSD |
| 26 | | RIGHT LOWER 2 | HEALTHY | --- | --- | WSD |
| 27 | | RIGHT LOWER 3 | HEALTHY | --- | --- | HEALTHY |
| 28 | | RIGHT LOWER 4 | WHITE PROSTHESIS | OCCLUSAL SURFACE | --- | HEALTHY |
| 29 | | RIGHT LOWER 5 | WHITE PROSTHESIS | OCCLUSAL SURFACE | --- | HEALTHY |
| 30 | | RIGHT LOWER 6 | METAL PROSTHESIS | OCCLUSAL SURFACE | --- | METAL PROSTHESIS |
| 31 | | RIGHT LOWER 7 | METAL PROSTHESIS | OCCLUSAL SURFACE | --- | HEALTHY |
| 32 | | RIGHT LOWER 8 | MISSING | --- | --- | MISSING |

| 758 FRONT VIEW: POSITION OF STATE 1 | 759 FRONT VIEW: POSITION OF STATE 2 | 760 LEFT SIDE VIEW: STATE | 761 LEFT SIDE VIEW: POSITION OF STATE 1 | 762 LEFT SIDE VIEW: POSITION OF STATE 2 | 763 RIGHT SIDE VIEW: STATE |
|---|---|---|---|---|---|
| DISTAL PROXIMAL SURFACE | LABIAL SURFACE | DECAYED/WSD | DISTAL PROXIMAL SURFACE | LABIAL SURFACE | |
| LABIAL SURFACE | -- | WSD | LABIAL SURFACE | -- | -- |
| LABIAL SURFACE | -- | WSD | LABIAL SURFACE | -- | -- |
| -- | -- | HEALTHY | -- | -- | -- |
| BUCCAL SURFACE | -- | HEALTHY | -- | -- | DECAYED/WSD |
| -- | -- | METAL PROSTHESIS | BUCCAL SURFACE | -- | WSD |
| -- | -- | HEALTHY | -- | -- | WSD |
| -- | -- | MISSING | -- | -- | HEALTHY |
| DISTAL PROXIMAL SURFACE | LABIAL SURFACE | -- | -- | -- | HEALTHY |
| LABIAL SURFACE | -- | -- | -- | -- | FMC |
| LABIAL SURFACE | -- | -- | -- | -- | MISSING |
| -- | -- | -- | -- | -- | MISSING |
| -- | -- | -- | -- | -- | -- |
| LABIAL SURFACE | -- | WSD | LABIAL SURFACE | -- | -- |
| LABIAL SURFACE | -- | WSD | LABIAL SURFACE | -- | -- |
| -- | -- | HEALTHY | -- | -- | -- |
| -- | -- | HEALTHY | -- | -- | -- |
| LABIAL SURFACE | -- | HEALTHY | -- | -- | WSD |
| LABIAL SURFACE | -- | HEALTHY | -- | -- | WSD |
| -- | -- | MISSING | -- | -- | HEALTHY |
| BUCCAL SURFACE | -- | MISSING | -- | -- | HEALTHY |
| -- | -- | -- | -- | -- | HEALTHY |
| -- | -- | MISSING | -- | -- | METAL PROSTHESIS |
| -- | -- | -- | -- | -- | HEALTHY |

FIG.7B-3

| RIGHT SIDE VIEW: POSITION OF STATE 1 (764) | RIGHT SIDE VIEW: POSITION OF STATE 2 (765) | COMPREHENSIVE DETERMINATION (766) | COMPREHENSIVE DETERMINATION: POSITION OF STATE 1 (767) | COMPREHENSIVE DETERMINATION: POSITION OF STATE 2 (768) |
|---|---|---|---|---|
| --- | --- | DECAYED/WSD | DISTAL PROXIMAL SURFACE | LABIAL SURFACE |
| --- | --- | WSD | LABIAL SURFACE | --- |
| --- | --- | WSD | LABIAL SURFACE | --- |
| --- | --- | HEALTHY | --- | --- |
| --- | --- | HEALTHY | --- | --- |
| --- | --- | METAL PROSTHESIS | OCCLUSAL SURFACE/BUCCAL SURFACE | --- |
| --- | --- | DECAYED | OCCLUSAL SURFACE | --- |
| --- | --- | MISSING | --- | --- |
| DISTAL PROXIMAL SURFACE | LABIAL SURFACE | DECAYED/WSD | DISTAL PROXIMAL SURFACE | LABIAL SURFACE |
| LABIAL SURFACE | --- | WSD | LABIAL SURFACE | --- |
| LABIAL SURFACE | --- | WSD | LABIAL SURFACE | --- |
| --- | --- | HEALTHY | --- | --- |
| --- | --- | HEALTHY | --- | --- |
| --- | --- | FMC | --- | --- |
| --- | --- | MISSING | --- | --- |
| --- | --- | MISSING | --- | --- |
| --- | --- | WSD | LABIAL SURFACE | --- |
| --- | --- | WSD | LABIAL SURFACE | --- |
| --- | --- | HEALTHY | --- | --- |
| --- | --- | METAL PROSTHESIS | OCCLUSAL SURFACE | --- |
| --- | --- | HEALTHY | --- | --- |
| --- | --- | WHITE PROSTHESIS | OCCLUSAL SURFACE | --- |
| --- | --- | MISSING | --- | --- |
| --- | --- | MISSING | --- | --- |
| LABIAL SURFACE | --- | WSD | LABIAL SURFACE | --- |
| LABIAL SURFACE | --- | WSD | LABIAL SURFACE | --- |
| --- | --- | HEALTHY | --- | --- |
| --- | --- | WHITE PROSTHESIS | OCCLUSAL SURFACE | --- |
| --- | --- | WHITE PROSTHESIS | OCCLUSAL SURFACE | --- |
| BUCCAL SURFACE | --- | METAL PROSTHESIS | OCCLUSAL SURFACE/BUCCAL SURFACE | --- |
| --- | --- | METAL PROSTHESIS | OCCLUSAL SURFACE | --- |
| --- | --- | MISSING | --- | --- |

FIG. 7C-1

| DETERMINATION PROCESSING LIST ~771 | UPPER/LOWER JAW ~772 | DENTAL FORMULA NUMBER ~773 | OCCLUSAL VIEW: OCCLUSAL SURFACE ~774 | OCCLUSAL VIEW: LABIAL (BUCCAL) SURFACE ~775 | OCCLUSAL VIEW: PALATAL (LINGUAL) SURFACE ~776 | OCCLUSAL VIEW: MESIAL PROXIMAL SURFACE ~777 | OCCLUSAL VIEW: DISTAL PROXIMAL SURFACE ~778 |
|---|---|---|---|---|---|---|---|
| 1 | UPPER JAW | LEFT UPPER 1 | HEALTHY | — | HEALTHY | HEALTHY | HEALTHY |
| 2 | | LEFT UPPER 2 | | | | | |
| 3 | | LEFT UPPER 3 | | | | | |
| 4 | | LEFT UPPER 4 | | | | | |
| 5 | | LEFT UPPER 5 | | | | | |
| 6 | | LEFT UPPER 6 | | | | | |
| 7 | | LEFT UPPER 7 | | | | | |
| 8 | | LEFT UPPER 8 | | | | | |
| 9 | | RIGHT UPPER 1 | | | | | |
| 10 | | RIGHT UPPER 2 | | | | | |
| 11 | | RIGHT UPPER 3 | | | | | |
| 12 | | RIGHT UPPER 4 | | | | | |
| 13 | | RIGHT UPPER 5 | | | | | |
| 14 | | RIGHT UPPER 6 | | | | | |
| 15 | | RIGHT UPPER 7 | | | | | |
| 16 | | RIGHT UPPER 8 | | | | | |
| 17 | LOWER JAW | LEFT LOWER 1 | | | | | |
| 18 | | LEFT LOWER 2 | | | | | |
| 19 | | LEFT LOWER 3 | | | | | |
| 20 | | LEFT LOWER 4 | | | | | |
| 21 | | LEFT LOWER 5 | | | | | |
| 22 | | LEFT LOWER 6 | | | | | |
| 23 | | LEFT LOWER 7 | | | | | |
| 24 | | LEFT LOWER 8 | | | | | |
| 25 | | RIGHT LOWER 1 | | | | | |
| 26 | | RIGHT LOWER 2 | | | | | |
| 27 | | RIGHT LOWER 3 | | | | | |
| 28 | | RIGHT LOWER 4 | | | | | |
| 29 | | RIGHT LOWER 5 | | | | | |
| 30 | | RIGHT LOWER 6 | | | | | |
| 31 | | RIGHT LOWER 7 | | | | | |
| 32 | | RIGHT LOWER 8 | | | | | |

| 779 FRONT VIEW: OCCLUSAL SURFACE | 780 FRONT VIEW: LABIAL (BUCCAL) SURFACE | 781 FRONT VIEW: PALATAL (LINGUAL) SURFACE | 782 FRONT VIEW: MESIAL PROXIMAL SURFACE | 783 FRONT VIEW: DISTAL PROXIMAL SURFACE | 784 LEFT SIDE VIEW: OCCLUSAL SURFACE | 785 LEFT SIDE VIEW: LABIAL (BUCCAL) SURFACE | 786 LEFT SIDE VIEW: PALATAL (LINGUAL) SURFACE |
|---|---|---|---|---|---|---|---|
| — | WSD | — | HEALTHY | DECAYED | — | WSD | — |

FIG. 7C-3

| | LEFT SIDE VIEW: MESIAL PROXIMAL SURFACE | LEFT SIDE VIEW: DISTAL PROXIMAL SURFACE | RIGHT SIDE VIEW: OCCLUSAL SURFACE | RIGHT SIDE VIEW: LABIAL (BUCCAL) SURFACE | RIGHT SIDE VIEW: PALATAL (LINGUAL) SURFACE | RIGHT SIDE VIEW: MESIAL PROXIMAL SURFACE | RIGHT SIDE VIEW: DISTAL PROXIMAL SURFACE | COMPREHENSIVE DETERMINATION |
|---|---|---|---|---|---|---|---|---|
| | ~787 | ~788 | ~789 | ~790 | ~791 | ~792 | ~793 | ~794 |
| | HEALTHY | DECAYED | - | - | - | - | - | DECAYED/SD |

FIG. 7C-4

| COMPREHENSIVE DETERMINATION: OCCLUSAL SURFACE ~795 | COMPREHENSIVE DETERMINATION: LABIAL (BUCCAL) SURFACE ~796 | COMPREHENSIVE DETERMINATION: PALATAL (LINGUAL) SURFACE ~797 | COMPREHENSIVE DETERMINATION: MESIAL PROXIMAL SURFACE ~798 | COMPREHENSIVE DETERMINATION: DISTAL PROXIMAL SURFACE ~799 |
|---|---|---|---|---|
| HEALTHY | WSD | HEALTHY | HEALTHY | DECAYED |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG.10

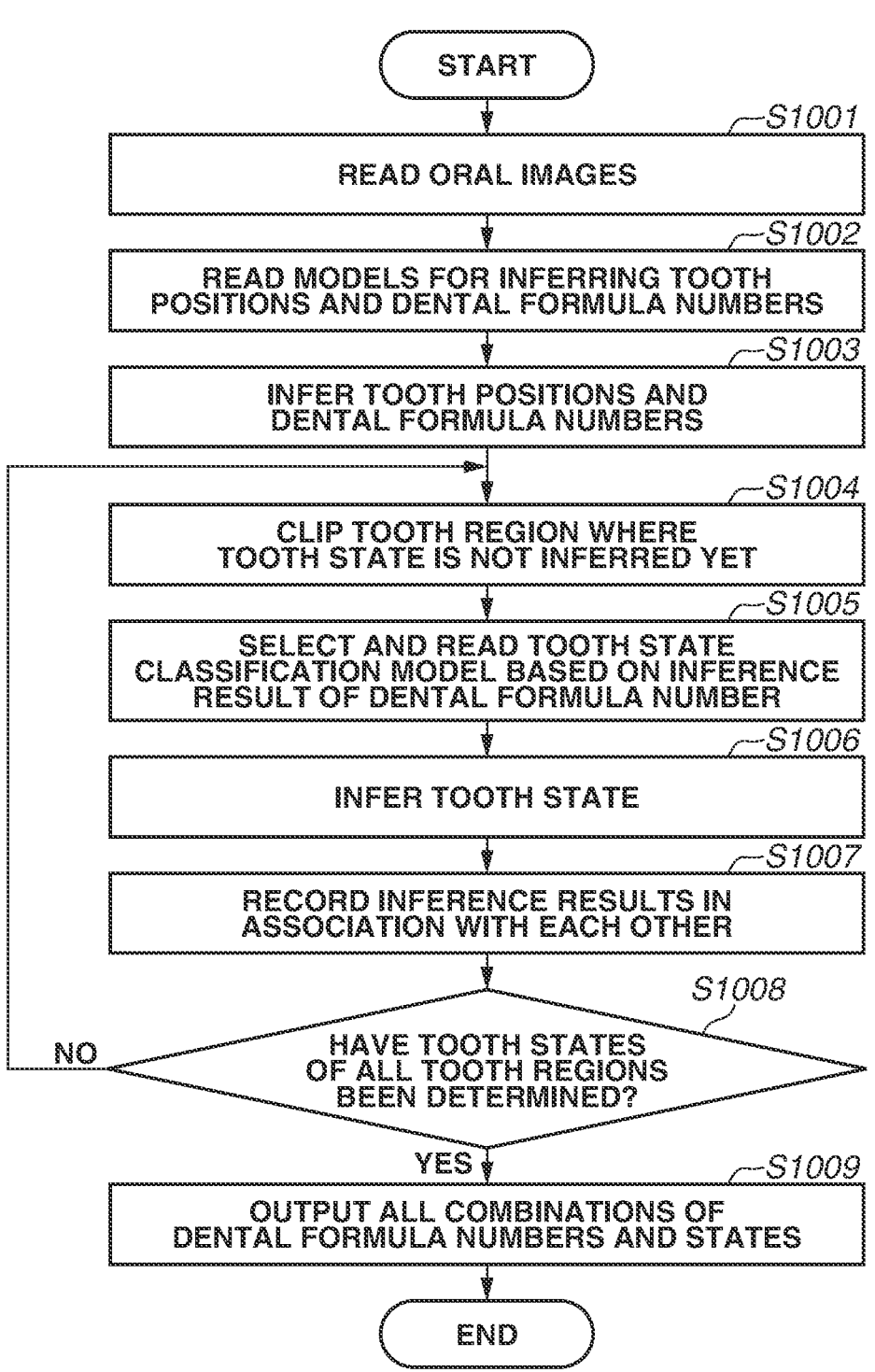

START

S1001
READ ORAL IMAGES

S1002
READ MODELS FOR INFERRING TOOTH
POSITIONS AND DENTAL FORMULA NUMBERS

S1003
INFER TOOTH POSITIONS AND
DENTAL FORMULA NUMBERS

S1004
CLIP TOOTH REGION WHERE
TOOTH STATE IS NOT INFERRED YET

S1005
SELECT AND READ TOOTH STATE
CLASSIFICATION MODEL BASED ON INFERENCE
RESULT OF DENTAL FORMULA NUMBER

S1006
INFER TOOTH STATE

S1007
RECORD INFERENCE RESULTS IN
ASSOCIATION WITH EACH OTHER

S1008
HAVE TOOTH STATES
OF ALL TOOTH REGIONS
BEEN DETERMINED?

NO

YES

S1009
OUTPUT ALL COMBINATIONS OF
DENTAL FORMULA NUMBERS AND STATES

END

EXAMPLE WHERE TOOTH IS INFERRED AT POSITION AWAY FROM DENTAL ARCH

EXAMPLE WHERE LEFT AND RIGHT TOOTH TYPES ARE INCORRECT

FIG.12C

EXAMPLE WHERE SAME TYPE OF TOOTH IS INFERRED PLURALITY OF TIMES

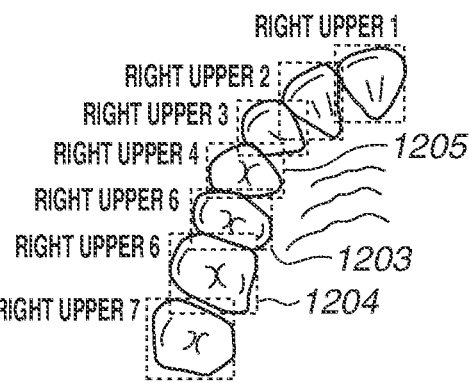

RIGHT UPPER 1

RIGHT UPPER 2
RIGHT UPPER 3
RIGHT UPPER 4 ~ 1205
RIGHT UPPER 6
RIGHT UPPER 6 ~ 1203
~ 1204
RIGHT UPPER 7

FIG.12D

EXAMPLE WHERE DIFFERENT TOOTH
TYPES ARE INFERRED IN SAME REGION

RIGHT UPPER 1
RIGHT UPPER 2
RIGHT UPPER 3
1208 ~ RIGHT UPPER 4
RIGHT UPPER 4
RIGHT UPPER 5
1209 ~ RIGHT UPPER 6
~ 1207

FIG.12E

EXAMPLE WHERE TOOTH
NUMBERS ARE IN WRONG ORDER

LEFT UPPER 1
LEFT UPPER 2
LEFT UPPER 3
LEFT UPPER 4
LEFT UPPER 6 ~ 1210
LEFT UPPER 5 ~ 1211

FIG.18A          FIG.18B
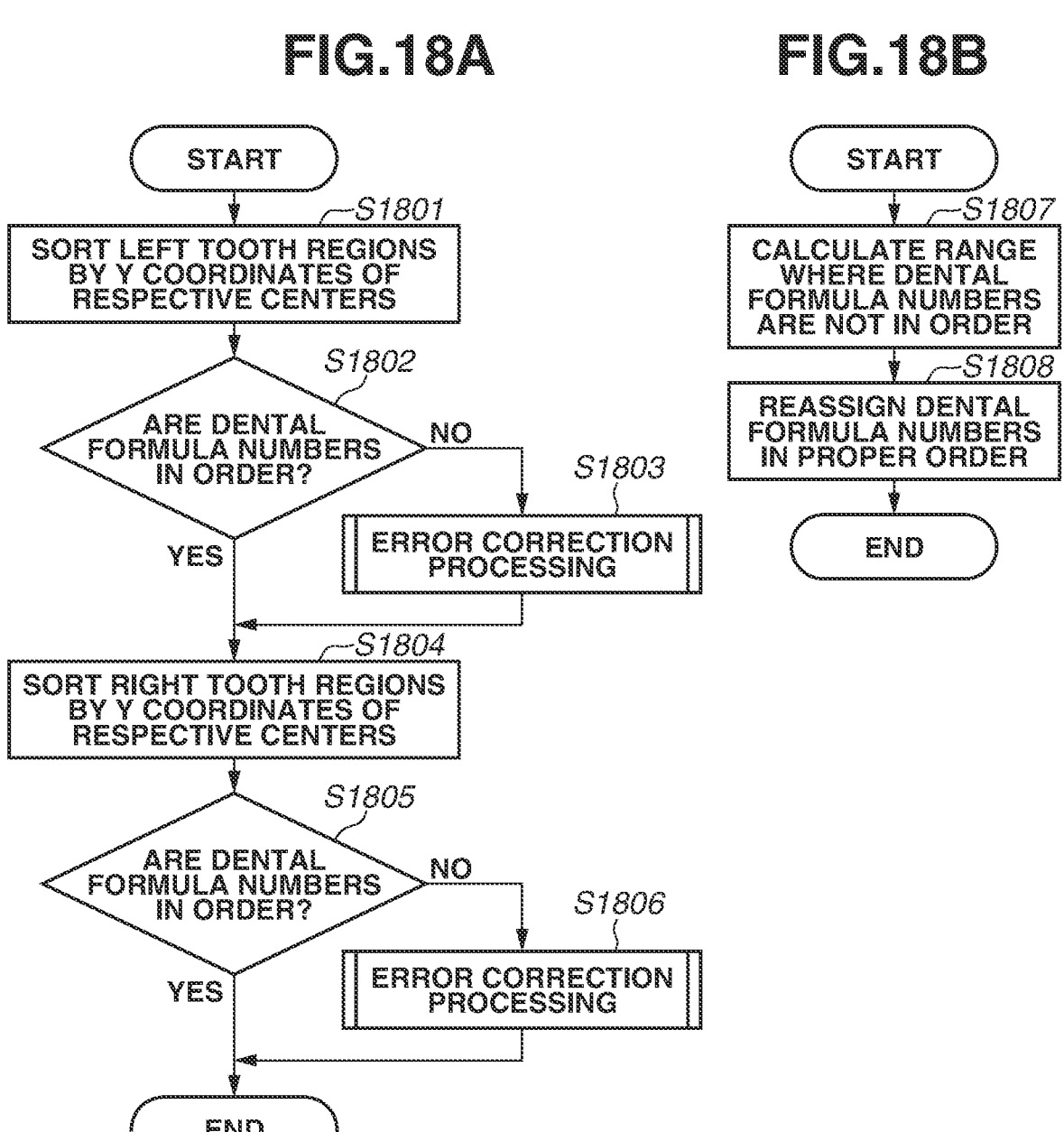

FIG.23

| 2301 | SPACE ID 2302 | CHAIR ID 2303 | TERMINAL ID 2304 | TERMINAL IP ADDRESS 2305 | IMAGING APPARATUS ID 2306 | IMAGING APPARATUS IP ADDRESS 2307 |
|---|---|---|---|---|---|---|
| 1 | A1 | C-A01 | P-A01 | 192.168.11.11 | Camera-101 | 192.168.11.101 |
| 2 | A2 | C-A02 | P-A02 | XXX | Camera-101 | 192.168.11.101 |
| 3 | B1 | C-B01 | P-B01 | 192.168.11.12 | Camera-201 | 192.168.11.102 |
| 4 | B2 | XXX | XXX | XXX | Camera-201 | 192.168.11.102 |
| 5 | B3 | XXX | XXX | XXX | Camera-201 | 192.168.11.102 |

FIG.24
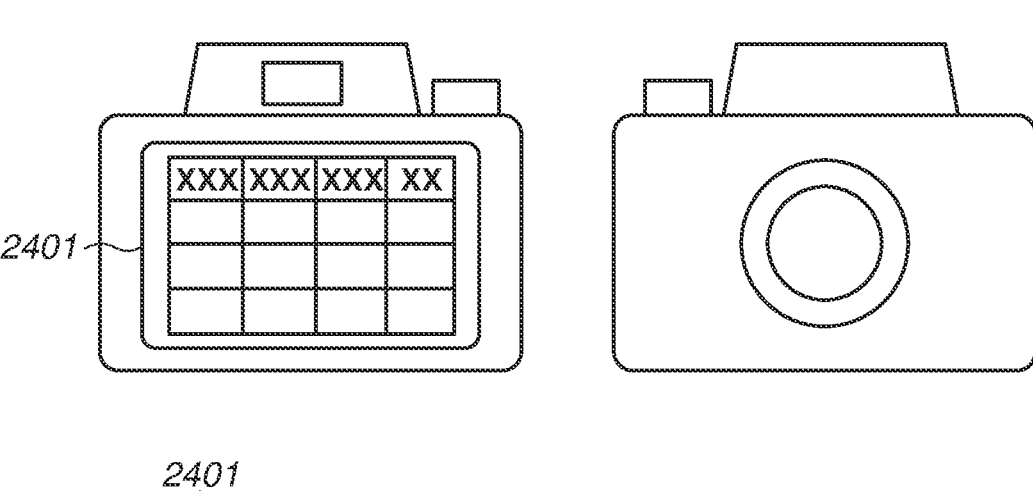
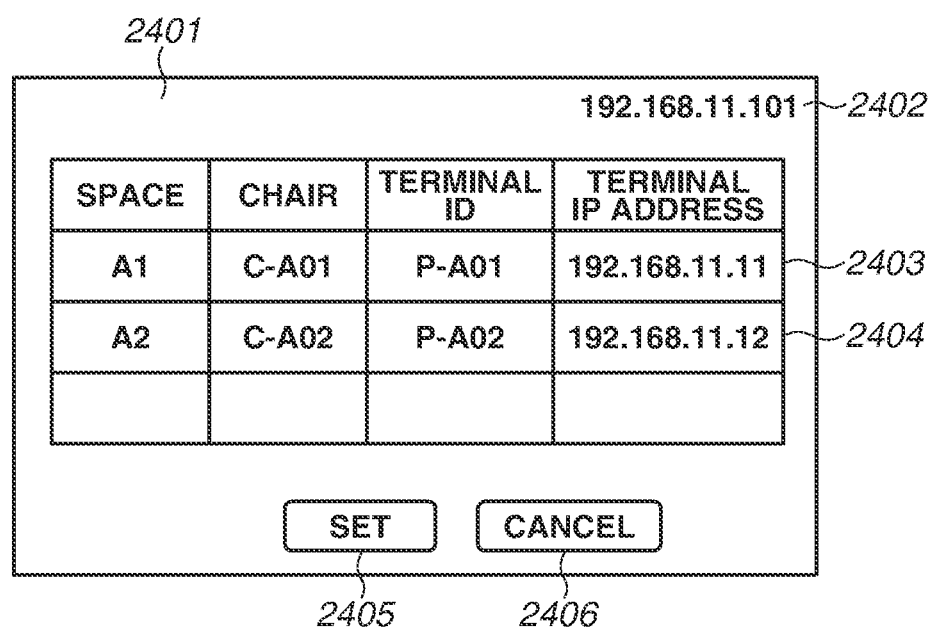

DENTAL DIAGNOSIS

| TOOTH ROW | | | DIAGNOSIS |
|---|---|---|---|
| UPPER JAW | RIGHT | 1 | |
| | | 2 | |
| | | 3 | |
| | | 4 | |
| | | 5 | |
| | | 6 | C1 |
| | | 7 | |
| | | 8 | |
| | LEFT | 1 | |
| | | 2 | |
| | | 3 | |
| | | 4 | |
| | | 5 | |
| | | 6 | |
| | | 7 | |
| | | 8 | |
| LOWER JAW | RIGHT | 1 | |
| | | 2 | |
| | | 3 | |
| | | 4 | |
| | | 5 | |
| | | 6 | |
| | | 7 | FMC |
| | | 8 | MISSING |
| | LEFT | 1 | |
| | | 2 | |
| | | 3 | |
| | | 4 | |
| | | 5 | |
| | | 6 | C2 |
| | | 7 | RESIN |
| | | 8 | |

FIG.33

TRAINING DATA

| DENTAL FORMULA NUMBER | DETECTED TOOTH IMAGE | LABEL |
|---|---|---|
| LEFT LOWER 7 | | C2 |
| RIGHT LOWER 7 | | FMC |

| 3400 | | |
|---|---|---|
| file_name | | IMG_001.jpg | ~3401 |
| image_width | | 5760 |
| image_height | | 3456 |
| object | label | caries |
| | xmin | 4085 |
| | xmax | 4721 |
| | ymin | 1705 |
| | ymax | 2444 |
| | fixed | false |
| object | label | crown |
| | xmin | 1645 |
| | xmax | 2009 |
| | ymin | 1196 |
| | ymax | 1768 |
| | fixed | false |

3402

3403

FIG.35A
MEDIAN IN FRONT VIEW
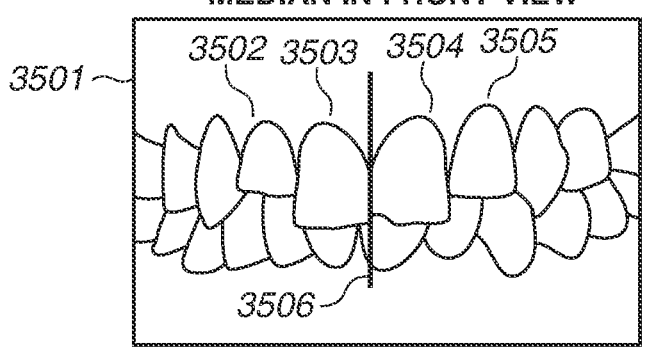
FIG.35B
DETERMINE MEDIAN BASED ON PALATINE FOLDS, PALATINE RAPHE, OR LINGUAL FRENULUM
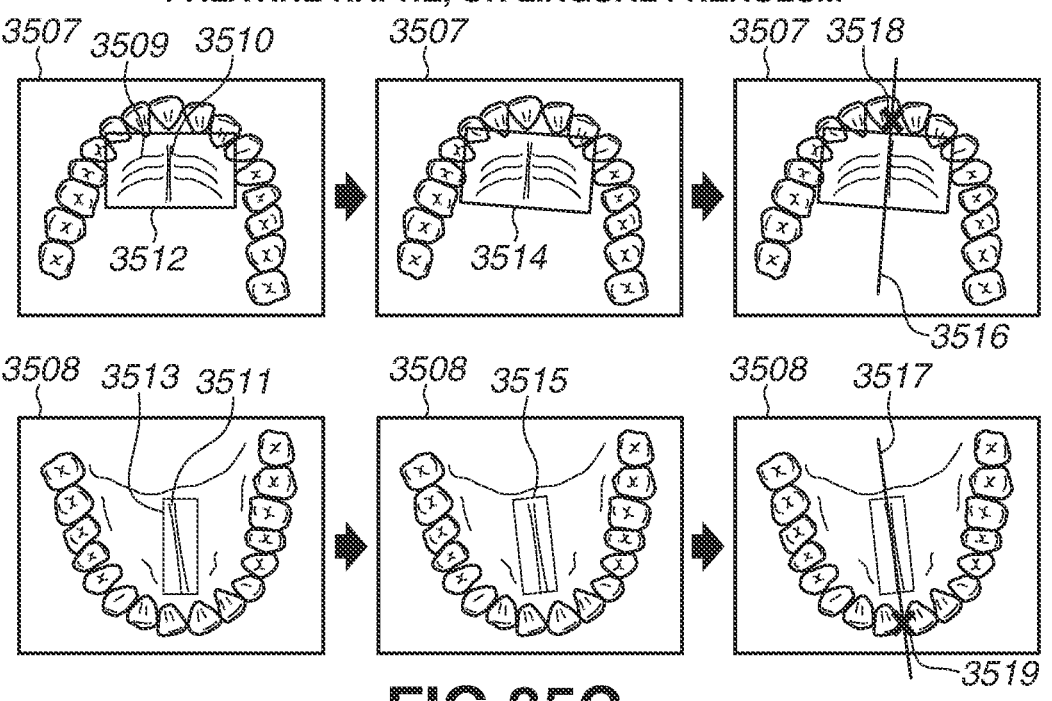
FIG.35C
DETERMINE MEDIAN IN OCCLUSAL VIEW USING MEDIAN IN FRONT VIEW
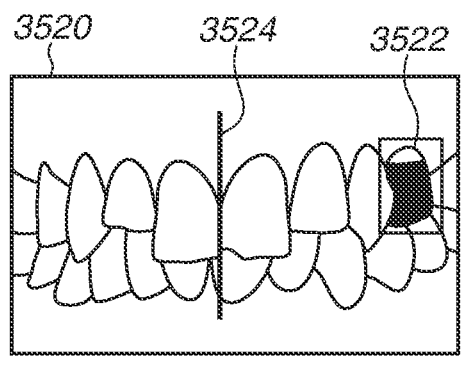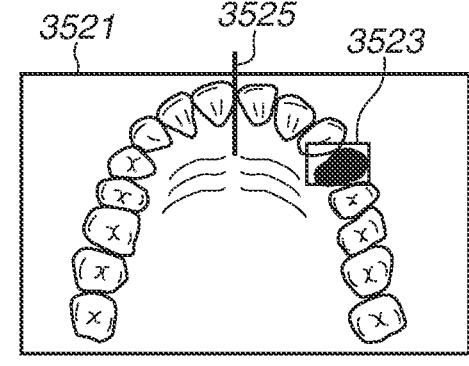

FIG.36A
UPPER JAW IMAGE/20XX.MM.DD
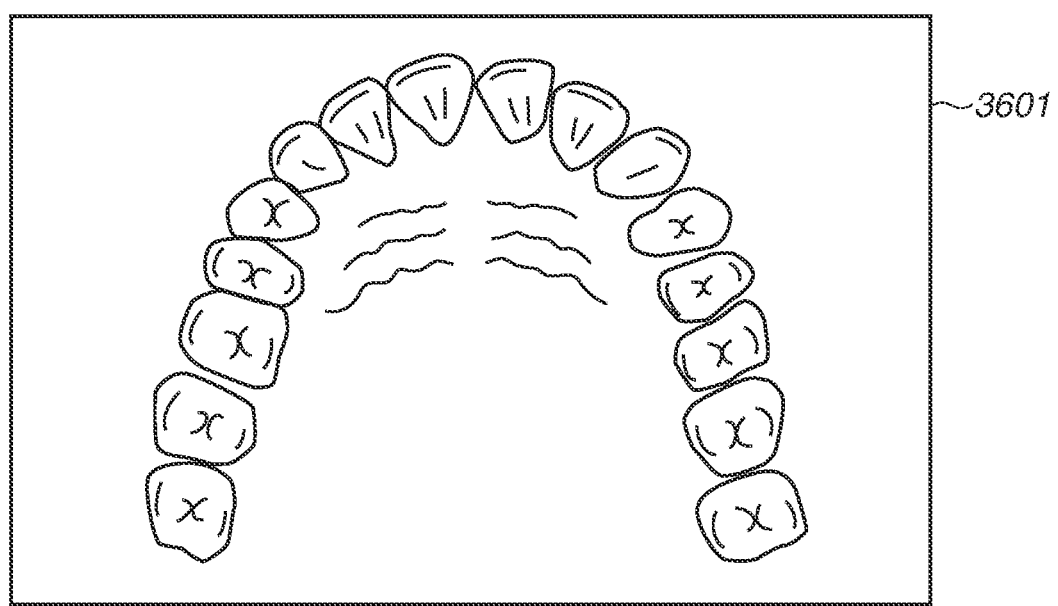
~3601
FRONT IMAGE/20XX.MM.DD
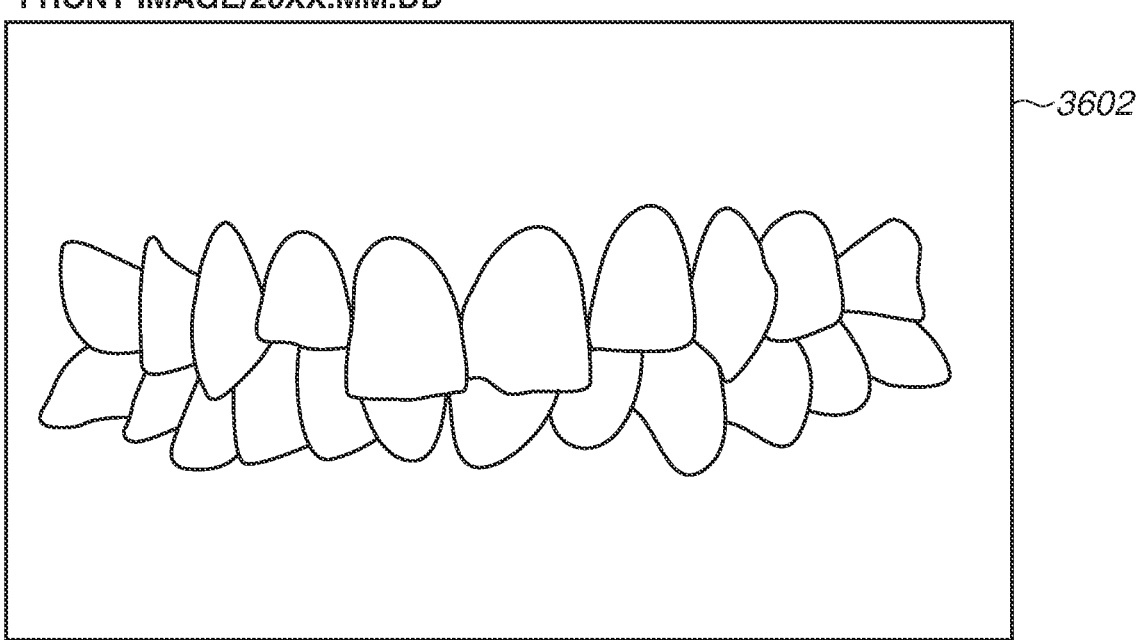
~3602

FIG.36B
INFERENCE RESULTS: UPPER JAW IMAGE
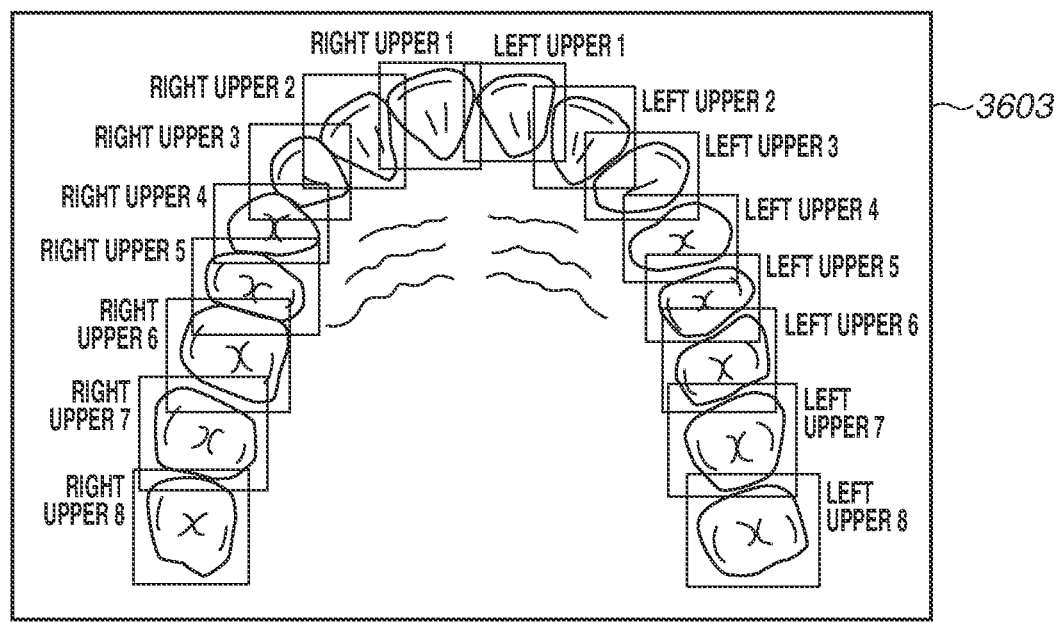
INFERENCE RESULTS: FRONT IMAGE
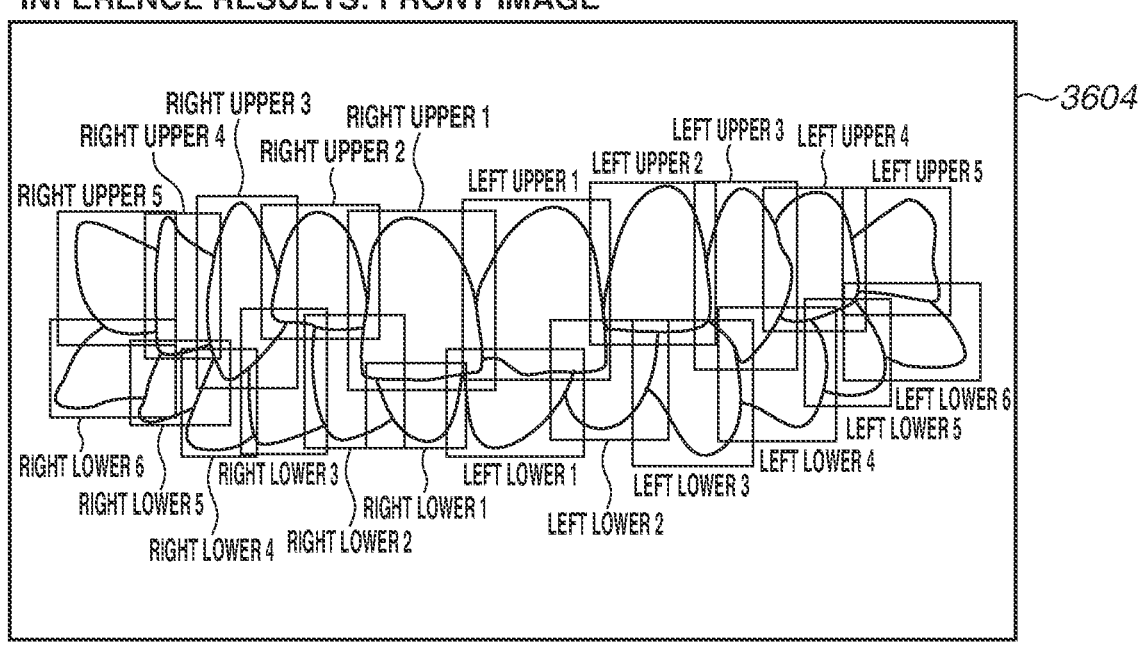

FIG.40A
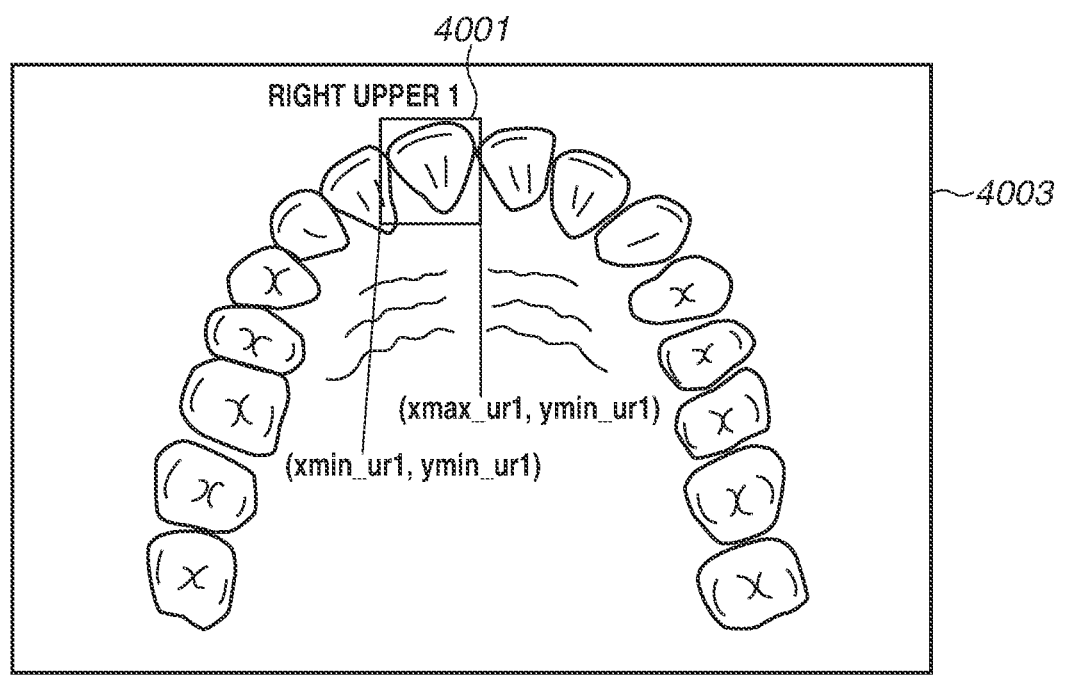
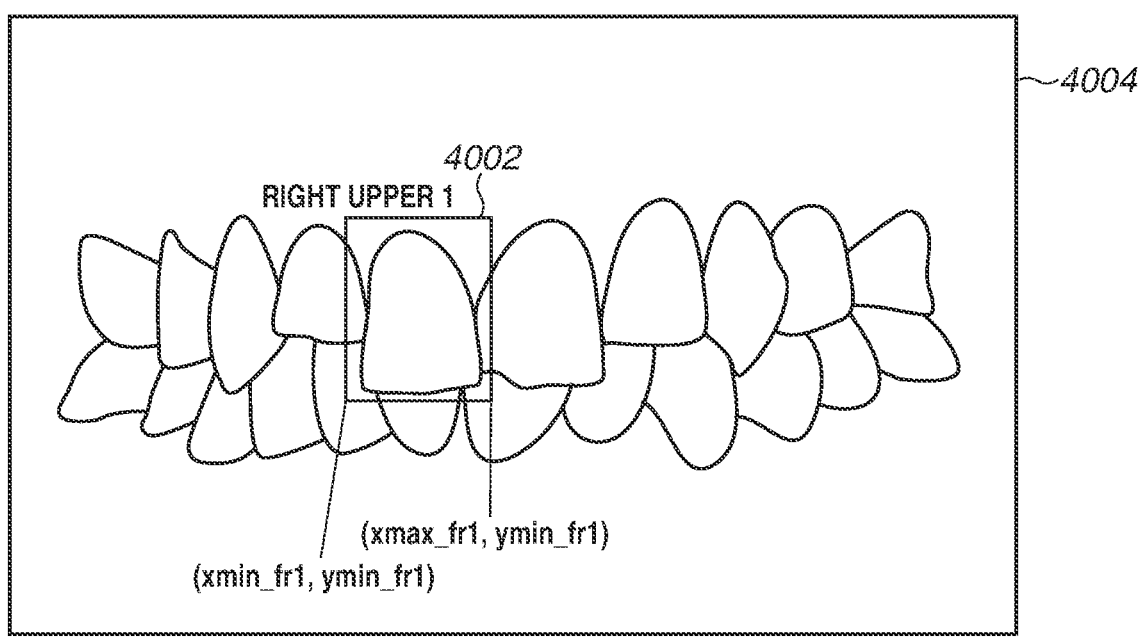

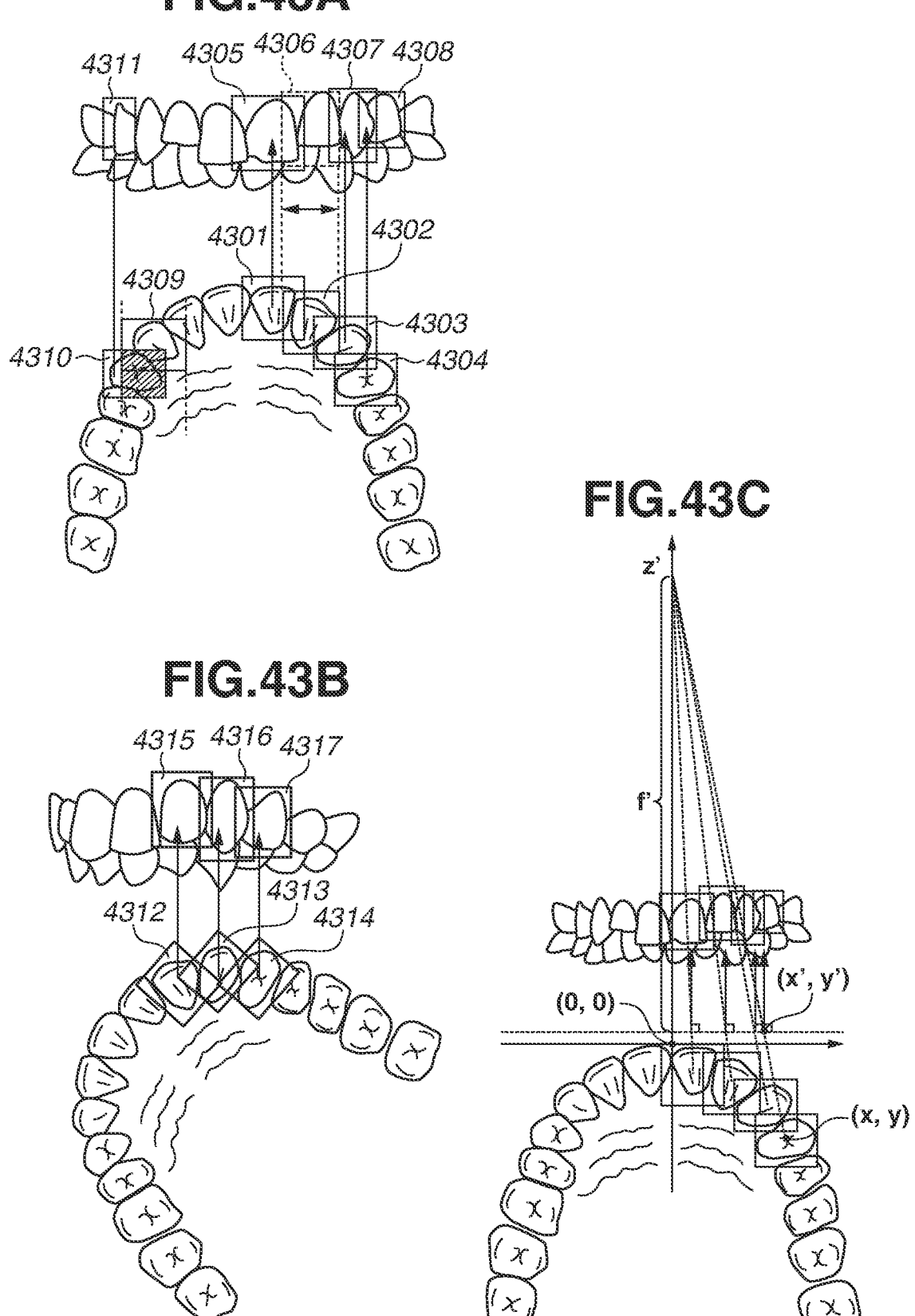

FIG.45

| FRONT VIEW/LEFT AND RIGHT SIDE VIEWS \ OCCLUSAL VIEW | RESIN-FACED PONTIC | TOOTH-COLORED PONTIC | METAL PONTIC | RESIN-FACED BRIDGE | TOOTH-COLORED BRIDGE | METAL BRIDGE | RESIN-FACED CROWN | TOOTH-COLORED CROWN | METAL CROWN |
|---|---|---|---|---|---|---|---|---|---|
| METAL CROWN | — | — | METAL PONTIC | — | — | METAL BRIDGE | — | — | METAL CROWN |
| TOOTH-COLORED CROWN | RESIN-FACED PONTIC | TOOTH-COLORED PONTIC | — | RESIN-FACED BRIDGE | TOOTH-COLORED BRIDGE | — | RESIN-FACED CROWN | TOOTH-COLORED CROWN | — |
| RESIN-FACED CROWN | RESIN-FACED PONTIC | TOOTH-COLORED PONTIC | — | RESIN-FACED BRIDGE | TOOTH-COLORED BRIDGE | — | RESIN-FACED CROWN | TOOTH-COLORED CROWN | — |
| METAL BRIDGE | — | — | METAL PONTIC | — | — | METAL BRIDGE | — | — | METAL CROWN |
| TOOTH-COLORED BRIDGE | RESIN-FACED PONTIC | TOOTH-COLORED PONTIC | — | RESIN-FACED BRIDGE | TOOTH-COLORED BRIDGE | — | RESIN-FACED CROWN | TOOTH-COLORED CROWN | — |
| RESIN-FACED BRIDGE | RESIN-FACED PONTIC | TOOTH-COLORED PONTIC | — | RESIN-FACED BRIDGE | TOOTH-COLORED BRIDGE | — | RESIN-FACED CROWN | TOOTH-COLORED CROWN | — |
| METAL PONTIC | — | — | METAL PONTIC | — | — | METAL BRIDGE | — | — | METAL CROWN |
| TOOTH-COLORED PONTIC | RESIN-FACED PONTIC | TOOTH-COLORED PONTIC | — | RESIN-FACED BRIDGE | TOOTH-COLORED BRIDGE | — | RESIN-FACED CROWN | TOOTH-COLORED CROWN | — |
| RESIN-FACED PONTIC | RESIN-FACED PONTIC | TOOTH-COLORED PONTIC | — | RESIN-FACED BRIDGE | TOOTH-COLORED BRIDGE | — | RESIN-FACED CROWN | TOOTH-COLORED CROWN | — |

FIG.48

IMAGE PROCESSING APPARATUS, METHOD FOR CONTROLLING SAME, AND STORAGE MEDIUM

CROSS-REFERENCE TO RELATED APPLICATIONS

This application is a Continuation of International Patent Application No. PCT/JP2021/041064, filed Nov. 9, 2021, which claims the benefit of Japanese Patent Applications No. 2020-189503, filed Nov. 13, 2020, and No. 2021-132009, filed Aug. 13, 2021, all of which are hereby incorporated by reference herein in their entirety.

BACKGROUND OF THE INVENTION

Field of the Invention

The present invention relates to an image processing apparatus that estimates the state of a patient's mouth cavity.

Background Art

Medical image diagnosis assisting apparatuses for determining tooth frames and missing teeth from a dental medical image and displaying the tooth frames and the dental medical image have been discussed in recent years (for example, Japanese Patent Application Laid-Open No. 2010-51349).

There has been an issue of difficulty in determining the state of, e.g., the gums from X-ray photographs such as ones discussed in Japanese Patent Application Laid-Open No. 2010-51349.

SUMMARY OF THE INVENTION

An image processing apparatus includes a first reading unit configured to read a first image to read a visible light image of an occlusal surface in a mouth cavity, a second reading unit configured to read a second image to read a visible light image in a state where teeth are occluded, a determination unit configured to determine dentition and states of the respective teeth based on the first image, the second image, and a trained model, and an output unit configured to output a result of a determination made by the determination unit.

Further features of the present invention will become apparent from the following description of exemplary embodiments with reference to the attached drawings.

BRIEF DESCRIPTION OF THE DRAWINGS

FIG. 5 is a diagram for describing an inference processing list according to the first exemplary embodiment.

FIGS. 7A to 7C-3 are diagrams for describing determination lists according to the first exemplary embodiment.

FIG. 10 is a flowchart illustrating dental formula inference processing according to a second exemplary embodiment.

FIGS. 12A to 12E are diagrams for describing examples of a case where an inference model fails in correctly inferring tooth positions or numbers according to a fourth exemplary embodiment.

FIG. 18A is a flowchart illustrating error determination and correction processing about the order of dental formula numbers according to the fourth exemplary embodiment.

FIG. 18B is a flowchart illustrating the error correction processing according to the fourth exemplary embodiment.

FIG. 23 is a diagram illustrating an example of a management data structure according to the fifth exemplary embodiment.

FIG. 24 is a diagram illustrating an example of a UI for selecting a target dental electronic medical record display terminal of an image processing apparatus according to the fifth exemplary embodiment.

FIG. 33 is a diagram illustrating an example of training data according to the sixth exemplary embodiment.

FIG. 35A is a diagram illustrating the median in a front view image according to the fourth exemplary embodiment. FIG. 35B is a diagram for describing processing for determining the median based on the palatine folds or lingual frenulum according to the fourth exemplary embodiment. FIG. 35C is a diagram for describing processing for determining the median in an occlusal view using the median in a front view according to the fourth exemplary embodiment.

FIGS. 36A and 36B are diagrams illustrating display examples of oral images during examination of the same patient on the same day and inference results of the oral images according to the first exemplary embodiment.

FIGS. 40A and 40B are diagrams for describing processing for changing the size of an oral image according to the seventh exemplary embodiment and related processing for changing the coordinates of rectangles of inference results.

FIGS. 43A to 43C are diagrams for describing methods for linking the rectangles of inference results of a correction source with those of a correction target based on position information according to the seventh exemplary embodiment.

FIG. 45 illustrates a matrix for deriving a comprehensive determination from a combination of imaging planes and inference results according to the seventh exemplary embodiment.

Figure 48:
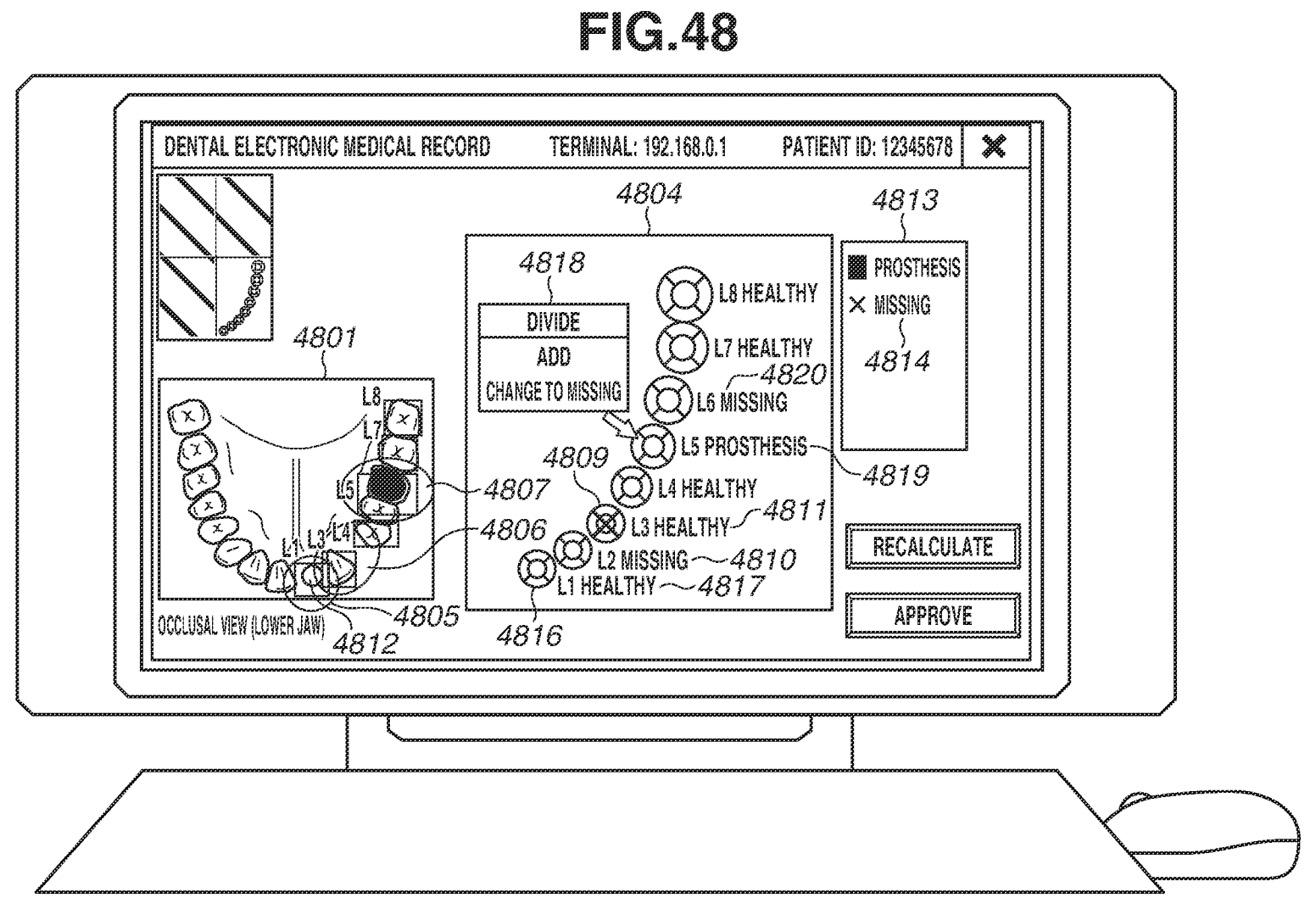

FIG. 48 is a diagram for describing an example of a display screen according to the seventh exemplary embodiment.

DESCRIPTION OF THE EMBODIMENTS

Exemplary embodiments of the present invention will be described in detail below with reference to the attached drawings.

The following exemplary embodiments are just examples of means for implementing the present invention, and modifications and changes may be made as appropriate depending on various conditions and the configurations of apparatuses to which the exemplary embodiments are applied. The exemplary embodiments can also be combined as appropriate.

In a first exemplary embodiment, an image processing apparatus that infers tooth states from oral images on a plurality of imaging planes, and determines the state of each tooth from the inference results in a comprehensive manner will be described. In the present exemplary embodiment, a deep learning-based machine learning algorithm is used as an inference method. It will be understood that template matching based on tooth color and shape may be used for inference.

<System Configuration>

Figure 1:
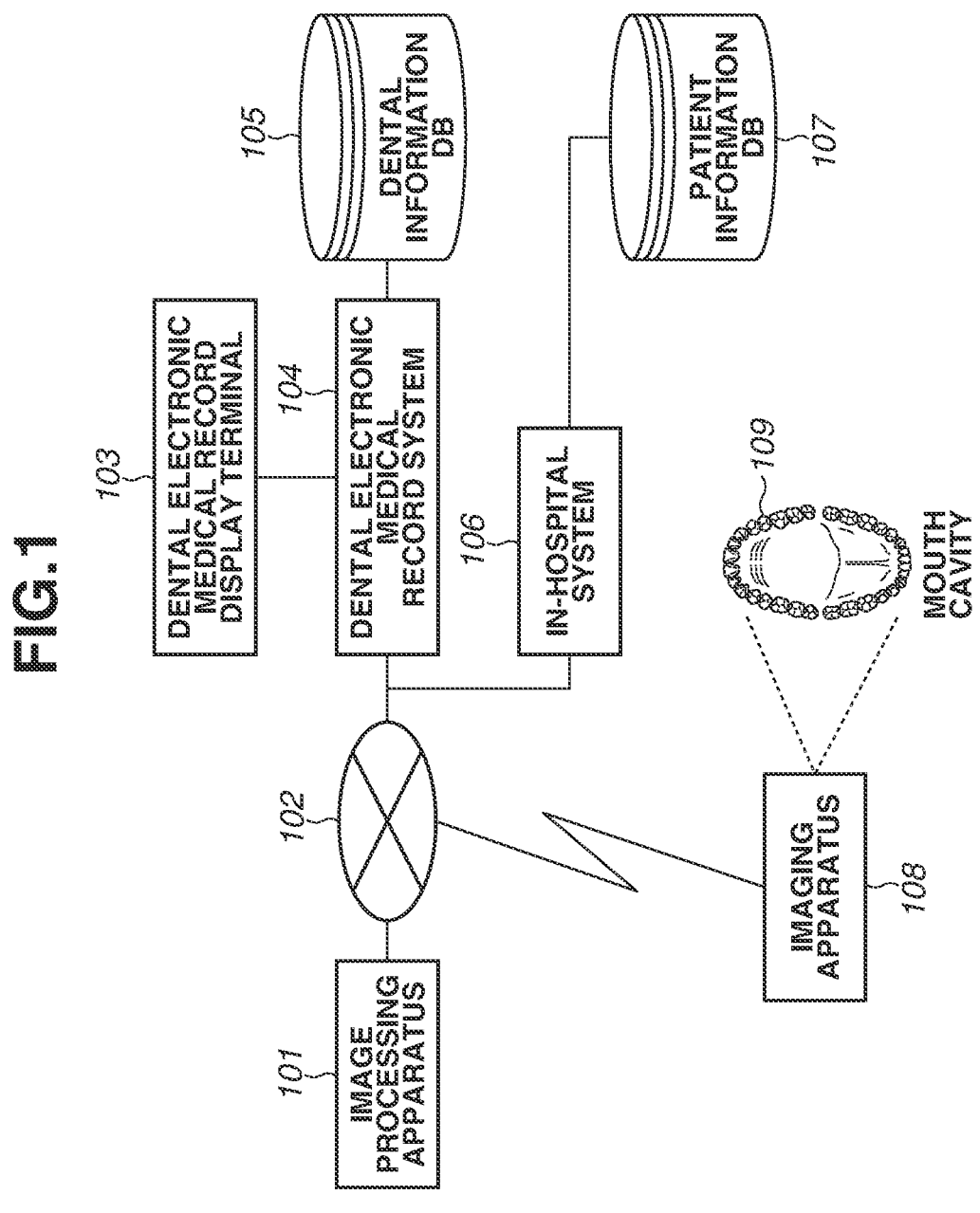
FIG. 1 is a diagram for describing a dental system according to a first exemplary embodiment.

FIG. 1 is a dental system device configuration diagram illustrating a device configuration of a dental system according to the present exemplary embodiment. The dental system according to the present exemplary embodiment includes devices for performing processing to be described below.

An image processing apparatus 101 of the present exemplary embodiment determines dental formula numbers and tooth states. As employed in the present exemplary embodiment, the dental formula numbers are symbols expressing the positions of teeth according to the dental formula. The dental formula numbers are assigned in ascending order from the front to the back on the upper and lower, left and right sides separately. In the case of permanent teeth, central incisors are assigned 1, and third molars 8. In the case of primary teeth, primary central incisors are assigned A, and second primary molars E. In the present exemplary embodiment, a dental formula number refers to a name such as "upper right 6". By contrast, tooth types are terms based on tooth shapes. On each of the upper and lower, left and right sides, tooth types in order from the front are a central incisor, a lateral incisor, a canine, (first and second) premolars, and (first, second, and third) molars. In the case of primary teeth, tooth types are a primary central incisor, a primary lateral incisor, a primary canine, and (first and second) primary molars. The dental formula numbers are intended to identify a single tooth and described as distinguished from the tooth types. In the present exemplary embodiment, a tooth state indicates the health condition of a tooth and the presence or absence of a dental procedure. For each tooth, at least one of the following is selected: healthy, decayed, filled, crowned, and implanted. In the present exemplary embodiment, dental information is information where the dental formula numbers, the states of the respective teeth, and image data of each patient are associated with each other. While a description is omitted in the present exemplary embodiment, a dental electronic medical record display terminal 103 to be described below performs processing for adding information about imaging planes to oral images. This processing can be performed by determining the imaging planes of the oral images using a technique where the image processing apparatus 101 determines the dental formula numbers and tooth states.

An imaging apparatus 108 captures images of a patient's mouth cavity 109 to be described below and generates visible light image data.

In the following description, the images captured by the imaging apparatus 108 will be referred to as visible light image data. Patient information associated with the patient, such as a patient identifier (ID), is added to the captured image data, and the image data is transmitted to the image processing apparatus 101. Captured images can be deleted based on requests from the image processing apparatus 101. Although not illustrated in the drawings, the imaging apparatus 108 includes operation input and output devices for checking captured images and selecting patient information like a commercially available digital camera.

A dental electronic medical record system 104 receives requests from the dental electronic medical record display terminal 103 to be described below, communicates with the image processing apparatus 101 and an in-hospital system 106 and a dental information database (DB) 105 to be described below, and transmits and receives data associated with dental electronic medical record generation processing.

The dental electronic medical record display terminal 103 communicates with the dental electronic medical record system 104, displays a dental electronic medical record, accepts input in generating a dental electronic medical record, and performs the processing for adding information about imaging planes to oral images.

The dental information DB 105 communicates with the dental electronic medical record system 104, and performs processing for storing, transmitting, and receiving patients' dental information so that the dental information is associated with patient information such as a patient ID.

The in-hospital system 106 communicates with a patient information DB 107 to be described below, and performs processing for registering and acquiring patient information. The in-hospital system 106 also communicates with the dental electronic medical record system 104 and performs processing for transmitting patient information.

The patient information DB 107 communicates with the in-hospital system 106, and performs processing for storing, transmitting, and receiving patient information.

A patient's mouth cavity 109 represents an examination object in the dental system.

The image processing apparatus 101, the imaging apparatus 108, the dental electronic medical record system 104, and the in-hospital system 106 communicate via a network 102. The dental electronic medical record display terminal 103 and the dental electronic medical record system 104 communicate using a High-Definition Multimedia Interface (HDMI) (registered trademark) cable. The dental information DB 105 and the dental electronic medical record system 104 communicate using a Universal Serial Bus (USB) cable, and so do the in-hospital system 106 and the patient information DB 107. While the communications are described to be implemented using the network and the HDMI and USB cables as an example, this is not restrictive.

<Procedure for Inferring Patient's State Using Dental System>

Figure 2A:
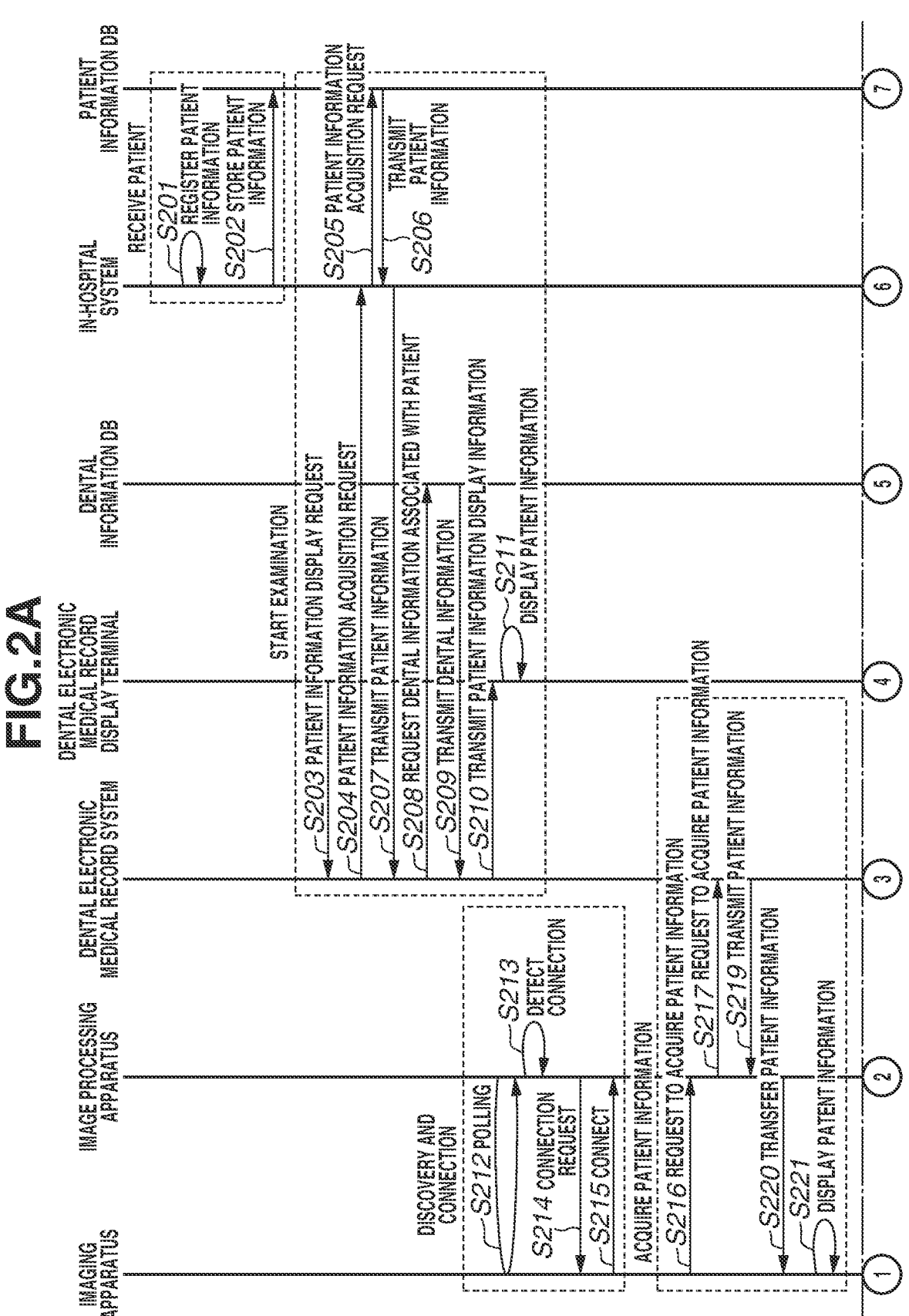
FIGS. 2A to 2C are a processing sequence diagram of the dental system according to the first exemplary embodiment.
Figure 2B:
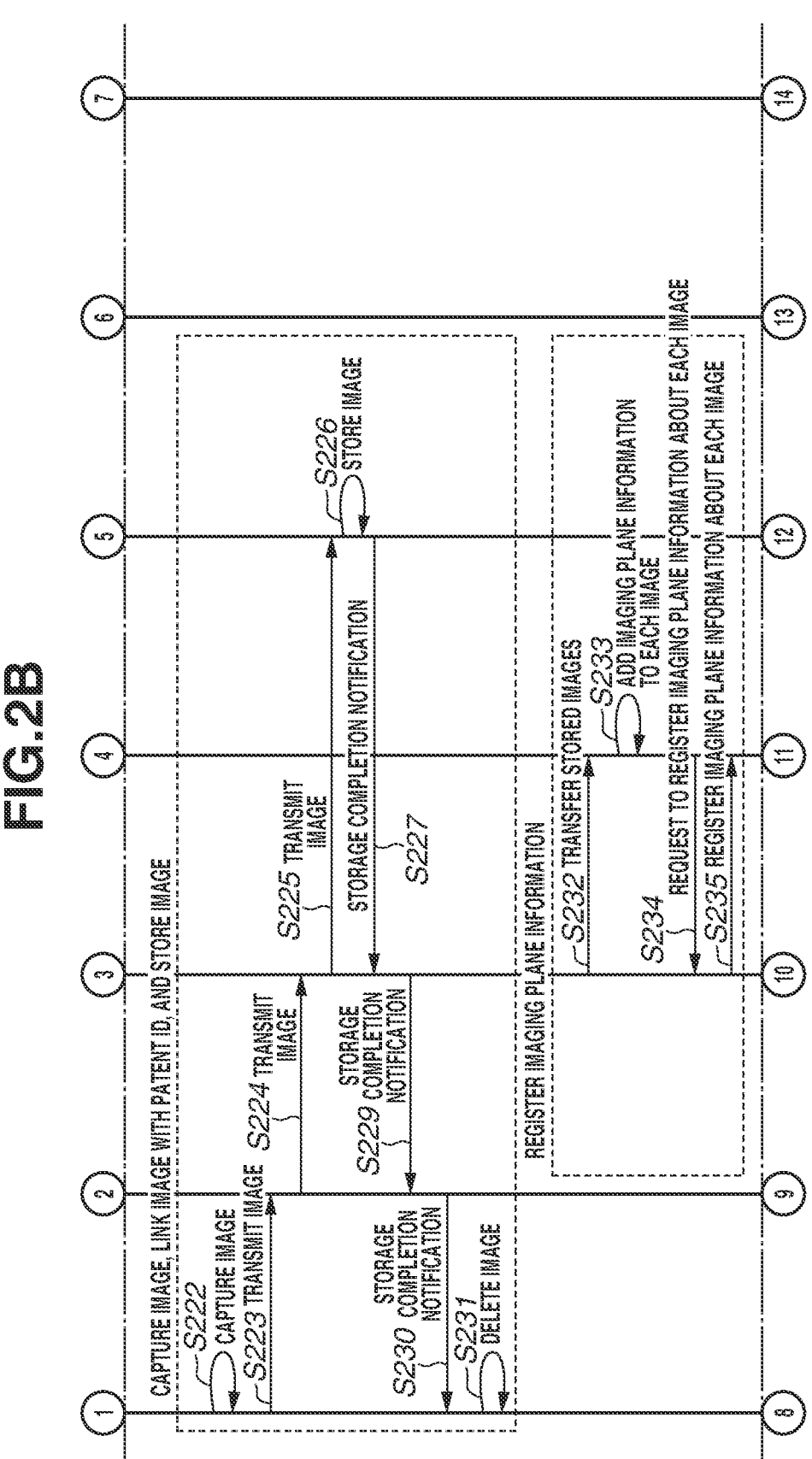
Figure 2C:
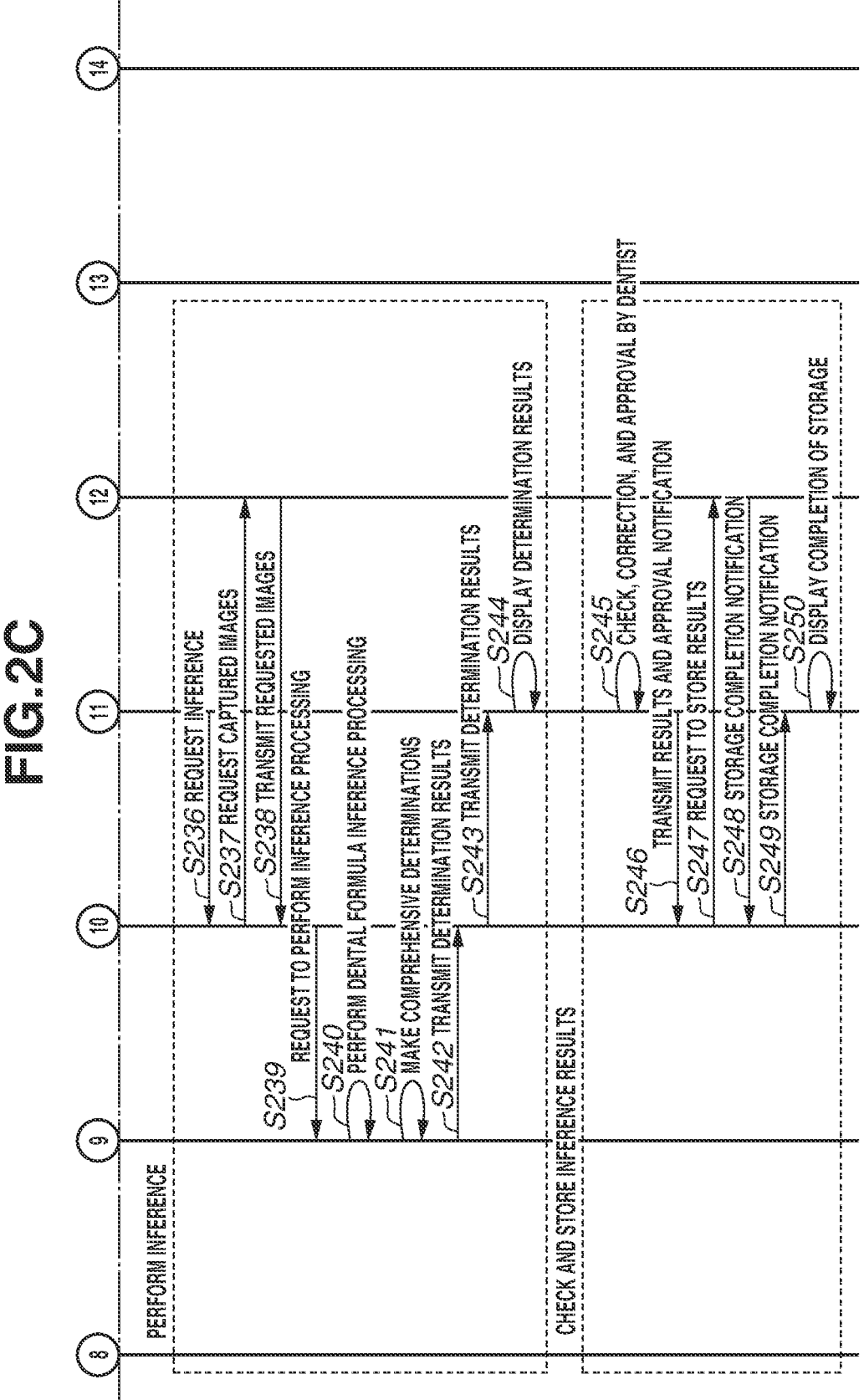

FIGS. 2A to 2C are a sequence diagram illustrating a procedure for inferring a patient's state using the dental system according to the present exemplary embodiment.

Initially, steps S201 to S202 illustrate a sequence for registering patient information related to the generation of patient information to be described below.

In step S201, the in-hospital system 106 registers patient information, such as the patient's name, gender, and date of birth, to be associated with a patient ID.

In step S202, the in-hospital system 106 transmits the patient information to the patient information DB 107 for storage.

Steps S203 to S211 illustrate a sequence for acquiring or generating dental information to be described below using the patient information, and displaying the dental information.

In step S203, the dental electronic medical record display terminal 103 issues a patient information display request to the dental electronic medical record system 104 based on user operations.

In step S204, the dental electronic medical record system 104 transmits a patient information acquisition request to the in-hospital system 106.

In step S205, the in-hospital system 106 issues an acquisition request for patient information stored in the patient information DB 107.

In step S206, the patient information DB 107 transmits the patient information for which the acquisition request is issued in step S205 to the in-hospital system 106.

In step S207, the in-hospital system 106 transmits the patient information to the dental electronic medical record system 104.

In step S208, using the patient ID included in the patient information, the dental electronic medical record system 104 requests dental information associated with the patient ID from the dental information DB 105.

In step S209, the dental information DB 105 transmits the dental information to the dental electronic medical record system 104.

In step S210, the dental electronic medical record system 104 transmits patient information display information to the dental electronic medical record display terminal 103.

In step S211, the dental electronic medical record display terminal 103 displays the patient information. If there is no dental information associated with the patient ID, the dental information DB 105 performs processing for storing a new record.

Steps S212 to S215 illustrate a sequence of a method for connecting the image processing apparatus 101 and the imaging apparatus 108.

In step S212, the image processing apparatus 101 performs polling on the network 102 to repeatedly check whether the image processing apparatus 108 is connected to the network 102.

In step S213, the image processing apparatus 101 detects that the imaging apparatus 108 is connected to the network 102.

In step S214, the image processing apparatus 101 transmits a connection request to the imaging apparatus 108. In step S215, the imaging apparatus 108 connects to the image processing apparatus 101. For example, the imaging apparatus 108 and the image processing apparatus 101 communicate using Hypertext Transfer Protocol (HTTP) communication, for example, and establish a connection. The method of the HTTP communication is not limited in particular.

Steps S216 to S221 illustrate a sequence for acquiring patient information for the purpose of adding the patient information to images captured by the imaging apparatus 108.

In step S216, the imaging apparatus 108 requests the image processing apparatus 101 to acquire patient information.

In step S217, the image processing apparatus 101 requests the dental electronic medical record system 104 to acquire patient information.

In step S219, the dental electronic medical record system 104 transmits the patient information acquired in advance to the image processing apparatus 101.

In step S220, the image processing apparatus 101 transfers the patient information received in step S219 to the imaging apparatus 108.

In step S221, the imaging apparatus 108 displays the acquired patient information. The user can check and select the content on the imaging apparatus 108.

Steps S222 to S231 illustrate a sequence for capturing a dental image and stores the dental image as dental information.

In step S222, if the user determines to capture an image as dental information, the user makes an imaging operation on the imaging apparatus 108 connected to the image processing apparatus 101. Based on the imaging operation, the imaging apparatus 108 captures an image, links the image with the patient ID, and stores the image.

In step S223, the imaging apparatus 108 transmits the image to the image processing apparatus 101.

In step S224, the image processing apparatus 101 transmits the image to the dental electronic medical record system 104.

In step S225, the dental electronic medical record system 104 transmits the image to the dental information DB 105.

In step S226, the dental information DB 105 stores the image based on the patient ID.

In step S227, the dental information DB 105 notifies the dental electronic medical record system 104 of the completion of the storage.

In step S229, the dental electronic medical record system 104 notifies the image processing apparatus 101 of the completion of the storage.

In step S230, the image processing apparatus 101 notifies the imaging apparatus 108 of the completion of the storage.

In step S231, the notified imaging apparatus 108 deletes the image instead of holding the image. While in the illustrated sequence, the captured image is deleted from the imaging apparatus 108, the image can be left undeleted depending on settings.

Steps S232 to S235 illustrate a sequence for adding imaging plane information to images captured and stored as described above, and storing the images in the dental information DB 105.

In step S232, the dental electronic medical record system 104 transfers images stored therein to the dental electronic medical record display terminal 103 for display.

In step S233, the dental electronic medical record display terminal 103 adds imaging plane information, such as an occlusal view and a front view, to each image.

In step S234, the dental electronic medical record display terminal 103 requests the dental electronic medical record system 104 to register the imaging plane information about the images.

In step S235, the dental electronic medical record system 104 adds the imaging plane information to the images and registers the images in the dental information DB 105.

Steps S236 to S244 illustrate a sequence for inferring dental formula numbers and tooth states serving as dental information.

In step S236, the dental electronic medical record display terminal 103 requests the dental electronic medical record system 104 to infer dental formula numbers and tooth states from the captured images about which the imaging plane information is registered.

In step S237, the dental electronic medical record system 104 requests the captured images from the dental information DB 105.

In step S238, the dental information DB 105 transmits the requested images to the dental electronic medical record system 104.

In step S239, the dental electronic medical record system 104 transmits the images to the image processing apparatus 101 and requests the image processing apparatus 101 to perform inference processing.

In step S240, the image processing apparatus 101 performs dental formula inference processing for inferring dental formula numbers and tooth states in each imaging plane on the images of the respective imaging planes received.

In step S241, the image processing apparatus 101 makes a comprehensive determination of the tooth state at each dental formula number based on the result of inference made on each imaging plane.

In step S242, the image processing apparatus 101 transmits the results of the comprehensive determinations to the dental electronic medical record system 104.

In step S243, the dental electronic medical record system 104 transmits the results of the comprehensive determinations to the dental electronic medical record display terminal 103.

In step S244, the dental electronic medical record display terminal 103 displays the results of the comprehensive determinations.

Details of the inference processing and the comprehensive determination processing according to the present exemplary embodiment will be described below with reference to FIGS. 4 and 6.

Steps S245 to S250 illustrate a sequence where the user checks and corrects the results of the comprehensive determinations, and the results are stored as inference results.

In step S245, the user (dentist) checks the inference results, or comprehensive determinations, on the dental electronic medical record display terminal 103, corrects the inference results as appropriate, and approves the inference results. The dental electronic medical record display terminal 103 modifies the display based on the user's correction and approval operations.

In step S246, the dental electronic medical record display terminal 103 transmits the inference results or the editing results of the inference results and an approval notification to the dental electronic medical record system 104.

In step S247, the dental electronic medical record system 104 requests the dental information DB 105 to store the results transmitted in step S246.

In step S248, the dental information DB 105 stores the results transmitted in step S246, and notifies the dental electronic medical record system 104 of the completion of the storage.

In step S249, the dental electronic medical record system 104 notifies the dental electronic medical record display terminal 103 of the completion of the storage.

In step S250, the dental electronic medical record display terminal 103 displays the completion of the storage.

The above is the description of the procedure for inferring the patient's state using the dental system according to the present exemplary embodiment.

<Device Configuration>

Next, a configuration of the devices used in the dental system will be described.

Figure 3A:
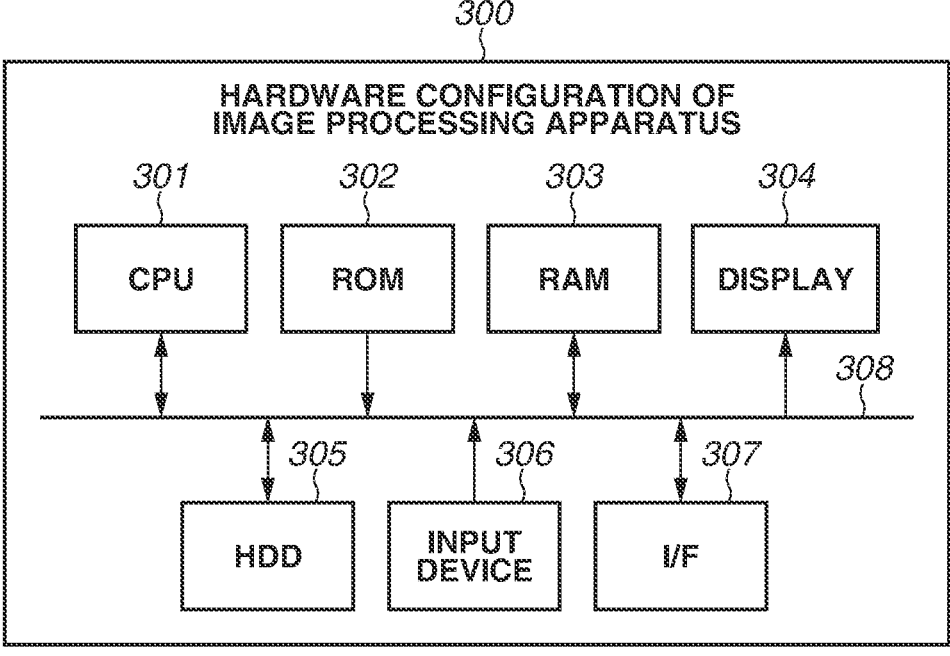
FIG. 3A is a hardware block diagram of an image processing apparatus according to the first exemplary embodiment.

FIG. 3A illustrates a hardware configuration diagram of the image processing apparatus 101. A hardware configuration 300 of the image processing apparatus 101 according to the present exemplary embodiment is a diagram illustrating an example of the hardware configuration according to the present exemplary embodiment. The image processing apparatus 101 includes a processor or central processing unit (CPU) 301 for processing programs, and a memory or read-only memory (ROM) 302 storing the programs. The image processing apparatus 101 further includes a memory or random access memory (RAM) 303 into which data to be used in executing the programs is loaded. The image processing apparatus 101 further includes a hard disk or hard disk drive (HDD) 305 storing inference data, inference results, and data such as training data for generating inference data. The image processing apparatus 101 further includes an input device 306 and a display 304 for making input and checking display in registering setting information about the programs, an interface (I/F) 307 for communicating with an external system, and a bus 308.

The functions of the image processing apparatus 101 are implemented by the processor or CPU 301 reading predetermined programs on such hardware as the memory or ROM 302, and performing calculations. The functions are also implemented by communicating with external systems via the I/F 307 and controlling data read and write of the memory or RAM 303 and the hard disk or HDD 305.

Figure 3B:
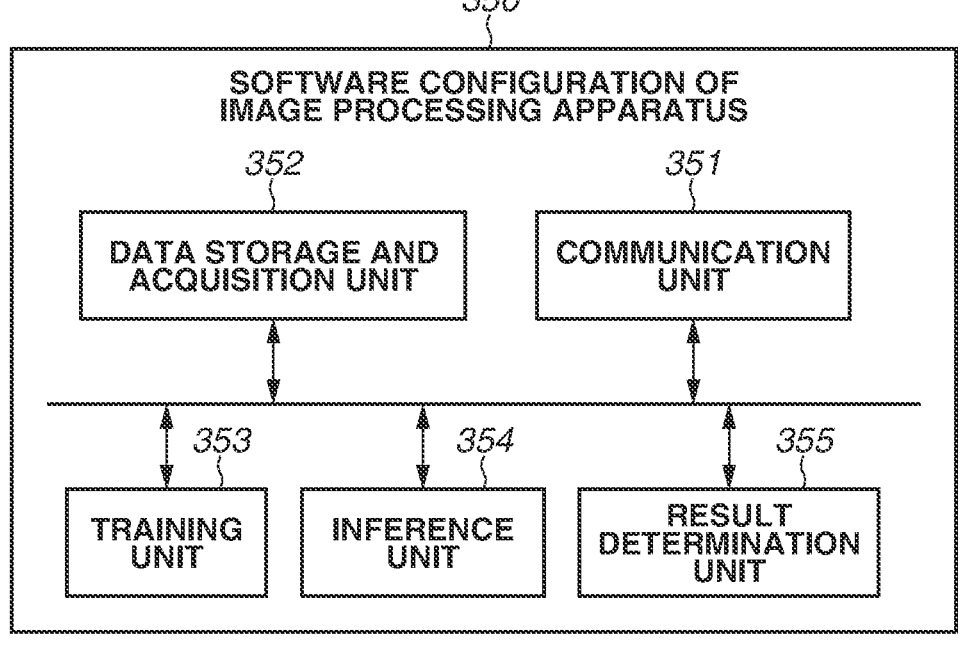
FIG. 3B is a software configuration diagram of the image processing apparatus according to the first exemplary embodiment.

FIG. 3B illustrates a software configuration diagram of the image processing apparatus 101. A software configuration 350 of the image processing apparatus 101 according to the present exemplary embodiment includes processing modules including a communication unit 351, a data storage and acquisition unit 352, a training unit 353, an inference unit 354, and a result determination unit 355. The communication unit 351 receives requests from other processing modules, and performs data transmission and reception processing with external systems. The data storage and acquisition unit 352 performs processing for storing and acquiring data to be used in processing, such as inference image data, inference results, patient information, determination results, and training data acquired through communication. The training unit 353 performs processing for generating data to be used for inference where tooth types and states are inferred and determined, using training data including tooth type- and state-related information and images. The inference unit 354 acquires inference images from an inference processing list 500 to be described below, determines tooth types and states, and enters the determination results into a determination list 700 of FIG. 7A, a determination list 750 of FIGS. 7B-1 to 7B-3, or a determination list 770 of 7C to be described below. The result determination unit 355 performs processing for generating comprehensive results from determination results in the determination list 700, 750, or 770 to be described below, and entering the comprehensive results into the list. A method where the training unit 353 generates data to be used for inference using the training data will be described in detail in a sixth exemplary embodiment to be described below.

In the present exemplary embodiment, the CPU 301 is described to be included as a main control unit of the image processing apparatus 101 for ease of description. However, this is not restrictive. For example, a graphics control unit (GPU) may be included in addition to the CPU 301, and the CPU 301 and the GPU may execute processing in a cooperative manner. Since a GPU is capable of efficient calculations through parallel processing of a greater amount of data, the execution of processing using a GPU is effective in training a deep learning-based learning model a plurality of times. The processing of the training unit 353 can thus be performed using the GPU in addition to the CPU 301. Specifically, in executing a training program including a learning model, the CPU 301 and the GPU perform training by performing calculations in a cooperative manner. The calculations for the processing of the training unit 353 may be performed by either one of the CPU 301 and the GPU. Like the processing of the training unit 353, processing of the inference unit 354 may also be performed using the GPU.

<Inference Processing>

Figure 4:
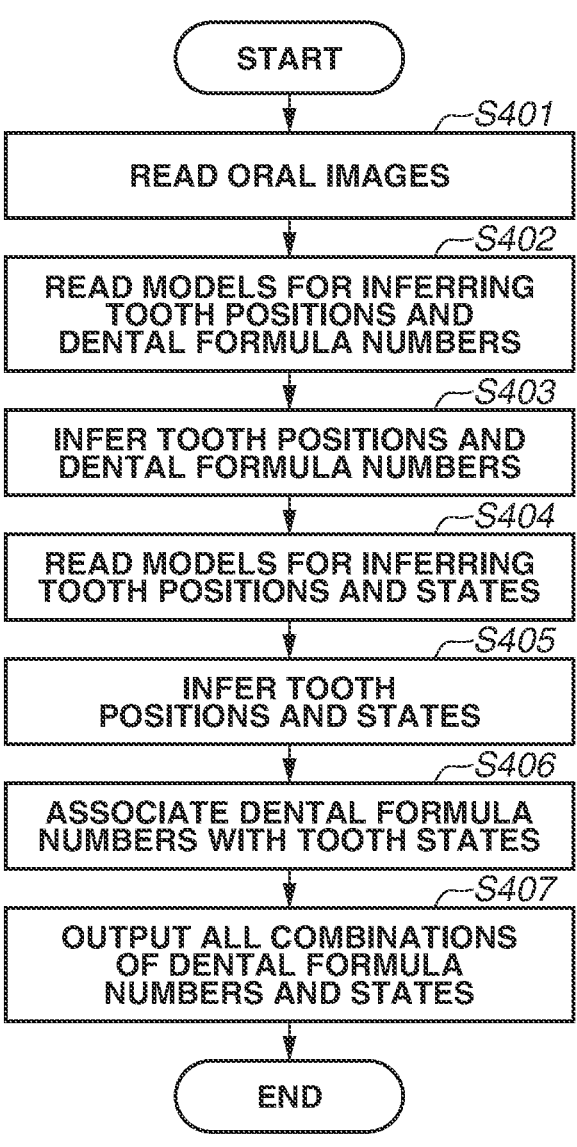
FIG. 4 is a flowchart of dental formula inference processing performed by the image processing apparatus according to the first exemplary embodiment.

FIG. 4 is a flowchart illustrating the operation of the image processing apparatus 101 in the dental formula inference processing step S240 of FIG. 2C. The processing illustrated in this flowchart is implemented by the CPU 301 of the image processing apparatus 101 controlling the components of the image processing apparatus 101 based on input signals and programs. The same applies to the other flowcharts illustrating the processing of the image processing apparatus 101 unless otherwise specified. FIGS. 7A, 7B, and 7C illustrate examples of the determination lists 700, 750, and 770 listing the results of the inference processing. Processing up to the output of the determination list illustrated in FIG. 7A, 7B, or 7C will be described with reference to FIG. 4.

In step S401, the CPU 301 reads oral images as input images. In the present exemplary embodiment, information about the imaging planes is transmitted from the dental electronic medical record system 104 along with the oral images. If the information about the imaging planes is not available, the information may be inferred using a model generated by machine learning.

In step S402, the CPU 301 reads models for inferring tooth positions and dental formula numbers corresponding to the information about the imaging planes.

In step S403, the CPU 301 infers tooth positions and dental formula numbers using the models read in step S402. As a result, the regions of respective teeth are detected in the input images, and inference results of the dental formula numbers for the respective detection results are obtained. The tooth regions detected here will be referred to as number detection results $DN_1$ to $DN_N$.

In step S404, the CPU 301 reads models for inferring tooth positions and states corresponding to the information about the imaging planes.

In step S405, the CPU 301 infers tooth positions and states using the models read in step S404. As a result, the regions of the respective teeth are detected in the input images, and inference results of the tooth states corresponding to the respective detection results are obtained. The tooth regions detected here will be referred to as state detection results $DS_1$ to $DS_M$.

In step S406, the CPU 301 associates the dental formula numbers of the teeth with the states of the respective teeth based on the number detection results $DN_1$ to $DN_N$ and the state detection results $DS_1$ to $DS_M$. Specifically, the CPU 301 selects pairs of detection results where the distances between the respective center coordinates are the smallest between the number and state detection results $DN_1$ to $DN_N$ and $DS_1$ to $DS_M$, and records such pairs in association with each other. Suppose, for example, that the state detection result $DS_5$ is located closest to the number detection result $DN_3$, and the number detection result $DN_3$ is inferred to be "right upper 3" and the state detection result $DS_5$ "healthy tooth". In such a case, an association "right upper 3=healthy tooth" is recorded.

Some of the states may be recorded in association with a plurality of teeth. For example, if the state detection result $DS_8$ is inferred to be "gingivitis" over a wide range, number detection results overlapping the state determination result DS8 by a certain area or more among the number detection results $DN_1$ to $DN_8$ are all associated with "gingivitis". Moreover, each of the number detection results $DN_1$ to $DN_N$ is subdivided into areas as in display sections 955 and 957 illustrated in FIG. 9B to be described below. Each area is associated with area information to which the distance between the center coordinates belongs as state position information about the state detection results $DS_1$ to $DS_M$. For example, at dental formula numbers of 4 to 8, "occlusal surface", "distal proximal surface", "mesial proximal surface", "buccal surface", and "lingual surface" are associated and recorded as state positions. At dental formula numbers of 1 to 3, "incisal edge", "distal proximal surface", "mesial proximal surface", "labial surface", and "lingual surface" are associated and recorded as state positions. If there is a plurality of states, the position of state 1 and the position of state 2 are recorded in order.

In step S407, the CPU 301 outputs all the combinations of the dental formula numbers and states determined in step S406 as the determination list 700, 750, or 770. Note that this stage is before execution of comprehensive determination processing to be determined below. A comprehensive determination 708, a comprehensive determination 766, a comprehensive determination: position of state 1, 767, and a comprehensive determination: position of state 2, 768, are therefore left unregistered. A comprehensive determination 794, a comprehensive determination: occlusal surface 795, a comprehensive determination: labial (buccal) surface 796, a comprehensive determination: palatal (lingual) surface 797, a comprehensive determination: mesial proximal surface 798, and a comprehensive determination: distal proximal surface 799 are also output unregistered.

A data format of inference results to be output will now be described.

Figure 34:
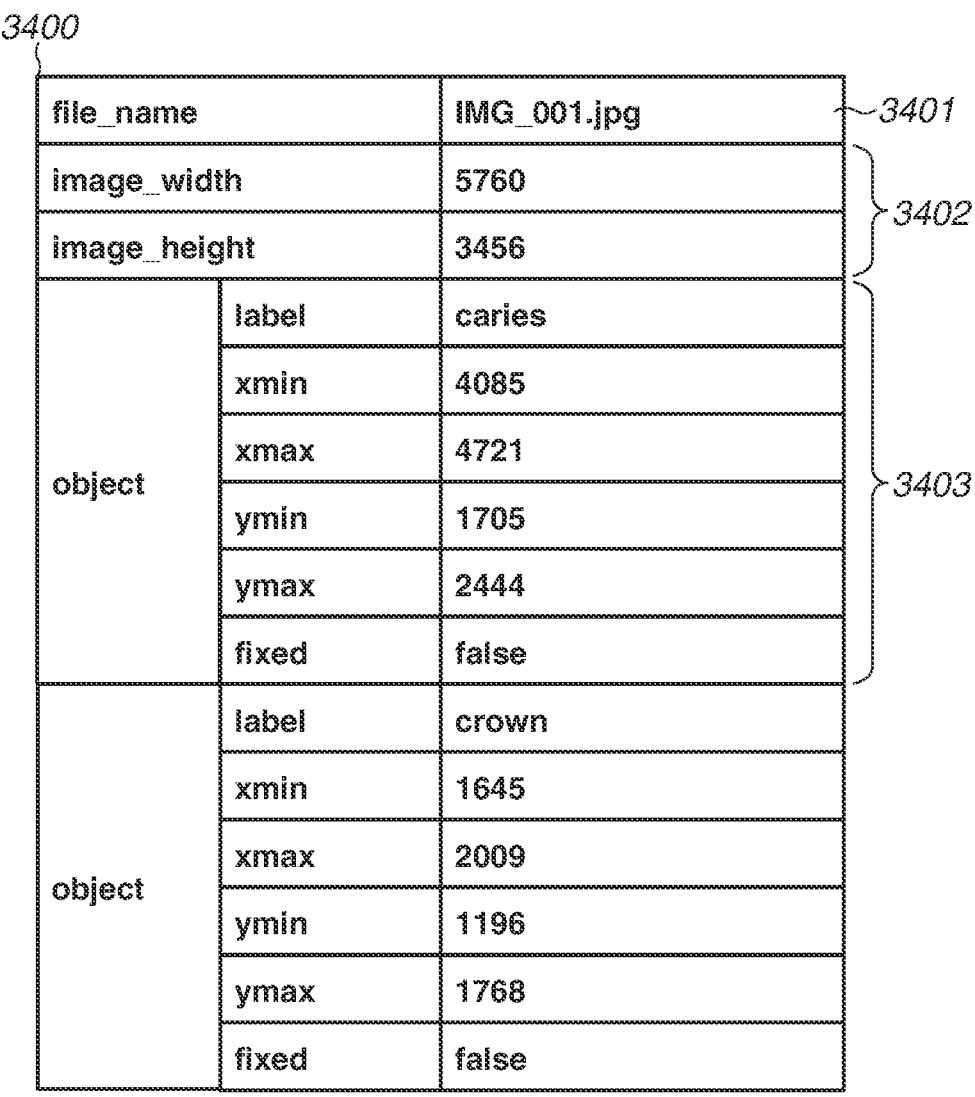
FIG. 34 is a diagram illustrating a data format of inference results output by inference processing according to the first exemplary embodiment.

FIG. 34 illustrates the data format of inference results output by the inference processing.

An inference result list 3400 is a list of inference results obtained from an image file when the inference illustrated in FIG. 4 is performed. In the present exemplary embodiment, the inference result list 3400 is recorded in an Extensible Markup Language (XML) format. Image identification information 3401 is information for identifying the target image file for inference. In the present exemplary embodiment, a filename is recorded in the image identification information 3401. Image size information 3402 is information about the resolution of the entire image. In the present exemplary embodiment, the numbers of horizontal and vertical pixels are recorded in the image size information 3402. An inference result 3403 is information about a dental formula number or state detected from the image, and includes rectangle position information, a label, and a fixed flag.

In the present exemplary embodiment, the rectangle position information records a left end coordinate $x_{min}$, a right end coordinate $x_{max}$, an upper end coordinate $y_{min}$, and a lower end coordinate $y_{max}$ of a rectangle in the image. The label records a character string such as "uR3" representing "upper right 3" in the case of the inference result of a dental formula number, and a character string such as "caries" representing "tooth decay" in the case of the inference result of a state. The fixed flag is a flag for indicating the presence of a tooth confirmed when the dentist corrects the inference result in processing to be described below. Either true or false is recorded in the fixed field. The fixed flag is false by default. The inference result list 3400 records as many inference results 3403 as the number of objects detected from the image.

FIGS. 36A and 36B illustrate examples of screen display of oral images of the same patient during examination on the same day, and data on the foregoing inference results of FIG. 34 that are the results of inference on the oral images.

FIG. 36A illustrates an upper jaw image 3601 and a front image 3602 of the same patient during examination on the same day.

FIG. 36B illustrates the results of inference made on the upper jaw image 3601 and the front image 3602, using the models generated by the machine learning described above. An inference result image 3603 shows the inference results of the foregoing upper jaw image 3601. An inference result image 3604 shows the inference results of the foregoing front image 3602. The inference result images 3603 and 3604 display tooth types and their rectangle information as the inference results. The data on the inference results output by the inference processing can be displayed in such a manner.

<Inference Processing List>

FIG. 5 illustrates an inference processing list to be used in the inference processing performed by the image processing apparatus 101. The inference processing list 500 is generated by the image processing apparatus 101 in order of reception of inference target images transmitted from the dental electronic medical record system 104. However, this is not restrictive. For example, the image processing apparatus 101 may receive an inference processing list 500 generated by the dental electronic medical record system 104 in advance through communication different from that of the inference target images.

The inference processing list 500 is an information list for managing the processing targets and the progress of the inference processing in performing the inference illustrated in FIG. 4. A processing list 501 includes numbers for managing the order of processing. An image filename 502 includes character strings for identifying the image files to be processed.

An imaging plane registration information 503 includes information about imaging planes to be used in registering the inference results into the determination list 700, 750, or 770. A state of execution of inference 504 includes information indicating whether inference is executed. Here, "True" indicates that the inference of the tooth types and states from the target image is completed and the determination results are already entered in the determination list 700, 750, or 770. "False" means that the inference is not completed yet.

<Comprehensive Determination Processing>

Next, the comprehensive determination processing according to the present exemplary embodiment will be described.

Figure 6:
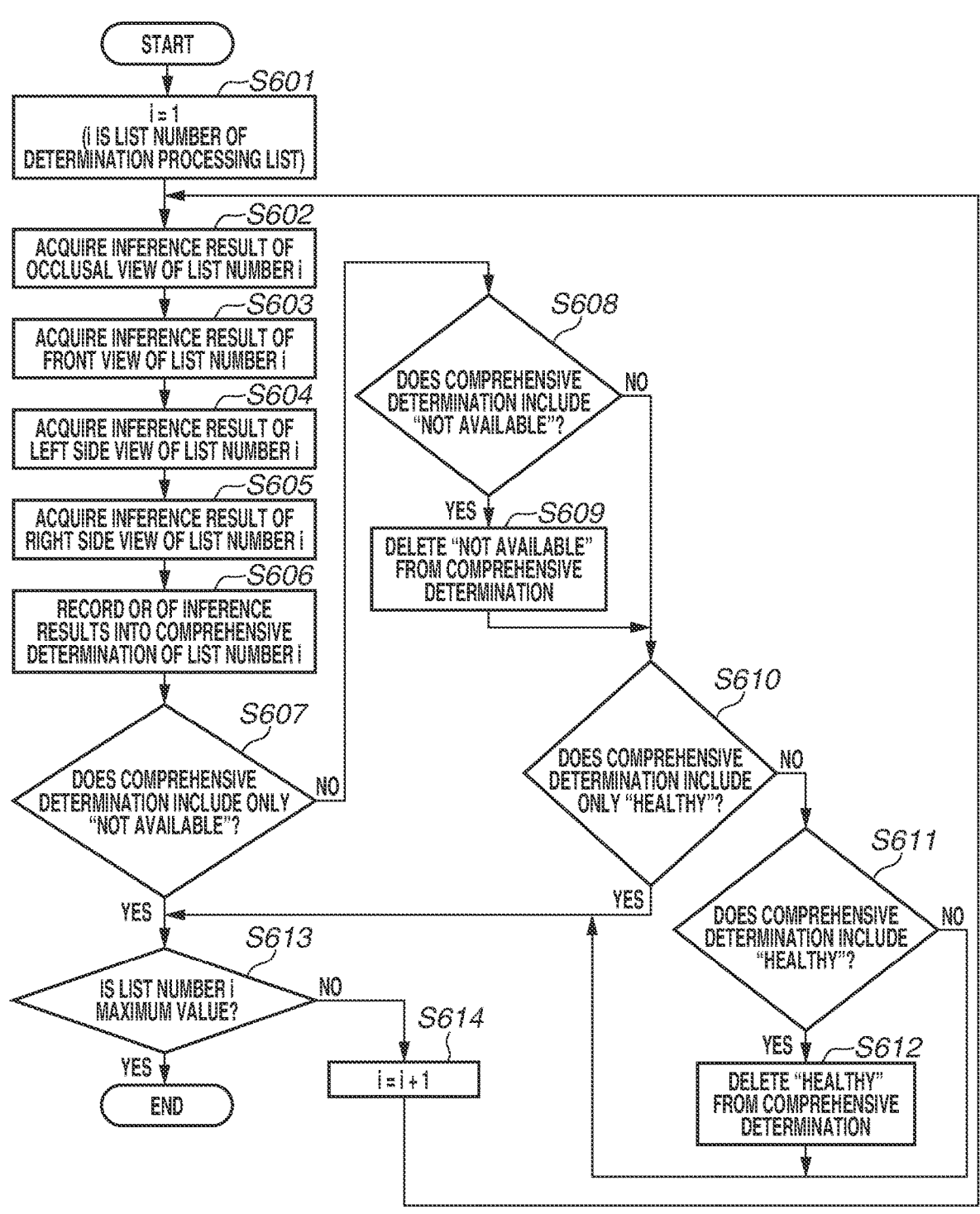
FIG. 6 is a flowchart of comprehensive determination processing according to the first exemplary embodiment.

FIG. 6 is a flowchart indicating processing for making comprehensive determinations. This flowchart corresponds to the processing of step S241 in FIG. 2C. In this flowchart, a comprehensive determination 708 at each of list numbers 1 to 32 in a determination processing list 701 is made based on an occlusal view 704, a front view 705, a left side view 706, and a right side view 707 that are the results of the inference processing of FIG. 4. A detailed description will now be given.

In step S601, the CPU 301 initializes list number i of the determination processing list 701 to 1.

In step S602, the CPU 301 acquires the inference result of the occlusal view 704 at list number i of the determination processing list 701.

In steps S603, S604, and S605, the CPU 301 similarly acquires the inference results of the front view 705, the left side view 706, and the right side view 707 at list number i, respectively.

In step S606, the CPU 301 ORs the inference results acquired in the foregoing steps S602 to S605, and records the result into the comprehensive determination 708 at list number i of the determination processing list 701.

For example, at list number 1, the inference result of the occlusal view 704 is "healthy", those of the front view 705 and the left side view 706 are "decayed/wedge-shaped defect (WSD)", and that of the right side view 707 is "not available (recorded as "-")". The OR is "healthy/delayed/WSD/not available". Such information is recorded once and then processing for correcting the information to make the determination result more understandable is performed.

The processing for correcting the comprehensive determination will now be described. If the OR is "not available (denoted by "-" in the determination lists 700 and 750)" or "healthy", the value of the comprehensive determination 708 recorded once is not changed, and the comprehensive determination at list number i of the determination processing list 701 is determined to be completed. If the OR includes "not available" and "healthy", "not available" is deleted to make the comprehensive determination 708 "healthy". The comprehensive determination is then determined to be completed. In other cases, "not available" and "healthy" are deleted from the value (OR) recorded in the comprehensive determination 708 at list number i of the determination processing list 701, and the resulting value is recorded as the value of the comprehensive determination 708. Since the OR at list number 1 applies to this case, "not available" and "healthy" are deleted from "healthy/decayed/WSD/not available", and "decayed/WSD" is recorded in the comprehensive determination 708.

Returning to FIG. 6, the foregoing correction processing will be described.

In step S607, if the comprehensive determination made in the foregoing step S606 includes only "not available" (YES in step S607), the CPU 301 determines that the comprehensive determination at list number i of the determination processing list 701 is completed, and the processing proceeds to step S613. On the other hand, if the CPU 301 determines that the comprehensive determination does not include only "not available" (in FIG. 7A, "-") (NO in step S607), the processing proceeds to step S608, or processing for determining whether the comprehensive result includes "not available".

In step S608, if the CPU 301 determines that the comprehensive determination includes "not available" (YES in step S608), the processing proceeds to step S609. In step S609, the CPU 301 deletes "not available" from the comprehensive determination ORed in step S606. On the other hand, if, in step S608, the CPU 301 determines that the comprehensive determination does not include "not available" (NO in step S608), the processing proceeds to step S610, or processing for determining whether the comprehensive determination includes only "healthy".

In step S610, if the CPU 301 determines that the comprehensive determination includes only "healthy" (YES in step S610), the CPU 301 determines that the comprehensive determination at list number i of the determination processing list 701 is completed, and the processing proceeds to step S613. On the other hand, if, in step S610, the CPU 301 determines that the comprehensive determination does not include only "healthy" (NO in step S610), the processing proceeds to step S611, or processing for determining whether the comprehensive determination includes "healthy".

In step S611, if the CPU 301 determines that the comprehensive determination includes "healthy" (YES in step S611), the processing proceeds to step S612. In step S612, the CPU 301 deletes "healthy" from the comprehensive determination. The processing proceeds to step S613. On the other hand, if, in step S611, the CPU 301 determines that the comprehensive determination does not include "healthy" (NO in step S611), the processing proceeds to step S613.

After the foregoing processing, in step S613, the CPU 301 determines whether list number i of the determination processing list 701 is the maximum value. If list number i of the determination processing list 701 is the maximum value (YES in step S613), the comprehensive determination processing ends. On the other hand, if list number i of the determination processing list 701 is less than the maximum value (NO in step S613), the processing proceeds to step S614. In step S614, the CPU 301 adds 1 to list number i of the determination processing list 701. The processing returns to step S602. In the other words, the CPU 301 performs the processing of step S602 and the subsequent steps on the next list number of the determination processing list 701.

The above is the description of the comprehensive determination processing.

The comprehensive determination: position of state 1, 767, and the comprehensive determination: position of state 2, 768, illustrated in the determination list 750 are the ORs
of the positions corresponding to the inference results of the
respective states in the occlusal view 704, the front view
705, the left side view 706, and the right side view 707 of
the determination processing list 701 described above. For
example, at list number 1 of the determination processing
list 751, the comprehensive determination is "decayed/
WSD", i.e., includes a plurality of states. In such a case, the
positions of the respective states of the comprehensive
determination are recorded as positions corresponding to the
respective states in the comprehensive determination, such
as "delayed" and "WSD". Specifically, with the comprehen-
sive determination "decayed" at list number 1 of the deter-
mination processing list 751 as state 1, the comprehensive
determination: position of state 1, 767, is "distal proximal
surface". Similarly, with the comprehensive determination
"WSD" as state 2, the comprehensive determination: posi-
tion of state 2, 768, is "labial surface". The foregoing states
1 and 2 are not restrictive. The number of states can be
adjusted like state 1, state 2, state 3, . . . , depending on the
number of states in the comprehensive determination.

As illustrated in the determination list 770, information
about the state of each tooth may be configured as table
information indicating which state is detected at each of the
positions of a single tooth (such as the labial surface and the
mesial proximal surface). For example, in the case of the
tooth at list number 1 of a determination processing list 771,
the states of an occlusal view: occlusal surface 774, labial
surface (or buccal surface) 775, palatal surface (or lingual
surface) 776, mesial proximal surface 777, and distal proxi-
mal surface 778 are recorded. The states of a front view:
occlusal surface 779, labial surface (or buccal surface) 780,
palatal surface (or lingual surface) 781, mesial proximal
surface 782, and distal proximal surface 783, the states of a
left side view: occlusal surface 784, labial surface (or buccal
surface) 785, palatal surface (or lingual surface) 786, mesial
proximal surface 787, and distal proximal surface 788, and
the states of a right side view: occlusal surface 789, labial
surface (or buccal surface) 790, palatal surface (or lingual
surface) 791, mesial proximal surface 792, and distal proxi-
mal surface 793 are similarly recorded.

In such a case, comprehensive determinations at list
number 1 of the determination processing list 771 can be
processed with the foregoing occlusal surface, labial surface
(or buccal surface), palatal surface (or lingual surface),
mesial proximal surface, and distal proximal surface as the
targets processed in steps S602 to S605 in the foregoing
flowchart of FIG. 6. The resulting comprehensive determi-
nations at list number 1 of the determination processing list
771 are as illustrated in the comprehensive determinations
794, 795, 796, 797, 798, and 799.

The above can be applied to list numbers 1 to 32 (maxi-
mum value) of the determination processing list 771.
<Determination Lists>

FIG. 7A illustrates the determination list 700 listing the
determinations made by the inference processing and the
results of the comprehensive determinations.

The determination list 700 is an information list for
acquiring processing targets, the progress of inference, and
determination information in performing the comprehensive
determination processing illustrated in FIG. 6. The determi-
nation processing list 701 lists serial numbers for managing
the order of processing. An upper/lower jaw 702 is a list of
information for determining whether the jaw is an upper jaw
or a lower jaw. A dental formula number 703 is a list of
dental formula numbers of the teeth in the upper and lower
jaws. The occlusal view 704, the front view 705, the left side view 706, and the right side view 707 are state description
lists corresponding to five-view imaging in dental diagnosis.
The states are described at positions to which the inference
results of FIG. 4 correspond. The comprehensive determi-
nation 708 is a list of the comprehensive determinations of
the states corresponding to the respective tooth types, made
based on the flowchart of FIG. 6.

FIGS. 7B-1 to 7B-3 illustrate the determination list 750
listing position information about the tooth states along with
the tooth states as the results of the comprehensive deter-
minations when the position information about the tooth
states is output along with the tooth states as the determi-
nations made by the inference processing. Although not
illustrated in the diagram, the determination list 750 is an
information list for acquiring the processing targets, the
progress of inference, and determination information in
performing comprehensive determination processing similar
to in FIG. 6. The determination processing list 751 lists
serial numbers for managing the order of processing. An
upper/lower jaw 752 is a list of information for determining
whether the jaw is an upper jaw or a lower jaw. A dental
formula number 753 is a list of the dental formula numbers
of the teeth in the upper and lower jaws. An occlusal view:
state 754, a front view: state 757, a left side view: state 760,
and a right side view: state 763 are state description lists
corresponding to the five-view imaging in dental diagnosis.
An occlusal view: position of state 1, 755, an occlusal view:
position of state 2, 756, a front view: position of state 1, 758,
a front view: position of state 2, 759, and a left side view:
position of state 1, 761, are lists of position information
about the respective states. Similarly, a left side view:
position of state 2, 762, a right side view: position of state
1, 764, and a right side view: position of state 2, 765, are lists
of position information about the respective states. If a state
description list includes a plurality of states, position infor-
mation about each of the states is described in association
with the state to clarify the position information. While the
positions of states 1 and 2 are described to be included here,
state description lists of state position information may be
added if there are more states. To make the position infor-
mation about the respective states understandable, a specific
description rule such as use of a delimiter "I" as in "position
of state 1/position of state 2" may be established, for
example. The states and their position information are
described in where the inference results of FIG. 4 corre-
spond to.

The comprehensive determination 766, the comprehen-
sive determination: position of state 1, 767, and the com-
prehensive determination: position of state 2, 768, are lists
of the comprehensive determinations of the states for the
respective tooth types, made based on the flowchart of FIG.
6.

FIGS. 7C-1 to 7C-4 illustrate the determination list 770
describing the states constituting the inference results of
each tooth. The determination list 770 lists which state is
detected at each of the positions (such as the labial surface
and the mesial proximal surface) of a tooth. The compre-
hensive determination 794 at list number 1 of the determi-
nation processing list 771 records the result obtained by
processing the states detected at list number 1 of the deter-
mination processing list 771 based on the flowchart of FIG.
6 described above. The comprehensive determination:
occlusal surface 795 records the result obtained by process-
ing the detection result of the occlusal view: occlusal surface
774, the detection result of the front view: occlusal surface
779, the detection result of the left side view: occlusal
surface 784, and the detection result of the right side view:

occlusal surface 789 based on the flowchart of FIG. 6 described above. The comprehensive determination: labial (buccal) surface 796, the comprehensive result: palatal (lingual) surface 797, the comprehensive result: mesial proximal surface 798, and the comprehensive result: distal proximal surface 799 are similarly processed and recorded. While FIGS. 7C-1 to 7C-4 illustrate no value at list numbers 2 to 32, the values are determined and recorded as with list number 1 of the determination processing list 771 described above.

<Dental Electronic Medical Record Display Terminal User Interface (UI)>

Figure 8:
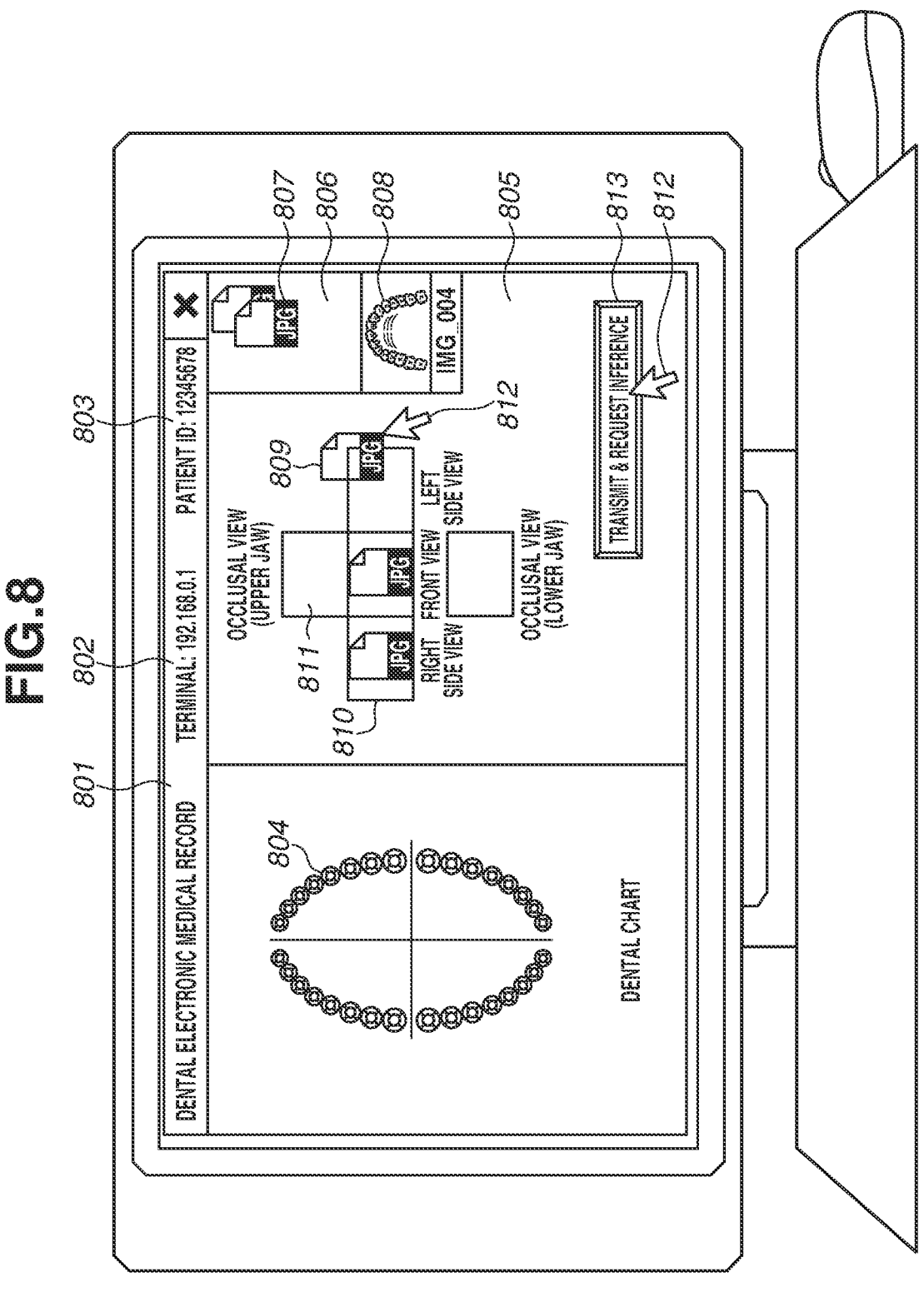
FIG. 8 is a diagram illustrating an example of a dental electronic medical record display terminal user interface (UI) in associating captured images with an occlusal surface according to the first exemplary embodiment.

FIG. 8 illustrates a dental electronic medical record display terminal UI for associating captured images with the occlusal surface. This diagram illustrates operations on the dental electronic medical record display terminal UI in adding imaging plane information to the captured images on the dental electronic medical record display terminal 103 before the image processing apparatus 101 is requested to infer tooth types and states as described in step S236 of FIG. 2C. This UI corresponds to one displayed in step S232, for example.

The user checks images in an image list 806 including images to which image plane information is not added yet on a preview area 808 in a dental electronic medical record 801, and operates an operation cursor 812 to drag and drop a target image 809 to add image plane information into an unassociated imaging plane area 811. The imaging plane information is thereby added to the target image 809. As another method for adding imaging plane information, a program for checking a predetermined UI for files and adding the imaging plane information to the images as exchangeable image file format (Exif) tags may be used. Alternatively, an imaging plane information tag indicating which plane to capture an image may be selected via a graphical user interface (GUI) of the imaging apparatus 108 in advance before imaging. The imaging plane information is then automatically added to the captured image as an Exif tag of the image. In such a case, the image processing apparatus 101 acquires images to which the imaging plane information is already added, and the operation for adding the imaging plane information is not needed. Alternatively, imaging plane information may be inferred with a captured image as an input, using a trained model that is trained with images of the respective imaging planes as inputs and imaging plane information to be added as training data. The imaging plane information output as an inference result is then added to the captured image. In such a case, a deep learning algorithm can be used for the learning model, for example. Alternatively, the filename of the image may be simply changed on the dental electronic medical record display terminal 103 by operating an input I/F. An example will be described below, which is not intended to limit the method. The processing corresponding to steps S232 to S235 is performed by such a procedure.

If the user presses a request button 813 using the operation cursor 812 after the addition of the imaging plane information to the inference target images, the imaging plane information is stored and the image processing apparatus 101 is requested to perform inference in step S236.

Figure 9A:
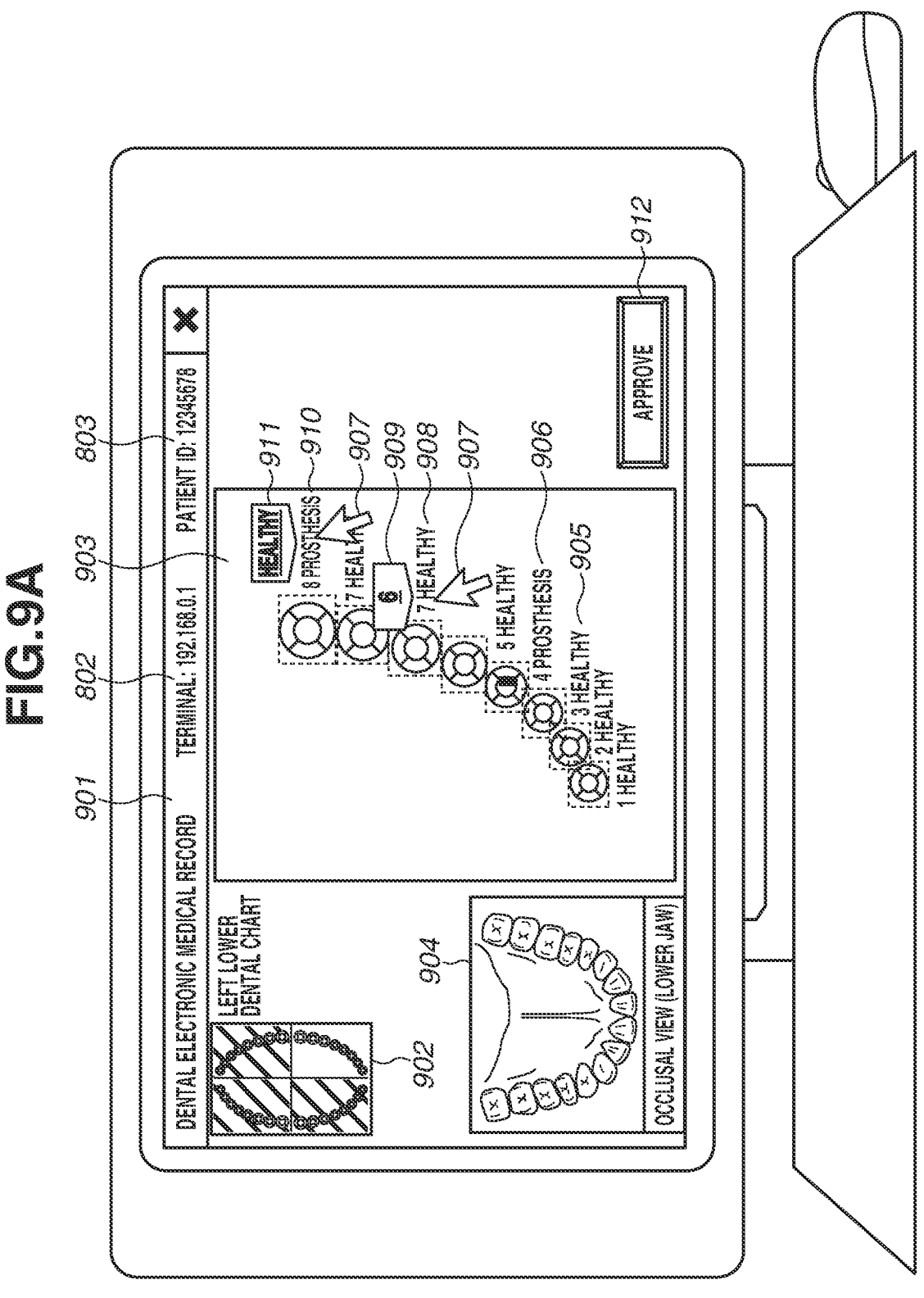
FIGS. 9A and 9B are diagrams illustrating examples of the dental electronic medical record display terminal UI in checking and correcting inference results according to the first exemplary embodiment.

FIG. 9A illustrates a dental electronic medical record display terminal UI for checking and correcting the inference results. This UI is displayed in response to the execution of step S244, for example. Using this UI, the dentist performs operations for checking, correcting, and approving the inference results on the dental electronic medical record display terminal 103 as described with reference to step S245 of FIG. 2C.

Inference results 903 in the left lower dental chart indicate the inference result information, or dental formula numbers and states, as fitted to the dental chart. The numerical values of the inference results 903 in the left lower dental chart indicate the tooth types, and the character strings the tooth states. Character strings 905 and 906 indicate a healthy state and a prosthesis state, respectively, which are correctly inferred. A character string 910 indicates a prosthesis state incorrectly inferred despite the healthy tooth state. To check and correct the inference result, the user selects the character string 910 using an operation cursor 907, and enters a correct tooth state 911 into an input field displayed above simultaneously with the selection, whereby the character string 910 is overwritten. An incorrectly inferred tooth type 908 is similarly overwritten with a correct type 909. If an approval button 912 is pressed, an approval notification is issued to the dental electronic medical record system 104.

Figure 9B:
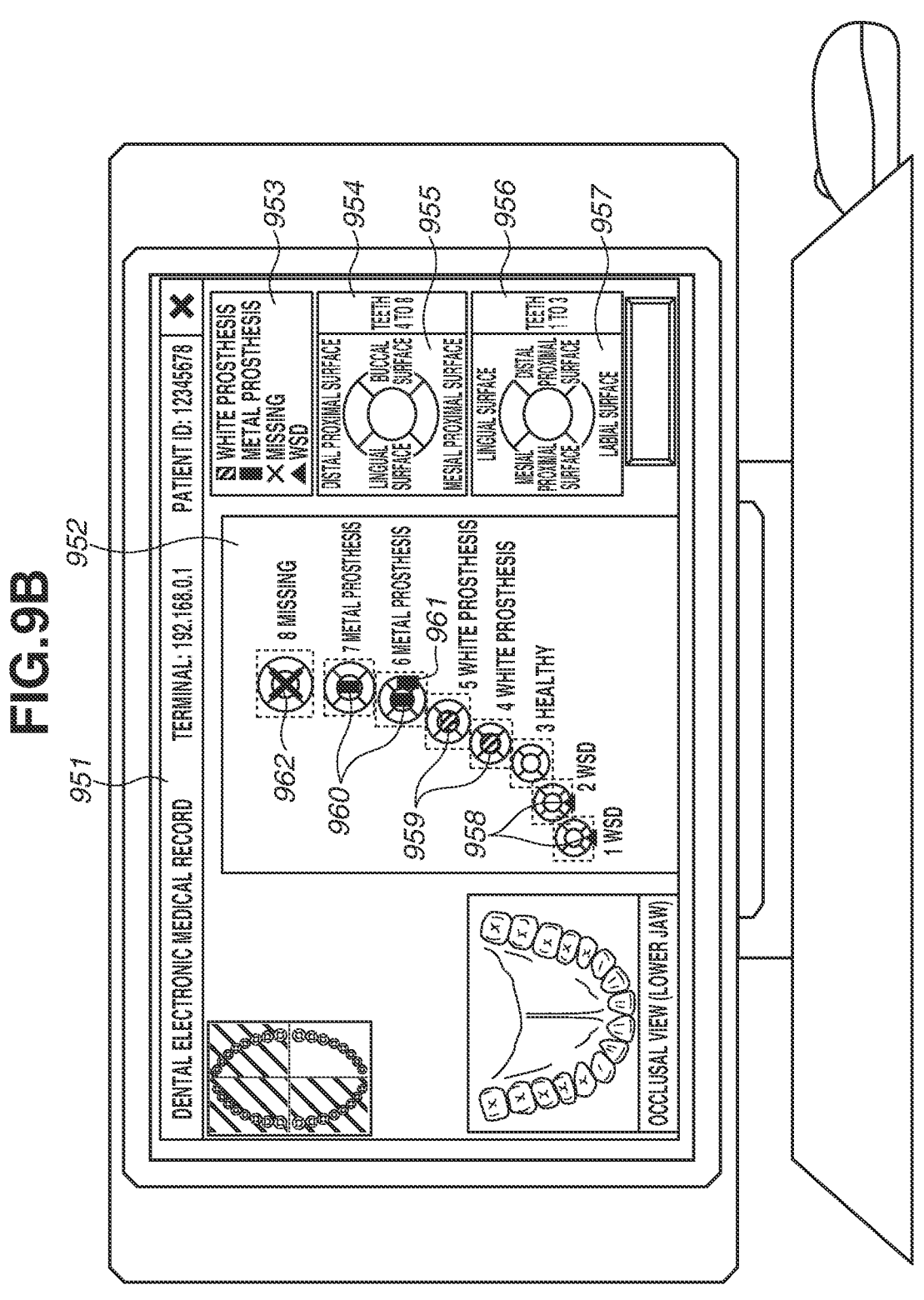

FIG. 9B illustrates the dental electronic medical record display terminal UI where the states of the comprehensive determinations, or the inference results, and the position information about the states are reflected on the dental chart.

Inference results 952 in the left lower dental chart indicate the inference result information, or dental formula numbers and states, as fitted to the dental chart based on the position information about the states. The values of the comprehensive determination 766, the comprehensive determination: position of state 1, 767, and the comprehensive determination: position of state 2, 768, at list numbers 25 to 32 of the determination processing list 751 in the determination list 750 are reflected on this UI. A display section 953 displays the character strings of the states and icons representing the states. Display sections 955 and 957 display position information corresponding to the states at dental formula numbers 4 to 8 and dental formula numbers 1 to 3, respectively. Although not illustrated in the diagram, the information in the determination list 750 and the information in the display sections 953, 955, and 957 are associated with each other. To switch the display of the dental electronic medical record display terminal 103, for example, state information included in the information of the determination list 750 is given to the tooth positions by using a program capable of displaying tooth states at respective positions of a dental formula. Examples of the state information include information such as 1 for white prosthesis, 2 for metal prosthesis, 3 for missing, and 4 for WSD. Even if a tooth does not have position information, like a missing tooth 962, display can be provided using state information alone. If the comprehensive determinations at both dental formula numbers "right lower 1" and "right lower 2" are "WSD" and the comprehensive determination: position of state 1 is "labial surface", display 958 is provided where icons representing WSD are reflected on the labial surface positions at tooth numbers "right lower 1" and "right lower 2" in the dental chart as illustrated in the display section 957. In display 959 to 962, the states of the comprehensive determinations, or the inference results, and the position information about the states are similarly reflected on the dental chart.

As described above, the image processing apparatus 101 according to the present exemplary embodiment can detect symptoms such as tooth decay occurring between front teeth and WSD occurring at tooth roots from the front view, the left side view, and the right side view. The image processing apparatus 101 can also detect tooth delay occurring in the recesses in the molars and prostheses from the occlusal view.

Moreover, the results of the comprehensive determinations can be output by taking both into account. The image processing apparatus 101 according to the present exemplary embodiment can thus detect tooth states more accurately. Since all the images are acquired using visible light image data, oral conditions difficult to determine using an X-ray image, such as the state of the gingiva, can be appropriately determined.

In the first exemplary embodiment, a model for inferring tooth states is described to be provided for each type of imaging plane. However, for example, incisors and molars differ greatly in shape and thus have different visual features even if the states are the same. The tooth states can be inferred more accurately by using models suitable for respective dental formula numbers if the tooth positions and numbers are successfully inferred at the previous stage of the inference of the tooth states. A second exemplary embodiment deals with a case where models to be used in inferring the tooth states are switched based on the inference results of the dental formula numbers.

In the present exemplary embodiment, a description of portions similar to those of the foregoing exemplary embodiment will be omitted, and a configuration characteristic of the present exemplary embodiment will mainly be described.

A dental formula inference processing step S240 performed by the image processing apparatus 101 will be described with reference to FIG. 10. The flowchart of FIG. 10 is started in response to execution of the dental formula inference processing step S240.

In steps S1001 to S1003, the CPU 301 performs processing similar to that of steps S401 to S403 in FIG. 4, respectively.

In step S1004, the CPU 301 clips a tooth region where the tooth state is not inferred yet among the tooth regions detected in step S1003 from the input image.

In step S1005, the CPU 301 selects and reads a tooth state classification model corresponding to the tooth region clipped out in step S1004 based on the inference result of the dental formula number obtained in step S1003. The tooth state classification model can be selected by any of the following methods (1) to (3). (1) A tooth state classification model is prepared for each dental formula number on each of the left and right, upper and lower sides. For example, if a tooth region is inferred to be "right upper 6" in step S1003, a tooth state classification model for "right upper 6" is selected. (2) A tooth state classification model common between the left and right sides is prepared for each dental formula number. For example, if a tooth region is inferred to be "right upper 6" in step S1003, a tooth state classification model for "upper 6" is selected. (3) A tooth state classification model is prepared for each tooth type. For example, if a tooth region is inferred to be "right upper 6" in step S1003, a tooth state classification model for molars is selected since the 6th tooth is a molar.

In step S1006, the CPU 301 infers the tooth state using the tooth state classification model read in step S1005. As a result, the inference result of the tooth state for one tooth region is obtained.

In step S1007, the CPU 301 records the dental formula number and the inference result obtained in step S1006 in association with each other.

In step S1008, if the tooth states of all the tooth regions have been determined (YES in step S1008), the processing proceeds to step S1009. If not (NO in step S1008), the processing proceeds to step S1004.

In step S1009, the CPU 301 outputs the dental formula numbers and states of the teeth.

As described above, the image processing apparatus 101 according to the present exemplary embodiment switches the models to be used in inferring a tooth state based on the inference result of the dental formula number. This enables more accurate inference of the tooth states.

In the second exemplary embodiment, the models to be used in inferring a tooth state is described to be switched in the dental formula inference processing step S240 based on the inference result of the dental formula number. However, a correct tooth state classification model is unable to be selected and a correct inference result of the tooth state is unable to be obtained if the inference result of the dental formula number is erroneous. A third exemplary embodiment deals with a case of performing processing for correcting inference results likely to be erroneous using inference accuracy.

In the present exemplary embodiment, a description of portions similar to those of the foregoing exemplary embodiments will be omitted, and a configuration characteristic of the present exemplary embodiment will mainly be described.

Figure 11:
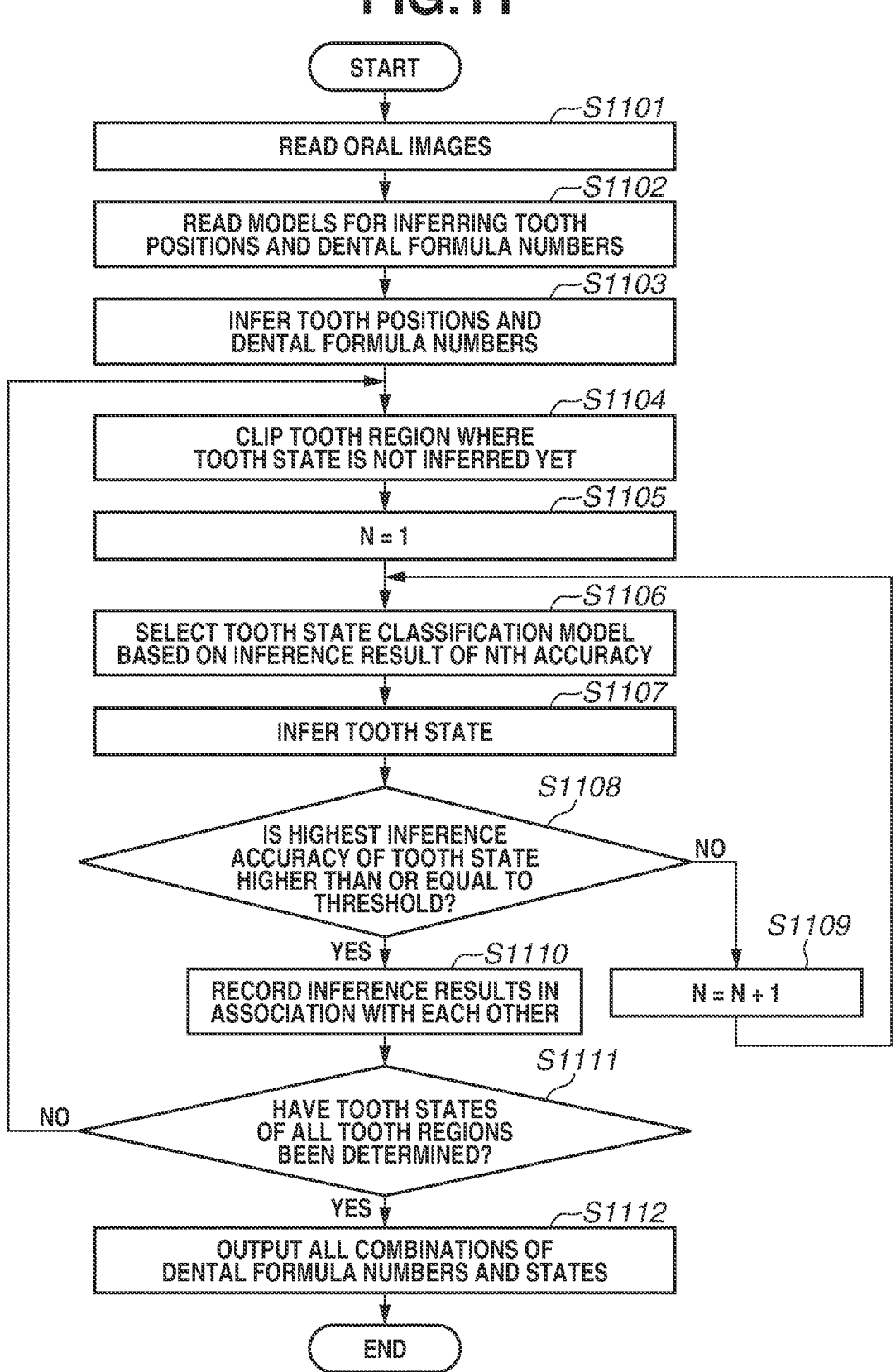
FIG. 11 is a flowchart illustrating dental formula inference processing according to a third exemplary embodiment.

A dental formula inference processing step S240 performed by the image processing apparatus 101 will be described with reference to FIG. 11. The flowchart of FIG. 11 is started in response to execution of the dental formula inference processing step S240.

In steps S1101 to S1104, the CPU 301 performs processing similar to that of steps S1001 to S1004 in FIG. 10, respectively.

In step S1105, the CPU 301 substitutes 1 into an integer N.

In step S1106, the CPU 301 selects and reads a tooth state classification model based on the inference result of the Nth accuracy among the inference results of the dental formula numbers corresponding to the tooth region clipped out in step S1104, obtained in step S1103. The method for selecting the tooth state classification model is similar to in the processing described in step S1005 of FIG. 10.

In step S1107, the CPU 301 performs processing similar to that of step S1006 in FIG. 10.

In step S1108, if, as a result of inference of the tooth state in step S1107, the highest accuracy of the inference result so far is higher than or equal to a threshold (YES in step S1108), the processing proceeds to step S1110. If not (NO in step S1108), the processing proceeds to step S1109.

In step S1109, the CPU 301 adds 1 to the integer N. The processing proceeds to step S1106.

In steps S1110 to S1112, the CPU 301 performs processing similar to that of steps S1007 to S1109 in FIG. 10, respectively.

Instead of branching the processing based on the accuracy of the inference result of the tooth state in step S1108, the CPU 301 may perform steps S1106 and S1107 a predetermined number of times and then employ the tooth state of the highest inference accuracy.

As described above, if the accuracy of the inference result of the tooth state is low, the image processing apparatus 101 according to the present exemplary embodiment corrects the reference result of the dental formula number in a retroactive manner, and infers the tooth state again. The inference result of the dental formula number can thereby be corrected.

The foregoing exemplary embodiments have dealt with a technique for inferring tooth positions and numbers in the dental formula inference processing step S240 using a model generated by machine learning. In fact, the model can sometimes be unable to infer a correct dental formula number. In the third exemplary embodiment, the inference result of the dental formula number is described to be corrected if the accuracy of the inference result of the tooth state is low. However, if a tooth is erroneously inferred to be a tooth of similar shape, like a premolar to be a molar, a drop in the accuracy of inference of the tooth state may not be obvious.

Figure 12A:
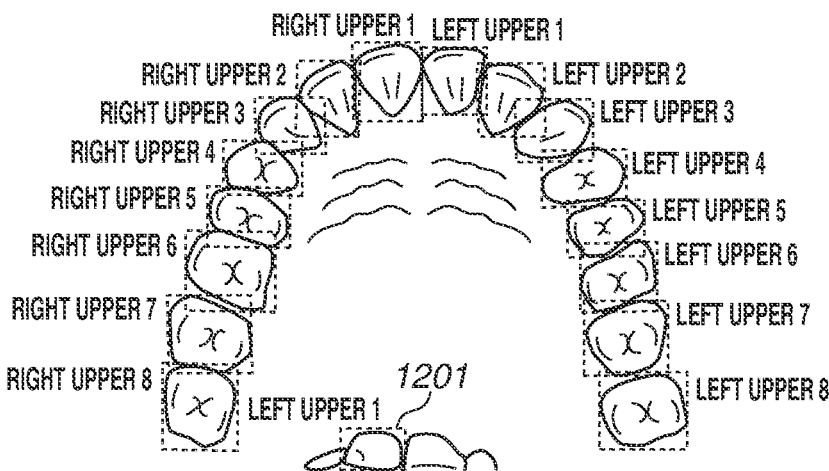

FIGS. 12A to 12E illustrate examples where the inference model fails to infer a correct tooth position or number. FIG. 12A illustrates a case where a mirror is inserted into the mouth cavity to capture an image of the teeth in the upper jaw on the mirror, and a tooth 1201 outside the mirror happens to be included in the image and is erroneously detected to be "left upper 1".

Figure 12B:
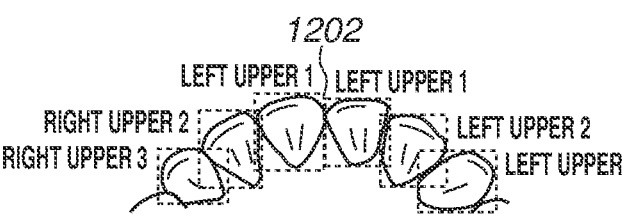

Since this image is intended to detect the teeth in the upper jaw, the teeth in the lower jaw are desirably excluded from detection. Moreover, part of a tool used in capturing the oral image or nondental tissue in the mouth cavity can be inferred to be a tooth. FIG. 12B illustrates a case where a right central incisor 1202 (right upper 1) is erroneously inferred to be the left central incisor (left upper 1). FIG. 12C illustrates a case where a second premolar 1203 (right upper 5) and a first molar 1204 (right upper 6) are both inferred to be a first molar (upper right 6). FIG. 12D illustrates a case where two detection results overlap at the position of a second premolar 1207 (right upper 5), and are inferred to be a first premolar (right upper 4) and a second premolar (right upper 5). FIG. 12E illustrates a case where a second premolar 1210 (left upper 5) and a first molar 1211 (left upper 6) are inferred the other way around. While these errors concern an occlusal view image, inference errors can also occur in front and side view images.

A fourth exemplary embodiment deals with an image processing apparatus that, in a case where correct dental formula numbers are not successfully inferred in the dental formula inference processing step S240, determines whether the inference results are correct in terms of dentition, and if not, corrects the inference results. For ease of description, the present exemplary embodiment deals only with either upper jaw images or lower jaw images unless otherwise specified.

In the present exemplary embodiment, a description of portions similar to those of the foregoing exemplary embodiments will be omitted, and a configuration characteristic of the present exemplary embodiment will mainly be described.

Figure 13:
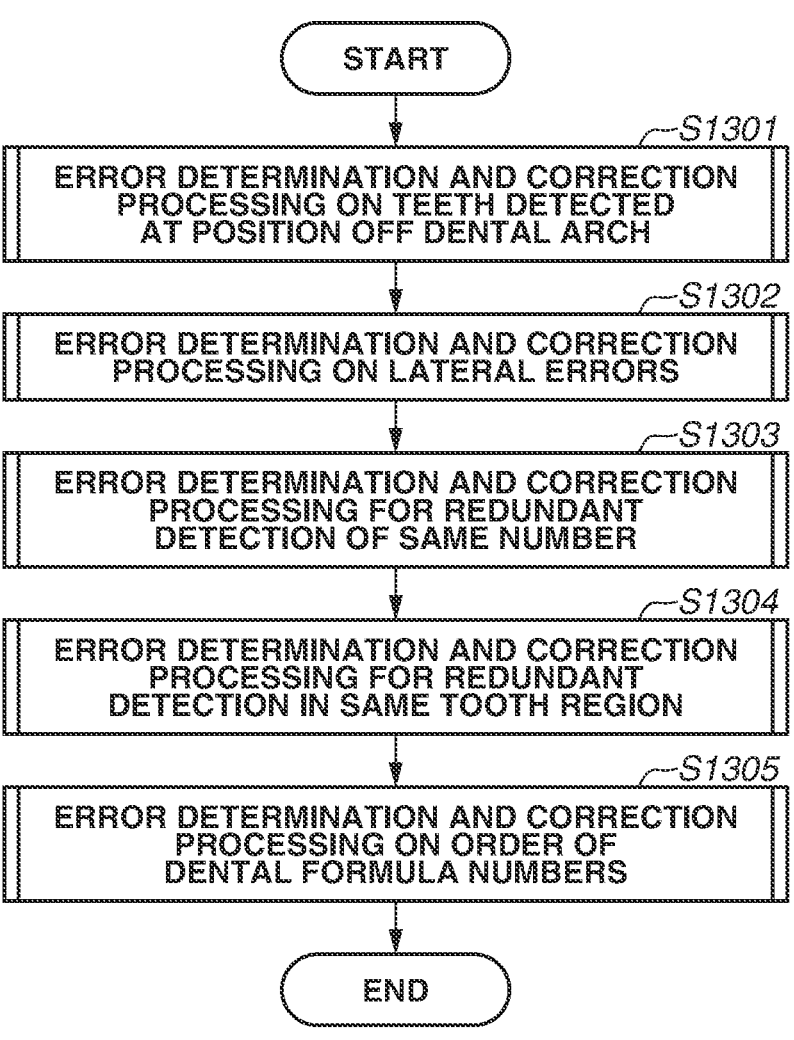
FIG. 13 is a flowchart for determining whether inference results are correct in terms of dentition according to the fourth exemplary embodiment.

Processing for determining whether inference results are correct in terms of dentition after the inference of the tooth positions and numbers in step S403 of FIG. 4, and if not, correcting the inference results will be described with reference to FIG. 13. The flowchart of FIG. 13 is performed before step S404 of FIG. 4, in response to the completion of step S403.

In step S1301, the CPU 301 performs error determination and correction processing on teeth detected at positions off the dental arch. This processing can determine and correct errors such as illustrated in FIG. 12A. Detailed processing will be described below with reference to FIG. 14.

In step S1302, the CPU 301 performs lateral error determination and correction processing on the dental formula numbers.

This processing can determine and correct errors such as illustrated in FIG. 12B. Detailed processing will be described below with reference to FIGS. 15A to 15F.

In step S1303, the CPU 301 performs error determination and correction processing for a case where a tooth of the same number is detected a plurality of times. This processing can determine and correct errors such as illustrated in FIG. 12C. Detailed processing will be described below with reference to FIGS. 16A and 16B.

In step S1304, the CPU 301 performs error determination and correction processing for a case where a plurality of dental formula numbers is detected in the same tooth region. This processing can determine and correct errors such as illustrated in FIG. 12D. Detailed processing will be described below with reference to FIGS. 17A and 17B.

In step S1305, the CPU 301 performs error determination and correction processing on the order of dental formula numbers.

This processing can determine and correct errors such as illustrated in FIG. 12E. Detailed processing will be described with reference to FIGS. 18A and 18B.

Figure 14:
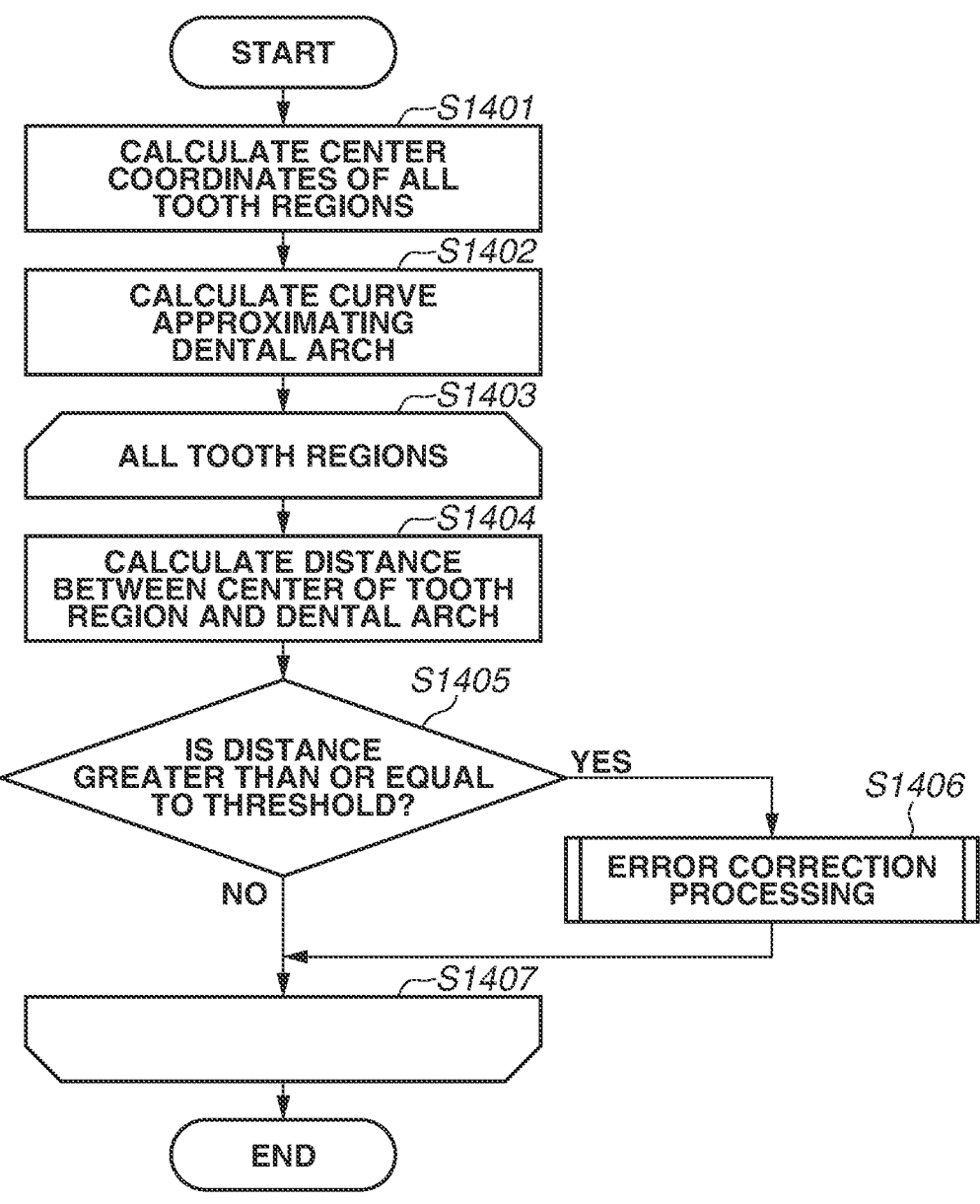
FIG. 14 is a flowchart illustrating error determination and correction processing on teeth detected at positions off a dental arch according to the fourth exemplary embodiment.

Next, the error determination and correction processing on teeth detected at positions off the dental arch in an occlusal view image in step S1301 of FIG. 13 will be described with reference to the flowchart of FIG. 14.

In step S1401, the CPU 301 calculates the respective center coordinates of all the tooth regions detected in step S403 of FIG. 4.

In step S1402, the CPU 301 calculates a curve representing the dental arch. In the present exemplary embodiment, the CPU 301 calculates an nth degree polynomial approximating the dental arch from the center coordinates of the tooth regions by the least squares method.

Steps S1403 to S1406 constitute loops where the CPU 301 processes the tooth regions in order. The CPU 301 performs the following processing on each of the tooth regions.

In step S1404, the CPU 301 calculates a distance between the center of the tooth region and the dental arch calculated in step S1402.

In step S1405, if the distance calculated in step S1404 is greater than or equal to a threshold set in advance (YES in step S1405), the processing proceeds to step S1406 since the tooth region is erroneous. If not (NO in step S1405), the processing proceeds to step S1407 to perform the next loop. The threshold here may be variable from one dental formula number to another, for example, because the lateral incisors are often located far from the dental arch compared to the other teeth.

In step S1406, the CPU 301 performs error correction processing on the dental formula number of the tooth detected at a position off the dental arch. In this error correction processing, the CPU 301 automatically deletes the inference result of the dental formula number of the tooth detected at a position off the dental arch from the detection results of step S403 in FIG. 4.

Figure 15A:
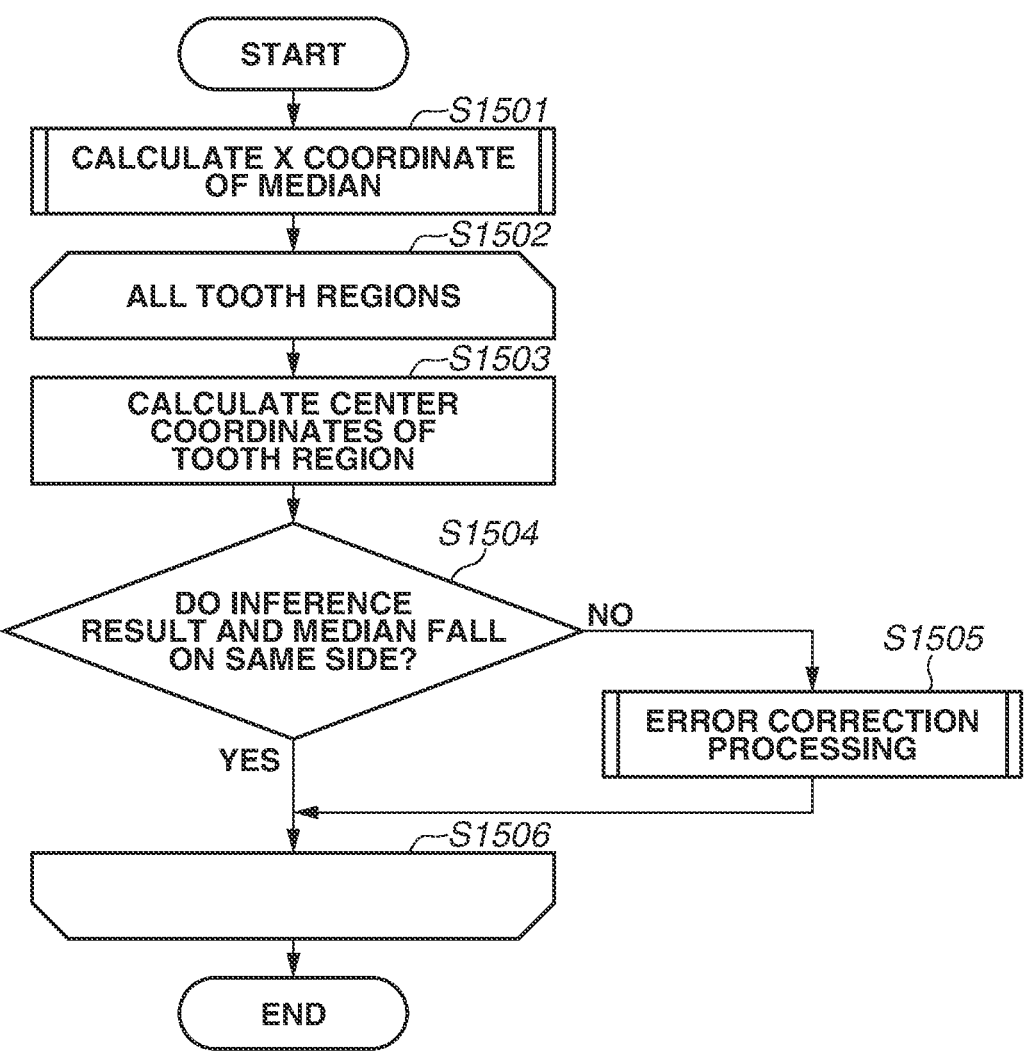
FIG. 15A is a flowchart illustrating lateral error determination and correction processing on dental formula numbers according to the fourth exemplary embodiment.

Next, the lateral error determination and correction processing on the dental formula numbers in step S1302 of FIG. 13 will be described with reference to the flowchart of FIG. 15A. This processing is performed on front and side view images.

In step S1501, the CPU 301 performs processing for calculating the X coordinate of a median in the input image. The median refers to between the two central incisors. The left and right teeth are distributed with the median at the center. Detailed processing will be described below with reference to FIG. 15B.

Steps S1502 to S1506 constitute loops where the CPU 301 processes the tooth regions in order. The CPU 301 performs the following processing on each of the tooth regions.

In step S1503, the CPU 301 calculates the center coordinates of the tooth region.

In step S1504, the CPU 301 compares the side where the inference result of the dental formula number of the tooth region falls, left or right, with the side of the X coordinate of the median calculated in step S1501 where the X coordinate of the center of the tooth region falls, left or right. If, as a result of the comparison, the sides are the same (YES in step S1504), the processing proceeds to step S1506 to perform the next loop. If not (NO in step S1504), the processing proceeds to step S1505 since the tooth region is erroneous.

In step S1505, the CPU 301 performs error correction processing on the dental formula number determined to be laterally erroneous. In this error correction processing, the CPU 301 automatically switches the side of the inference result of the dental formula number determined to be laterally erroneous.

Figure 15B:
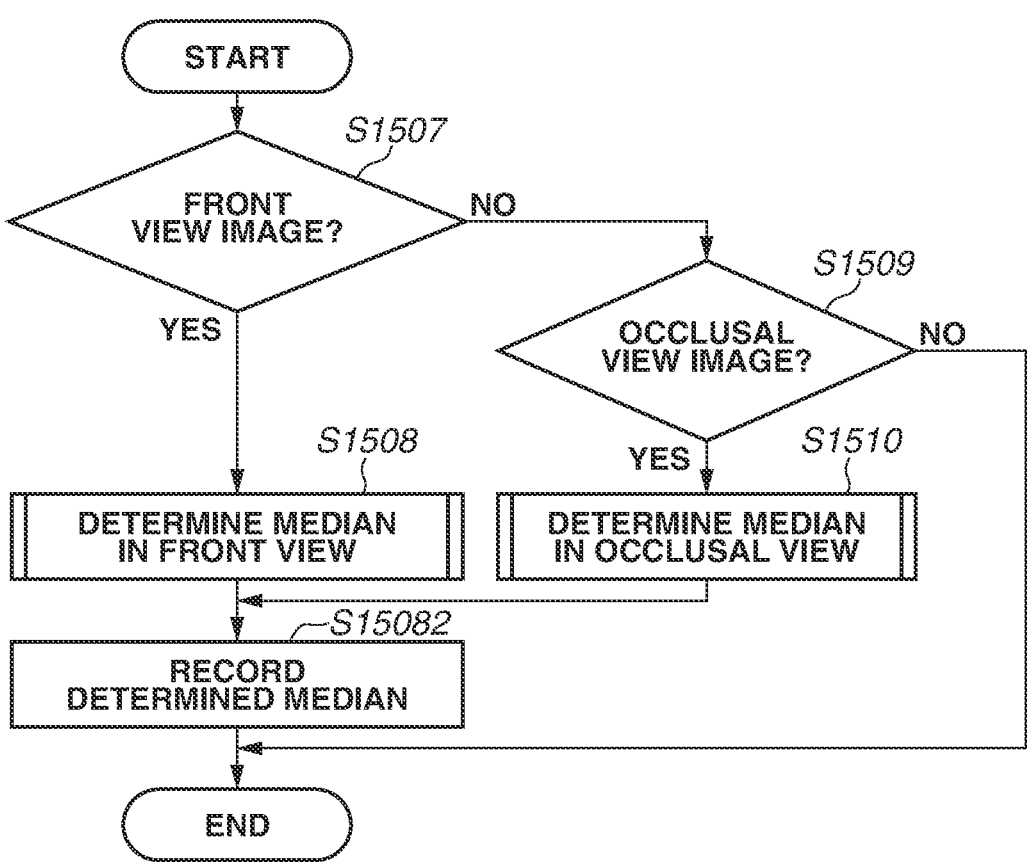
FIG. 15B is a flowchart illustrating processing for calculating an X coordinate of a median according to the fourth exemplary embodiment.

Next, the processing for calculating the X coordinate of the median in step S1501 of FIG. 15A will be described with reference to FIG. 15B.

In step S1507, if the input image is a front view (YES in step S1507), the processing proceeds to step S1508. If not (NO in step S1507), the processing proceeds to step S1509. In step S1508, the CPU 301 starts processing for determining the median in the front view image. Details of this processing will be described below with reference to FIG. 15C.

In step S15082, the CPU 301 records the determined median in a memory or file.

In step S1509, if the input image is an occlusal view (YES in step S1509), the processing proceeds to step S1510. If not (NO in step S1509), the processing ends without performing the processing for determining the median since the input image is a side view.

In step S1510, the CPU 301 starts processing for determining the median in the occlusal view image. Details of this processing will be described below with reference to FIG. 15D.

Figure 15C:
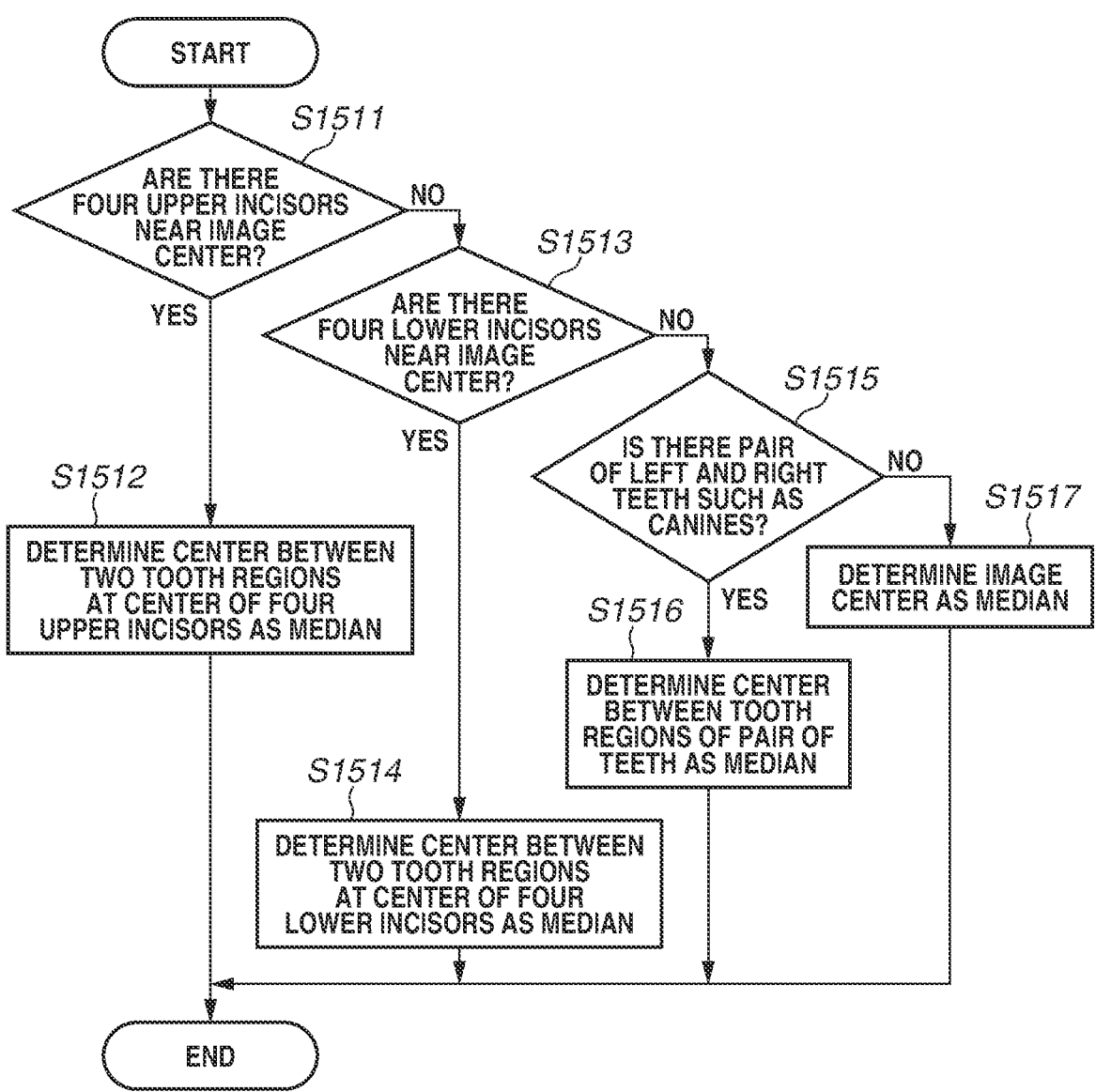
FIG. 15C is a flowchart illustrating processing for determining the median in a front view according to the fourth exemplary embodiment.

Next, the processing for calculating the X coordinate of the median from the front view image in step S1508 of FIG. 15B will be described with reference to FIG. 15C.

In step S1511, the CPU 301 determines whether there are four upper incisors near the center of the image, using the tooth types inferred in step S403. For example, FIG. 35A illustrates a state where four upper incisors 3502 to 3505 are inferred in a front view image 3501. As can be seen, in a normal front view image, the upper incisors are located in front of the lower incisors and more likely to be correctly inferred. The upper incisors are therefore used to determine the median by priority over the lower incisors. If there are four upper incisors (YES in step S1511), the processing proceeds to step S1512. If not (NO in step S1511), the processing proceeds to step S1513.

In step S1512, the CPU 301 determines the centers of the respective tooth regions of the two at the center of the four upper incisors, and determines the center between the X coordinates thereof as a median 3506. The processing ends.

In step S1513, the CPU 301 determines whether there are four lower incisors near the center of the image, using the tooth types inferred in step S403. If there are four lower incisors (YES in step S1513), the processing proceeds to step S1514. If not (NO in step S1513), the processing proceeds to step S1515.

In step S1514, the CPU 301 determines the centers of the respective tooth regions of the two at the center of the four lower incisors, and determines the center between the X coordinates thereof as the median. The processing ends.

In step S1515, the CPU 301 determines whether there is a pair of left and right teeth such as canines, central incisors, or lateral incisors in each set of upper or lower teeth in the image.

If there is any such pair (YES in step S1515), the processing proceeds to step S1516. If not (NO in step S1515), the processing proceeds to step S1517.

In step S1516, the CPU 301 determines the center between the tooth regions of the pair of teeth (for example, left and right upper canines), and determines the center of the X coordinates thereof as the median. The processing ends.

In step S1517, the CPU 301 determines the X coordinate of the center of the image as the median. The reason is that the front view image is captured in a comfortable imaging position compared to the occlusal view and side view images and without a mirror, and thus the center of the image is relatively likely to be the median. The processing ends.

Figure 15D:
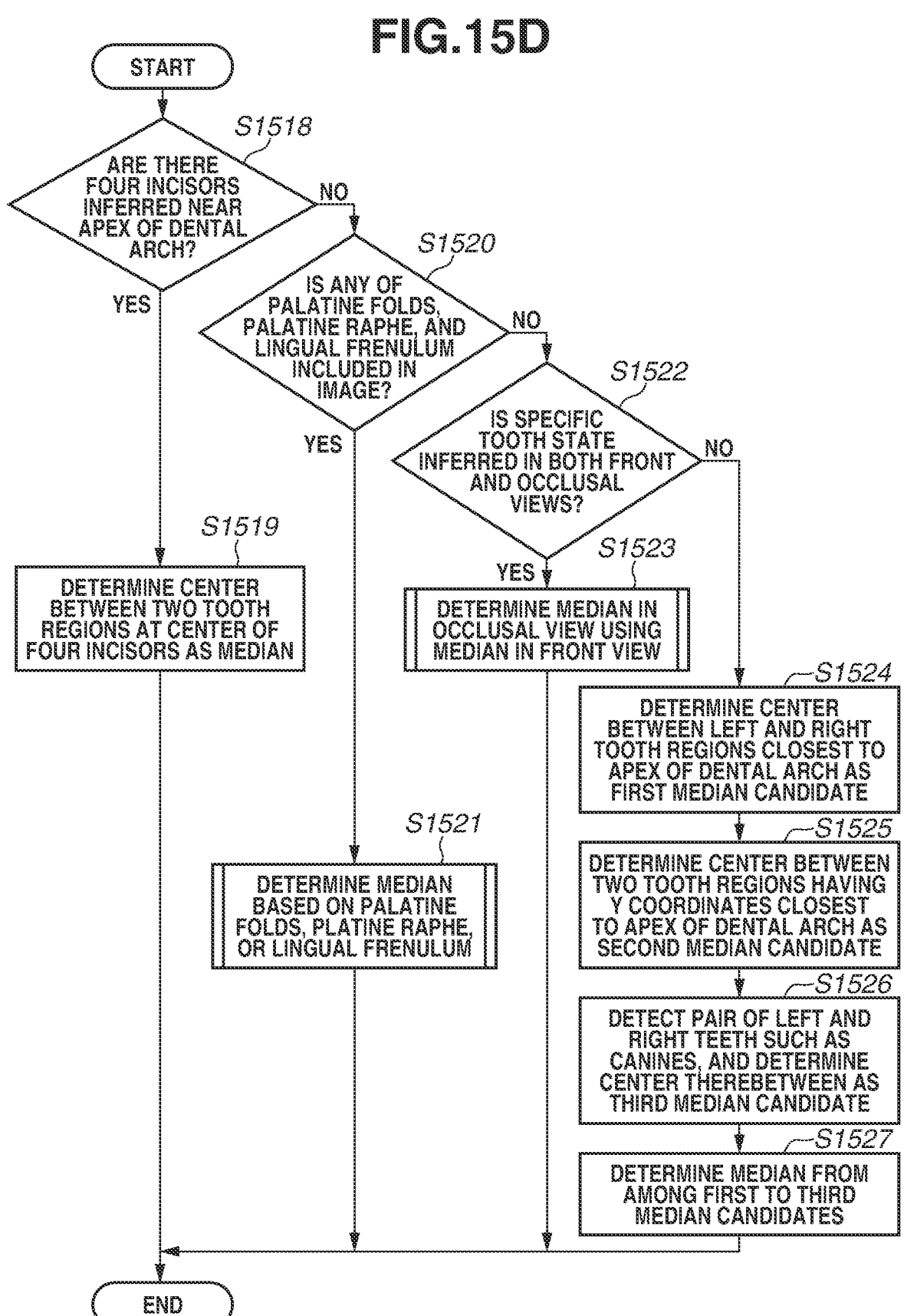
FIG. 15D is a flowchart illustrating processing for determining the median in an occlusal view according to the fourth exemplary embodiment.

Next, the processing for calculating the X coordinate of the median from the occlusal view image in step S1510 of FIG. 15B will be described with reference to FIG. 15D.

In step S1518, the CPU 301 determines whether there are four incisors inferred in step S403 near the apex of the curve approximating the dental arch, calculated in step S1402. If there are four incisors there (YES in step S1518), the processing proceeds to step S1519. If not (NO in step S1518), the processing proceeds to step S1520.

In step S1519, the CPU 301 determines the centers of the respective tooth regions of the two at the center of the four incisors, and determines the center between the X coordinates thereof as the median. The processing ends.

In step S1520, the CPU 301 determines whether any of the palatine folds, palatine raphe, and lingual frenulum is included in the image. The palatine folds refer to a wavy tissue 3509 in an image 3507 of the upper jaw in FIG. 35B, and the palatine raphe refers to a linear tissue 3510. The lingual frenulum refers to a linear tissue 3511 in an image 3508 of the lower jaw in FIG. 35B. In view of processing time, such tissues are desirably inferred in step S403 in parallel with the teeth. If such tissues are included (YES in step S1520), the processing proceeds to step S1521. If not (NO in step S1520), the processing proceeds to step S1522.

In step S1521, the CPU 301 determines the median based on such tissues. This processing will be described below with reference to FIG. 15E.

In step S1522, the CPU 301 determines whether a specific tooth state is inferred in the currently processed occlusal view image and the front view image. As employed herein, a specific tooth state refers to a state that can be determined in both the front view and the occlusal view, like a full metal crown (metal prosthesis covering an entire tooth). Note that in performing the dental formula inference processing step S240, the inference processing of the front view image is desirably performed before that of the occlusal view image, so that the inference about the front view image has been completed by this timing. This facilitates the determination of the median in the front view image to be used in the subsequent step S1523 in advance. Alternatively, if the inference processing of the front view image or the processing for determining the median in the front view image has not been completed by this point in time, such processing may be performed as an interrupt.

If a specific tooth state is inferred (YES in step S1522), the processing proceeds to step S1523. If not (NO in step S1522), the processing proceeds to step S1524.

In step S1523, the CPU 301 determines the median based on the median 3506 in the front view image and the specific tooth state in the front view and occlusal view images. This processing will be described with reference to FIG. 15F.

In step S1524, the CPU 301 searches for left and right teeth closest to the apex of the dental arch, and determines the center between the X coordinates of the centers of the tooth regions as a first median candidate.

In step S1525, the CPU 301 calculates two tooth regions having Y coordinates closest to the apex of the dental arch among the inferred tooth regions. More specifically, in the case of an upper jaw image, the CPU 301 calculates two tooth regions of which the upper ends have the smallest Y coordinates. In the case of a lower jaw image, the CPU 301 calculates two tooth regions of which the lower ends have the largest Y coordinates. The CPU 301 then determines the center between the X coordinates of the centers of the tooth regions as a second median candidate.

In step S1526, like step S1516, the CPU 301 calculates a pair of left and right teeth such as canines, central incisors, or lateral incisors, and determines the center between the X coordinates of the centers of the tooth regions as a third median candidate. If there is no such pair of teeth, the CPU 301 does not determine a third median candidate.

In step S1527, the CPU 301 determines by majority vote or weighted majority vote the median from among the first to third median candidates. For improved processing speed, the processing of one or two of steps S1524 to S1526 may be omitted.

Of the foregoing processes, the median-determining processes illustrated in steps S1519, S1521, and S1523 are accurate but limited in applicability. For example, step S1519 is inapplicable to a patient without four incisors. Step S1521 is inapplicable if the lingual frenulum is hidden under the tongue during imaging. In the cases where such processes are inapplicable, a processing method of somewhat low accuracy but wide applicability, such as illustrated in steps S1524 to S1526, is therefore used. The median can thus be determined with high accuracy for an image to which the processing of high accuracy is available. Even without such an image, the median can be determined with some accuracy.

Figure 15E:
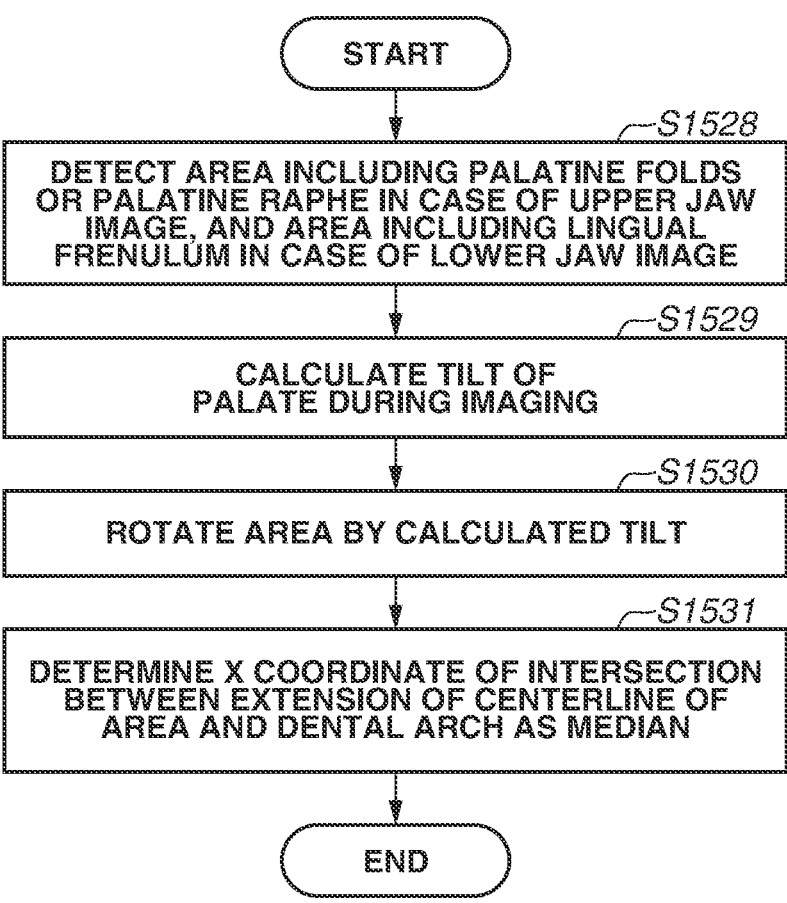
FIG. 15E is a flowchart illustrating processing for determining the median using a tissue in the mouth cavity according to the fourth exemplary embodiment.

Next, the processing for determining the median using the palatine folds, the palatine raphe, or the lingual frenulum in step S1521 of FIG. 15D will be described with reference to FIG. 15E.

In step S1528, the CPU 301 detects, in the case of an upper jaw image, an area including the palatine folds or the palatine raphe. In the case of a lower jaw image, the CPU 301 detects an area including the lingual frenulum. This processing may simply use the inference result used to make the determination in step S1520. Since the palatine raphe in the upper jaw is more difficult to detect than the palatine folds, the detection of the palatine raphe may be attempted first. If the detection fails, the palatine folds then may be detected. An area 3152 in FIG. 35B is an example of the palatine fold area. An area 3513 is an example of the lingual frenulum area.

In step S1529, the CPU 301 calculates the tilt of the palate during the imaging. The occlusal view image is difficult to capture, and may be tilted if captured by an inexperienced photographer. The processing of step S1529 is intended to correct the tilt. The tilt of the palate can be calculated by calculating a quadratic curve approximating the dental arch, and rotating the curve so that the curve is even on both sides of the apex. Alternatively, if a vertically extending tissue such as the palatine raphe or the lingual frenulum is detected, edges in the area may be detected by image processing. Vertically extending long edges are then extracted and approximated by straight lines, and the tilts of the lines are averaged to determine the tilt of the palate. Alternatively, if the palatine folds are detected, edges in the area may be extracted by image processing. Laterally extending long edges are then extracted and approximated by straight lines. The area is rotated so that the tilts of the lines are even on both sides of the area, and the rotation angle may be regarded as the tilt of the palate.

In step S1530, the CPU 301 rotates the area by the calculated tilt of the palate, like areas 3514 and 3515 in FIG. 35B.

In step S1531, the CPU 301 extends the centerline of the area, like centerlines 3516 and 3517 in FIG. 35B. The CPU 301 calculates an intersection 3518 or 3159 between the centerline and the dental arch, and determines the X coordinate of the intersection as the median.

Figure 15F:
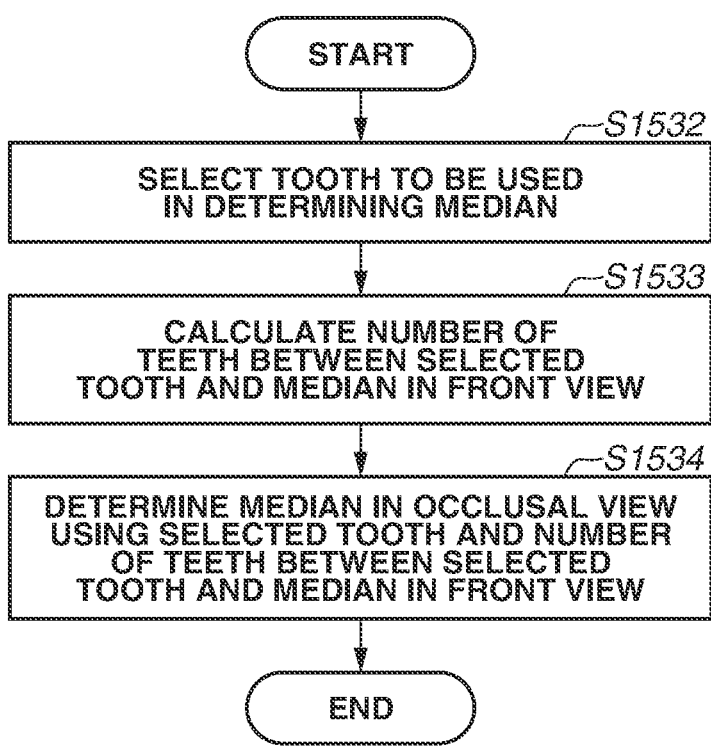
FIG. 15F is a flowchart illustrating processing for determining the median in an occlusal view using the median in a front view according to the fourth exemplary embodiment.

Next, the processing for determining the median in the occlusal view using the median in the front view in step S1523 of FIG. 15D will be described with reference to FIG. 15F.

In step S1532, the CPU 301 selects a tooth to be used in determining the median. If the occlusal view image to determine the median in is that of the upper jaw, the CPU 301 initially extracts the upper teeth in the front view image. On the other hand, if the occlusal view image is that of the lower jaw, the CPU 301 extracts the lower teeth in the front view image. The CPU 301 then extracts teeth having the "tooth state" described in step S1522.

Finally, the CPU 301 selects a tooth of which the X coordinate of the tooth region is closest to the center of the image from among the selected teeth. For example, in FIG. 35C, a tooth covered with a full metal crown is included as a tooth 3522 in a front view image 3520, and as a tooth 3523 in an occlusal view image 3521.

This tooth satisfies all the foregoing conditions, and is thus selected as the one to be used in determining the median.

In step S1533, the CPU 301 calculates the number of teeth between the selected tooth and the median in the front view image. For example, in FIG. 35C, the number of teeth between a median 3524 and the tooth 3522 is three.

In step S1534, the CPU 301 determines the median in the occlusal view using the selected tooth and the number of teeth between the selected tooth and the median in the front view. For example, in FIG. 35C, a median 3525 is determined to be between the third and fourth teeth from the tooth 3523 toward the center of the image in the X-axis direction.

By such processing, the medians in the front view and occlusal view images can be determined.

Figures 16A, 16B:
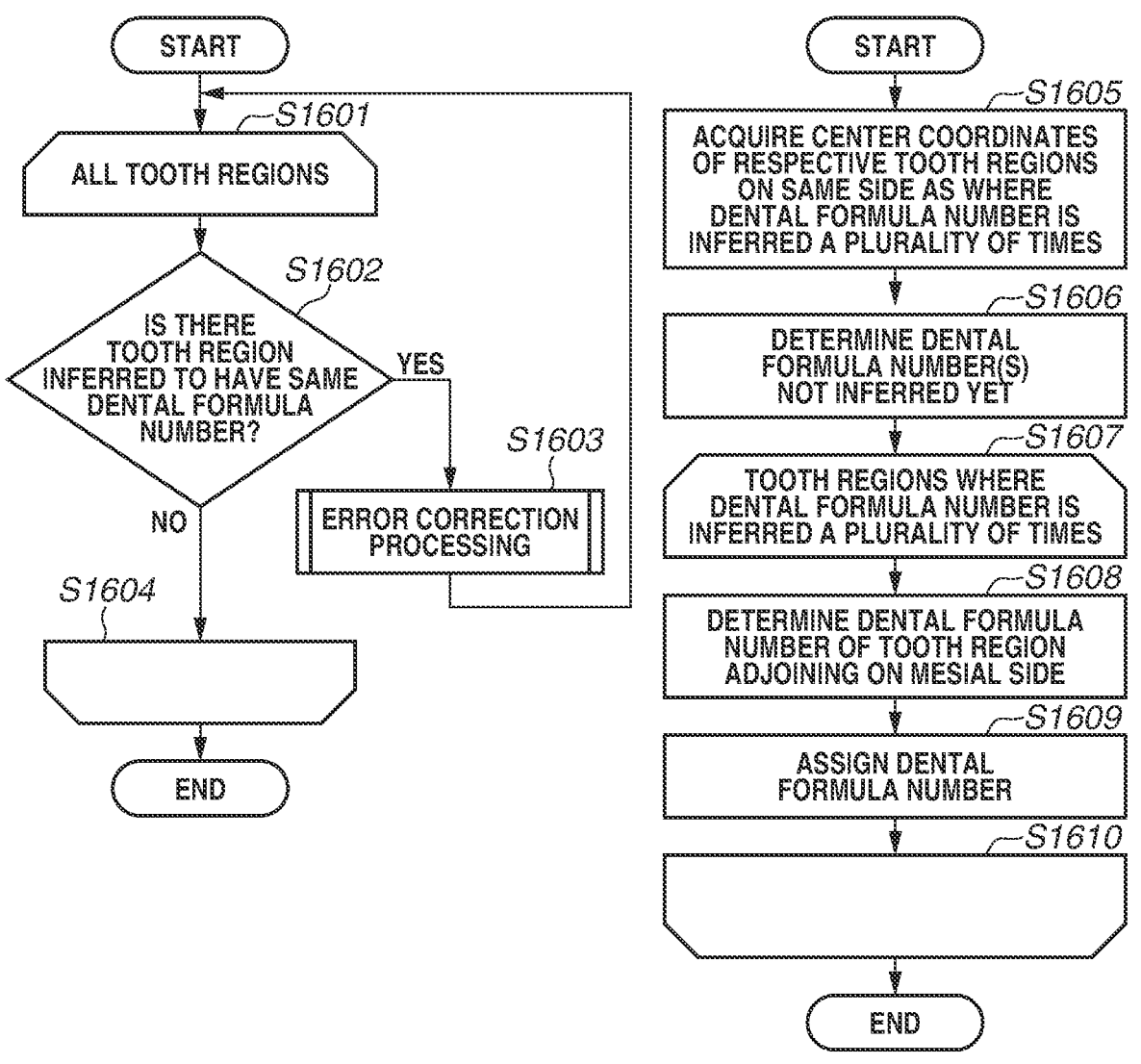
FIG. 16A is a flowchart illustrating error determination and correction processing in a case where a tooth having the same number is detected a plurality of times according to the fourth exemplary embodiment.
FIG. 16B is a flowchart illustrating the error correction processing according to the fourth exemplary embodiment.

Next, the error determination and correction processing for the case where a tooth of the same number is detected a plurality of times in step S1303 of FIG. 13 will be described with reference to FIG. 16A.

Steps S1601 to S1603 constitute loops where the CPU 301 processes the tooth regions in order. The CPU 301 performs the following processing on each of the tooth regions.

In step S1602, if there is no other tooth region where the dental formula number is the same (NO in step S1602), the processing proceeds to step S1604 to perform the next loop. If there is another such tooth region (YES in step S1602), the processing proceeds to step S1603.

In step S1603, the CPU 301 performs error correction processing on the dental formula number determined to be erroneous.

Now, the error correction processing in step S1603 of FIG. 16A will be described with reference to the flowchart of FIG. 16B.

In step S1605, the CPU 301 acquires the center coordinates of the respective tooth regions on the same side, left or right, as where the dental formula number is inferred a plurality of times.

In step S1606, the CPU 301 determines a dental formula number or numbers not inferred yet on the same side of the image, left or right, where the dental formula number is inferred a plurality of times. For example, in the case of the inference results illustrated in FIG. 12C, the CPU 301 extracts "right upper 5" and "right upper 8" as the dental formula numbers not inferred yet.

Steps S1607 to S1610 constitute loops for processing the regions where the dental formula number is inferred a plurality of times in order toward the distal side. For example, in the case of the inference results of FIG. 12C, the CPU 301 processes the tooth regions of the teeth 1203 and 1204 in order.

In step S1608, the CPU 301 determines the dental formula number of the mesial-side tooth region adjoining the tooth region under processing. For example, if the tooth region of the second premolar 1203 is being processed, the tooth region adjoining on the mesial side is the tooth region of a tooth 1205. The dental formula number of the tooth region adjoining on the mesial side is thus "right upper 4".

In step S1609, the CPU 301 assigns a dental formula number to the tooth region under processing based on the dental formula number of the dental region adjoining on the mesial side. The dental formula number to be assigned is selected from among the dental formula number assigned a plurality of times and the dental formula number(s) not inferred yet, determined in step S1606. For example, in the case of the inference results illustrated in FIG. 12C, the dental formula number of the tooth region adjoining on the mesial side is "right upper 4", and the candidates of the number to be assigned are "right upper 6", "right upper 5", and "right upper 8". The CPU 301 selects "right upper 5" closest to "right upper 4".

Figure 17A:
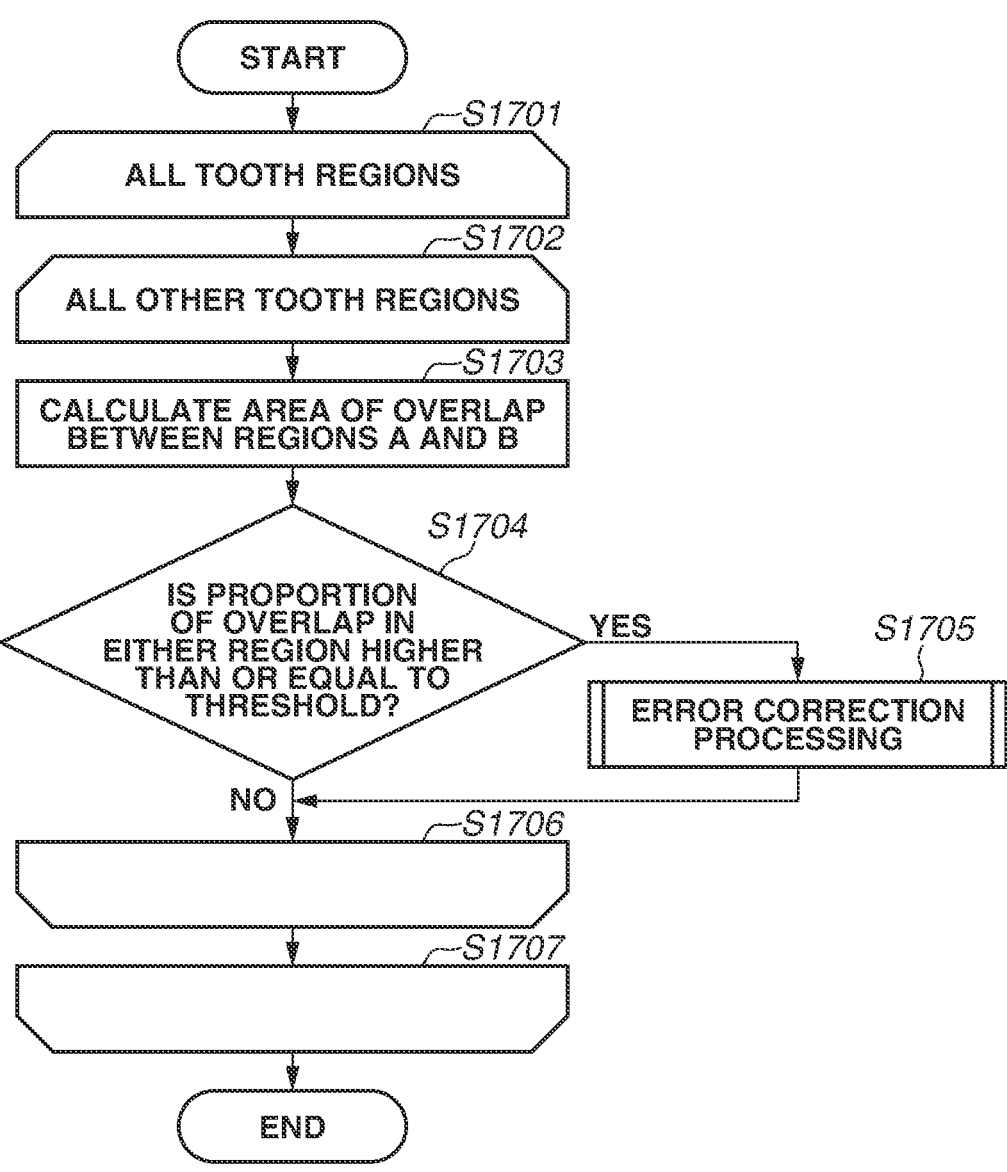
FIG. 17A is a flowchart illustrating error determination and correction processing in a case where a plurality of dental formula numbers is detected in the same tooth region according to the fourth exemplary embodiment.
Figure 17B:
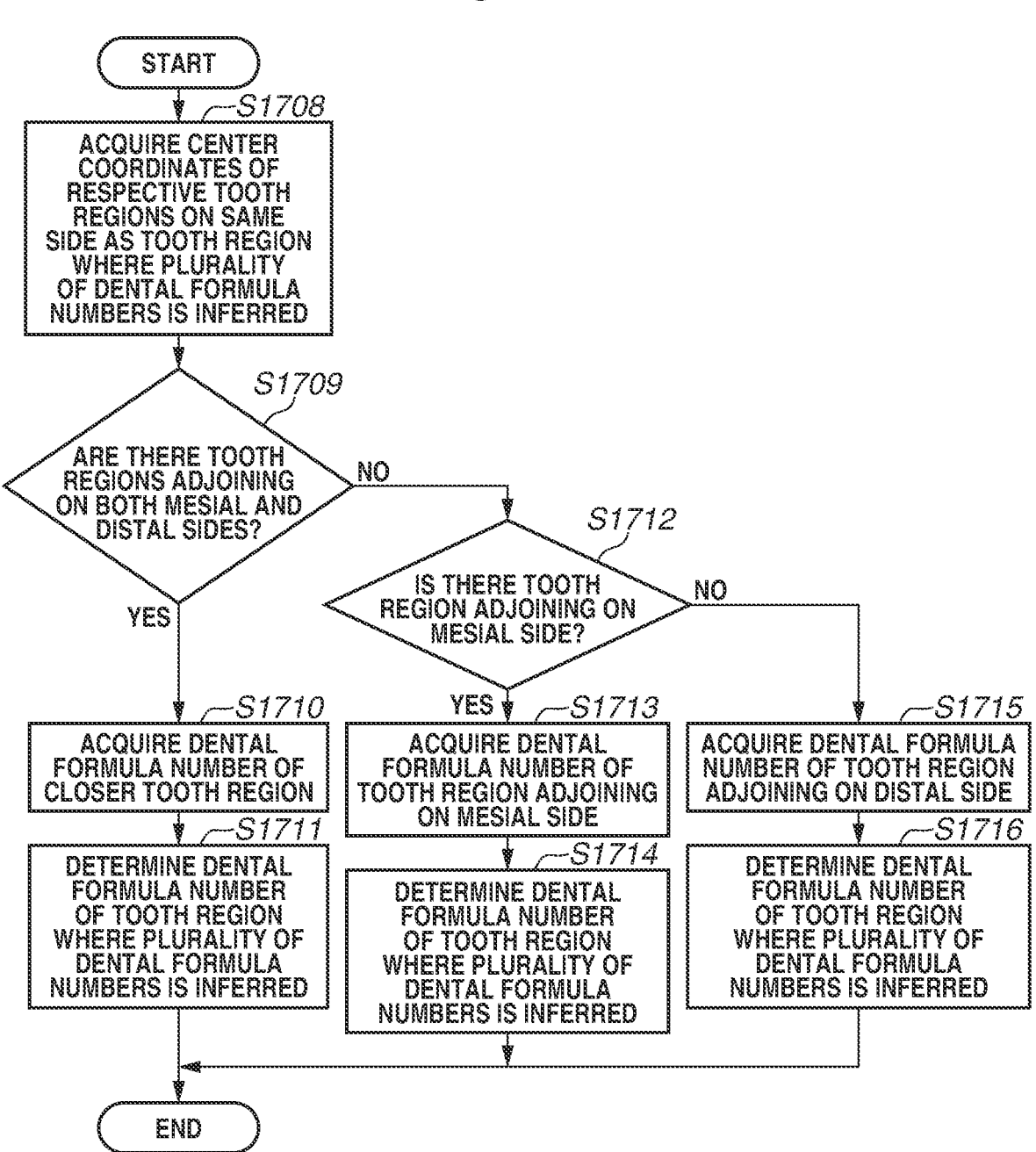
FIG. 17B is a flowchart illustrating the error correction processing according to the fourth exemplary embodiment.

Next, the error determination and correction processing for the case where a plurality of dental formula numbers is detected in the same tooth region in step S1304 of FIG. 13 will be described with reference to the flowchart of FIG. 17A.

Steps S1701 to S1707 constitute loops where the CPU 301 processes the tooth regions in order. The tooth region of interest in such a loop will be referred to as a region A. The CPU 301 performs the following processing on each of the tooth regions.

Steps S1702 to S1706 constitute loops where the CPU 301 processes the tooth regions other than the region A in order. The tooth region of interest in such a loop will be referred to as a region B. The CPU 301 performs the following processing on each of the tooth regions.

In step S1703, the CPU 301 calculates the area of an overlap between the regions A and B.

In step S1704, the CPU 301 calculates the proportions of the area of the overlap calculated in step S1703 in the respective regions A and B. If neither of the proportions is higher than or equal to a threshold (NO in step S1704), the processing proceeds to step S1706 to perform the next loop. In other cases (YES in step S1704), the processing proceeds to step S1705 since region A or B is erroneous.

In step S1705, the CPU 301 performs error correction processing on the dental formula number determined to be erroneous. The processing will be described in detail below with reference to the flowchart of FIG. 17B Next, the error correction processing in step S1705 of FIG. 17A will be described with reference to the flowchart of FIG. 17B.

In step S1708, the CPU 301 acquires the center coordinates of the tooth regions on the same side, left or right, as the tooth region where the plurality of dental formula numbers is inferred.

In step S1709, the CPU 301 determines whether there are tooth regions adjoining on both the mesial and distal sides based on the center coordinates of the tooth regions. If the CPU 301 determines that there are such tooth regions (YES in step S1709), the processing proceeds to step S1710. If not (NO in step S1709), the processing proceeds to step S1712.

In step S1710, the CPU 301 determines the closer of the tooth regions adjoining on the mesial and distal sides to the center of the tooth region where the plurality of dental formula numbers is inferred, by calculating the distance between the center coordinates, and acquires the dental formula number of the closer tooth region. For example, in the case of the inference results illustrated in FIG. 12D, the CPU 301 acquires the dental formula number "right upper 4" of the tooth region of a tooth 1208 where the distance between the center coordinates is the closer of those of the tooth regions of the teeth 1208 and 1209 adjoining the tooth region of the tooth 1207.

In step S1711, the CPU 301 determines the dental formula number of the tooth region where the plurality of dental formula numbers is inferred, using the acquired dental formula number. For example, in the case of the inference results illustrated in FIG. 12D, the closer tooth region is the tooth region of the tooth 1208 with the dental formula number of "right upper 4". The CPU 301 then determines the subsequent number "right upper 5" as the dental formula number of the tooth region 1207 where the plurality of dental formula numbers is inferred. The processing ends. The reason why the dental formula number of the closer region is acquired in step S1710 is to use more accurate information in case the patient has a missing tooth.

In step S1712, if there is a tooth region adjoining on the mesial side (YES in step S1712), the processing proceeds to step S1713. If not (NO in step S1712), the processing proceeds to step S1715.

In step S1713, the CPU 301 acquires the dental formula number of the tooth region adjoining on the mesial side.

In step S1714, the CPU 301 determines the dental formula number of the tooth region where the plurality of dental formula numbers is inferred, using the acquired dental formula number.

In step S1715, the CPU 301 acquires the dental formula number of the tooth region adjoining on the distal side.

In step S1716, the CPU 301 determines the dental formula number of the tooth region where the plurality of dental formula numbers is inferred, using the acquired dental formula number.

Next, the error determination and correction processing on the order of the dental formula numbers in step S1305 of FIG. 13 will be described with reference to the flowchart of FIG. 18A.

In step S1801, the CPU 301 sorts the left tooth regions by the Y coordinates of their respective centers.

In step S1802, if the dental formula numbers of the sorted tooth regions are in order (YES in step S1802), the processing proceeds to step S1804. If not (NO in step S1802), the processing proceeds to step S1803 since the order is wrong.

In step S1803, the CPU 301 performs error correction processing on the dental formula numbers determined to be in wrong order. Detailed processing will be described below with reference to FIG. 18B.

In step S1804, the CPU 301 sorts the right tooth regions by the Y coordinates of their respective centers.

In step S1805, if the dental formula numbers of the sorted tooth regions are in order (YES in step S1805), the processing ends. If not (NO in step S1805), the processing proceeds to step S1806 since the order is wrong.

In step S1806, the CPU 301 performs the error correction processing on the dental formula numbers determined to be in wrong order. Detailed processing will be described below with reference to FIG. 18B.

Next, the error correction processing in steps S1803 and S1806 of FIG. 18 will be described with reference to the flowchart of FIG. 18B.

In step S1807, the CPU 301 calculates the range of tooth regions where the dental formula numbers are not in order. For example, in the case of the inference results illustrated in FIG. 12E, the range where the dental formula numbers are not in order is "the tooth region 1210 to the tooth region 1211".

In step S1808, the CPU 301 reassigns the dental formula numbers within the range in proper order. If there is a plurality of ranges where the dental formula numbers are not in order, the CPU 301 reassigns the dental formula numbers range by range.

There are several methods for the error correction processing on the dental formula numbers.

A first method is that the image processing apparatus 101 automatically corrects the errors as described in the present exemplary embodiment. Specifically, the CPU 301 deletes the information about the tooth regions determined to be erroneous from the detection results of step S403 in FIG. 4, or corrects the information.

A second method is that the image processing apparatus 101 highlights the tooth regions determined to be erroneous on the display 304 to prompt the user, and the user manually makes corrections based on the highlighted display.

A third method is that the image processing apparatus 101 transmits erroneous information to the dental electronic medical record system 104, the dental electronic medical record system 104 displays the erroneous on the dental electronic medical record display terminal 103 to prompt the user, and the user manually makes corrections.

The image processing apparatus 101 may implement any of the foregoing first to third methods. The image processing apparatus 101 may implement more than one of the first to third methods, and use different methods depending on the type of error. The image processing apparatus 101 may be configured so that the user can switch to a given method by user settings.

An example of a UI displayed on the display 304 to implement the second method will be described with reference to FIG. 19.

In this example, an input image (upper jaw image) 1901 includes a tooth region 1904 including a tooth 1903 in the lower jaw. The tooth region 1904 is erroneously inferred to be "left upper 1". The tooth region 1904 is determined to be erroneous in step S1405 since the distance from the dental arch is greater than or equal to the threshold. The CPU 301 highlights the tooth region 1904 with a thick frame or the like, and also highlights a tooth 1905 corresponding to "left upper 1" in a dental chart 1902 with a thick frame or the like to prompt the user to make a correction.

Figure 20:
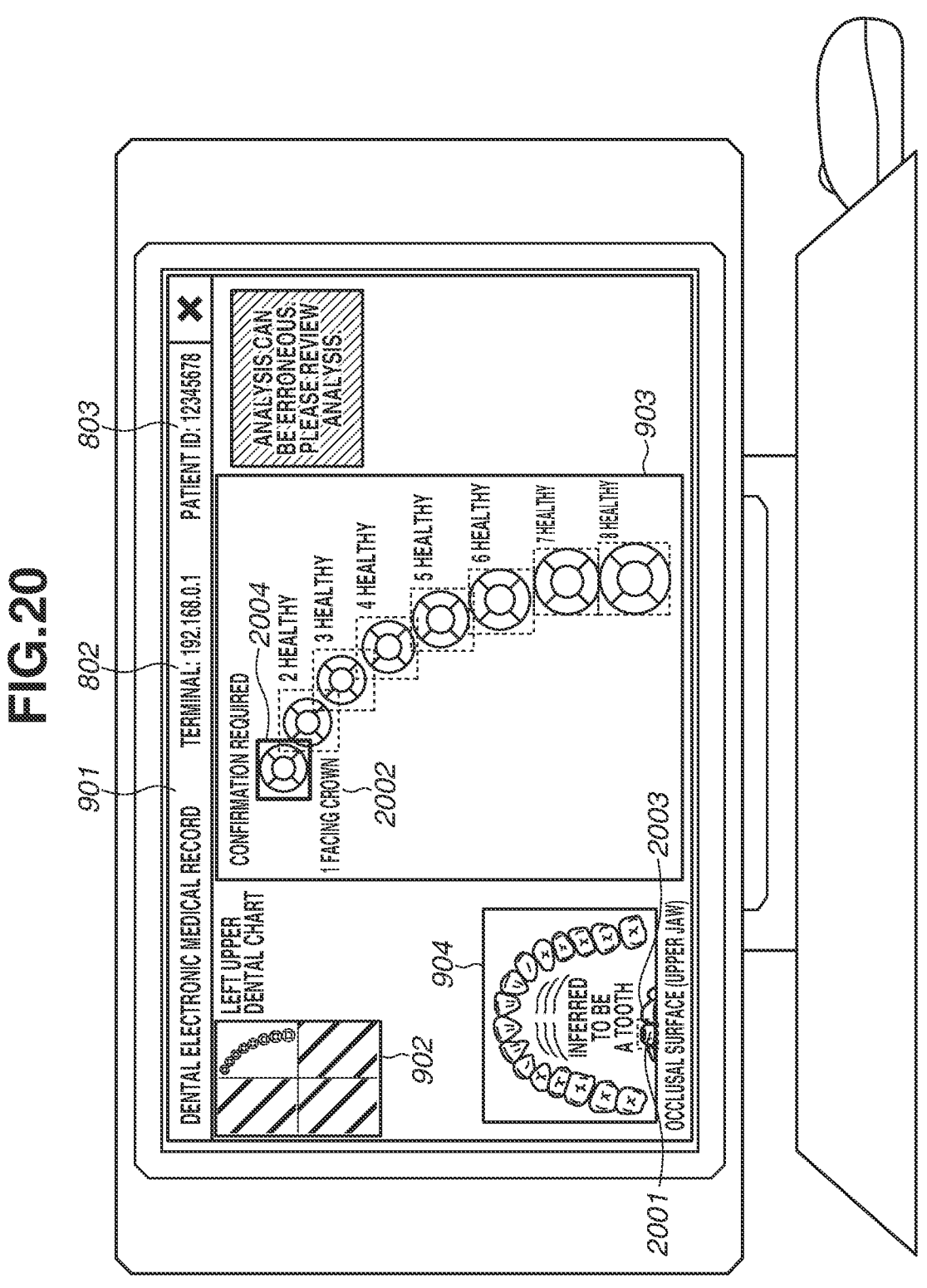
FIG. 20 is a diagram for describing a UI when the user manually corrects an erroneous dental formula number according to the fourth exemplary embodiment.

Next, an example of a UI displayed on the dental electronic medical record display terminal 103 to implement the third method will be described with reference to FIG. 20.

In this example, an upper jaw image 904 includes a tooth region 2003 including a lower tooth 2001. The tooth region 2003 is erroneously inferred to be "left upper 1". The tooth region 2003 is determined to be erroneous in step S1405 since the distance from the dental arch is greater than or equal to the threshold. The dental electronic medical record system 104 highlights the tooth region 2003 in the upper jaw image 904 with a thick frame or the like based on the received erroneous information, and also highlights a tooth 2004 corresponding to "left upper 1" in the dental chart 903 with a thick frame or the like to prompt the user to make a correction.

Figure 21:
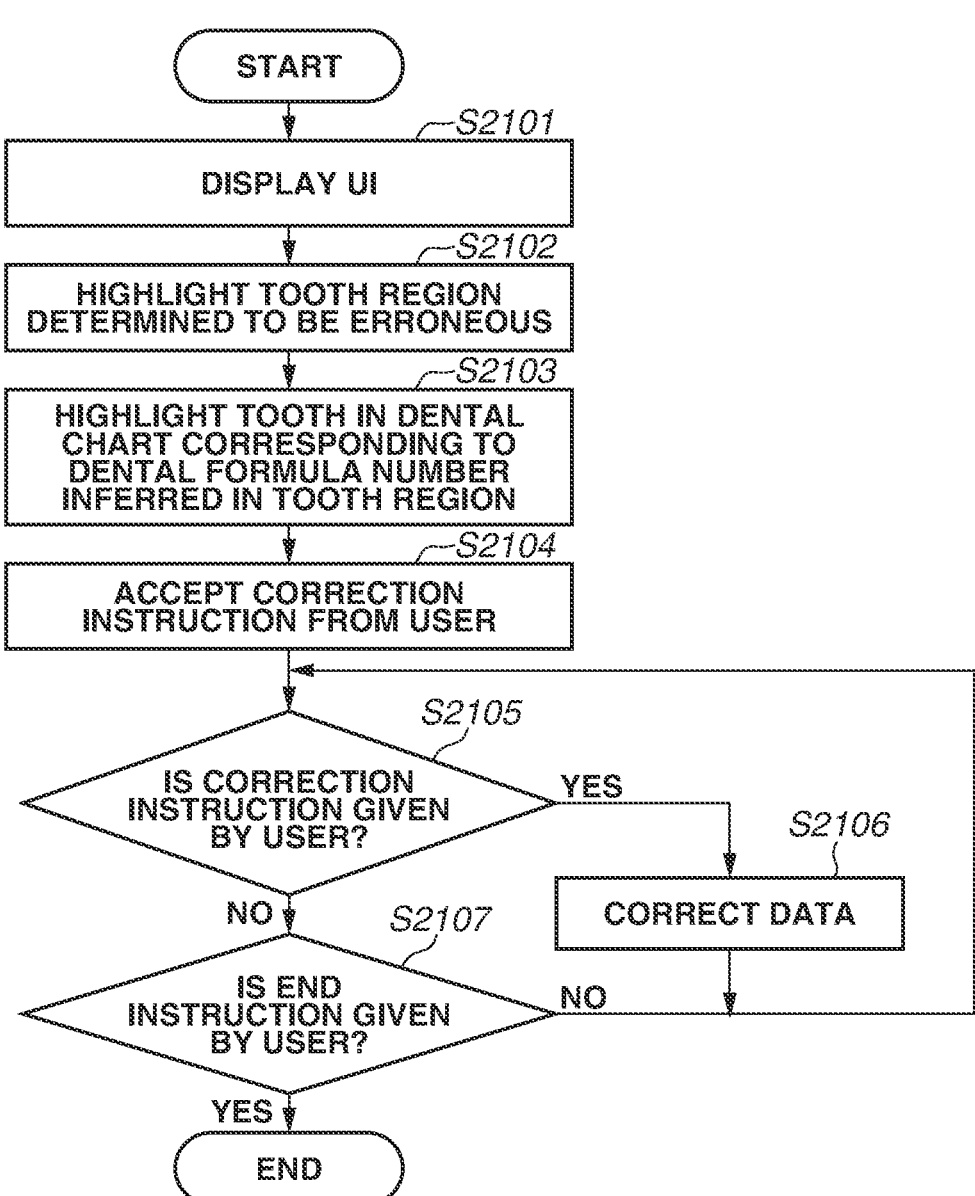
FIG. 21 is a flowchart of error correction processing on dental formula numbers according to the fourth exemplary embodiment.

Next, the second method for the error correction processing on the dental formula numbers will be described with reference to FIG. 21.

Figure 19:
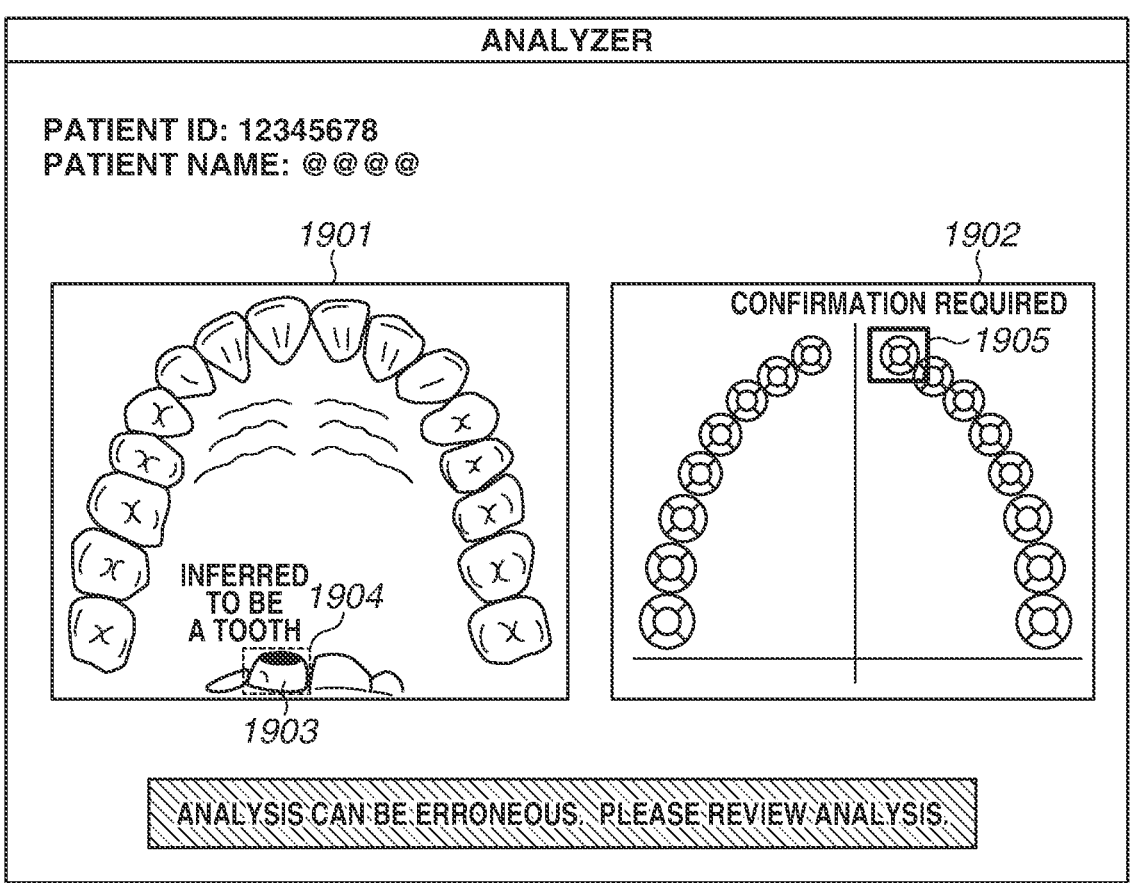
FIG. 19 is a diagram for describing a UI when a user manually corrects an erroneous dental formula number according to the fourth exemplary embodiment.

In step S2101, the CPU 301 displays the UI illustrated in FIG. 19 on the display 304.

In step S2102, the CPU 301 highlights the tooth region 1904 determined to be erroneous.

In step S2103, the CPU 301 highlights the tooth 1905 corresponding to the dental formula number inferred for the tooth region 1904 in the dental chart 1902.

In step S2104, the CPU 301 accepts a correction instruction from the user using the input device 306.

In step S2105, if a correction instruction is given by the user (YES in step S2105), the processing proceeds to step S2106. If not (NO in step S2105), the processing proceeds to step S2107.

An example of the correction instruction from the user will be described. The user clicks on the tooth 1905, and a correction UI appears, where the user makes operations to input corrections. A detailed description of the correction UI will be omitted.

In step S2106, the CPU 301 corrects the data based on the correction instruction accepted from the user.

In step S2107, if an end instruction is given by the user (YES in step S2107), the processing ends. If not (NO in step S2107), the processing proceeds to step S2105.

In the third method, the processing of the CPU 301 is performed by the dental electronic medical record system 104. The processing of the display 304 is performed by the dental electronic medical record display terminal 103. The processing of the input device 306 is performed by an input device connected to the dental electronic medical record system 104.

As described above, the present exemplary embodiment determines whether the model-based inference results are correct in terms of dentition by making rule-based determinations using tables or predetermined conditions. The dental formula numbers can thereby be appropriately corrected even if correct dental formula numbers are not successfully inferred by the model(s).

In the first exemplary embodiment, the imaging apparatus 108 is described to acquire patient information in steps S216 to S221 of FIG. 2A. Moreover, in the first exemplary embodiment, the image data captured by the imaging apparatus 108 and the acquired patient ID are described to be associated with each other in steps S222 to S231 of FIG. 2B. Associating image data with a patient ID will hereinafter be referred to as linking the image data with the patient ID.

A fifth exemplary embodiment deals with processing for linking image data captured by the imaging apparatus 108 with a patient ID using means other than in the first exemplary embodiment.

The processing of the present exemplary embodiment other than that for linking the captured image data with the patient ID is similar to that of the first exemplary embodiment. A description thereof will thus be omitted.

The dental electronic medical record display terminal 103 of FIG. 1 connects to the dental electronic medical record system 104 and displays information about the patient under examination. In an actual hospital, a plurality of dental electronic medical record display terminals is often connected to the dental electronic medical record system 104.

Figure 22:
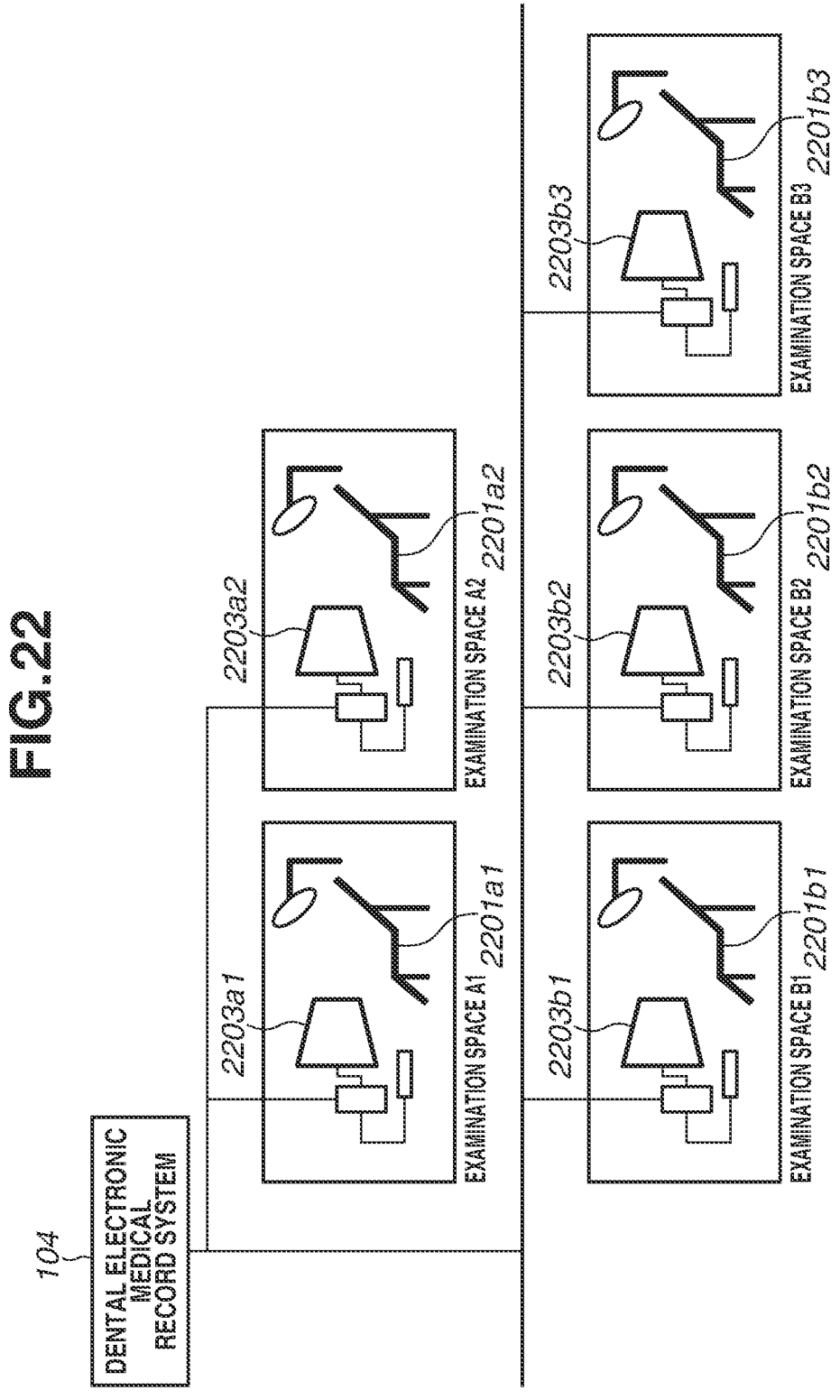
FIG. 22 is a diagram for describing a setting where dental electronic medical record display terminals are disposed according to a fifth exemplary embodiment.

FIG. 22 illustrates a configuration example where five dental electronic medical record display terminals are connected to the dental electronic medical record system 104. Dental electronic medical record display terminals 2203a1, 2203a2, and 2203b1 to 2203b3 are installed in an examination space each (examination spaces A1, A2, and B1 to B3). Similarly, chairs 2201a1, 2201a2, and 2201b1 to 2201b3 are installed in an examination space each (the examination spaces A1, A2, and B1 to B3).

If patients' mouth cavities are photographed during examination in the foregoing system configuration, an imaging apparatus to be used may be installed in each examination space, or an imaging apparatus may be used in a plurality of examination spaces. The image processing apparatus 101 thus stores management data for managing in which examination space, with which chair, and with which dental electronic medical record display terminal 103 the imaging apparatus 108 is used.

FIG. 23 illustrates an example of such a management data structure stored in the image processing apparatus 101. For example, this management data structure 2301 includes a space ID 2302 and a chair ID 2303. The management data structure 2301 further includes a dental electronic medical record display terminal ID 2304, an Internet Protocol (IP) address 2305 of the dental electronic medical record display terminal, an ID 2306 of an imaging apparatus used with the dental electronic medical record display terminal, and an IP address 2307 of the imaging apparatus. FIG. 23 illustrates an example where an imaging apparatus Camera-101 is used in the foregoing examination spaces A1 and A2, and an imaging apparatus Camera-201 in the examination spaces B1, B2, and B3.

The unit for setting such management data may be implemented as a program running on the image processing apparatus 101, or a program running on a device that can communicate with the image processing apparatus 101.

FIG. 24 illustrates an example of a UI for selecting a target dental electronic medical record display terminal of the imaging apparatus 108 on a rear liquid crystal screen 2401 of the imaging apparatus 108. In the example of FIG. 23 described above, records of the dental electronic medical record display terminals P-A01 (2403) and P-A02 (2404) registered to be used with the imaging apparatus Camera-101 are displayed in a selection list. The user specifies the record 2404 including the dental electronic medical record display terminal installed in the examination space where the patient to be imaged is examined from the displayed selection list. The unit for the user to select a record with may be a touchscreen on the rear liquid crystal screen 2401 of the imaging apparatus 108, or a physical selection device such as a button on the image processing apparatus 108. The user selects the desired record and presses a set button 2405 if the user intends to store the selection in the image processing apparatus 108. On the other hand, if the user does not intend to store the selection in the image processing apparatus 108, the user presses a cancel button 2406.

In such a manner, the state where the target dental electronic medical record display terminal 103 is set in a specific imaging apparatus 108 can be stored.

Figure 25:
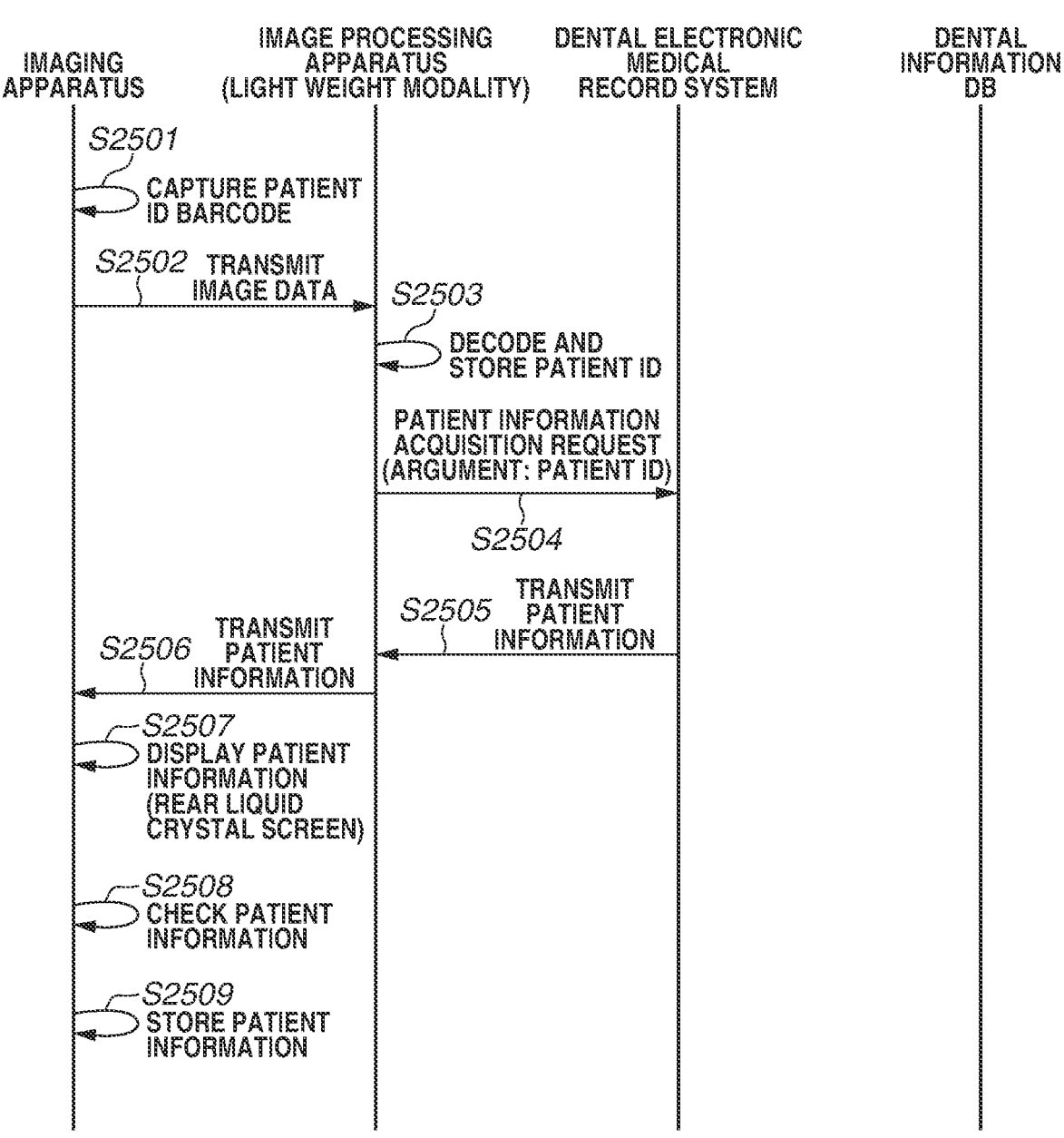
FIG. 25 is a sequence diagram for describing a procedure where the imaging apparatus stores patient information according to the fifth exemplary embodiment.

Processing for identifying a patient ID and storing patient information into the imaging apparatus 108 based on information captured by the imaging apparatus 108 will be described with reference to FIG. 25.

Figure 26A:
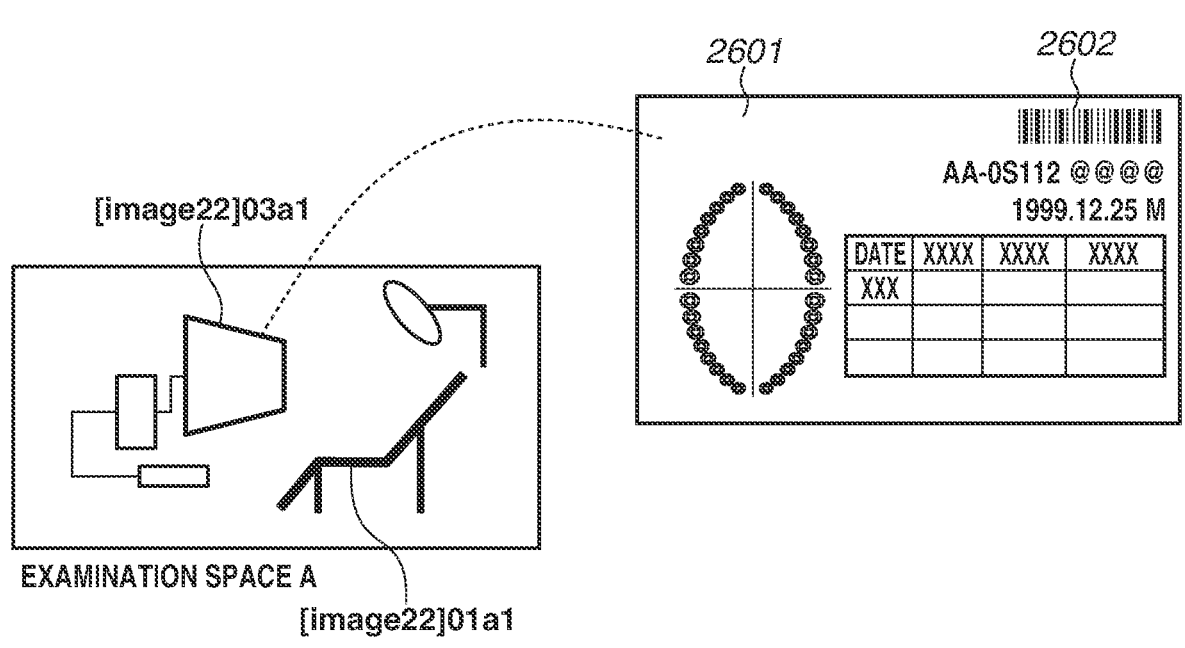
FIGS. 26A and 26B are diagrams for describing examples where a patient identifier (ID) is displayed according to the fifth exemplary embodiment.
Figure 26B:
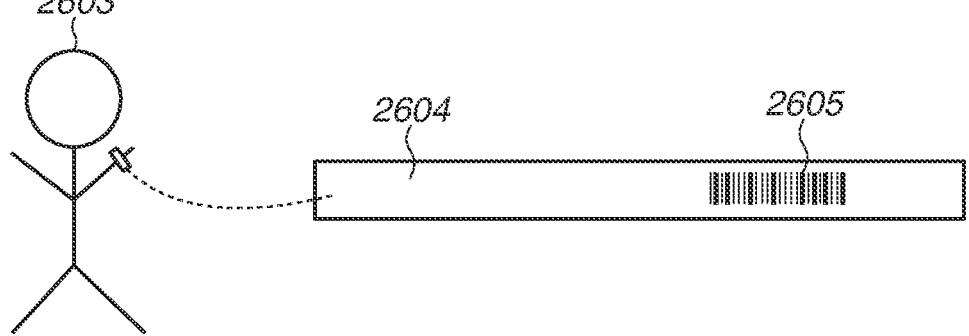

In step S2501, the imaging apparatus 108 captures information about the patient ID. The information about the patient ID to be captured may be any information from which the patient ID for identifying the patient can be uniquely identified. In the present exemplary embodiment, a barcode of the patient ID is described as an example. As illustrated in FIGS. 26A and 26B, the barcode of the patient ID may be displayed on the dental electronic medical record display terminal 103 in a specific examination space during examination of the patient (patient ID barcode 2602 in FIG. 26A). Alternatively, the barcode may be printed on an article handed over to the patient by the hospital upon examination reception, like a patient ID wristband 2604 in FIG. 26B (barcode 2605 in FIG. 26B).

In step S2502, the imaging apparatus 108 captures the patient ID barcode, and transmits the image data to the image processing apparatus 101 along with a patient information acquisition request.

In step S2503, the image processing apparatus 101 performs barcode decoding processing on the image data received along with the patient information acquisition request received from the imaging apparatus 108. The imaging apparatus 101 then stores the decoding result, or patient ID.

In step S2504, the image processing apparatus 101 issues a patient information acquisition request to the dental electronic medical record system 104 with the stored patient ID as an argument. In step S2505, the dental electronic medical record system 104 transmits the patient information to the image processing apparatus 101 in response to the patient information acquisition request received from the image processing apparatus 101.

In step S2506, the image processing apparatus 101 transmits the patient information received from the dental electronic medical record system 104 to the imaging apparatus 108 as a response to the patient information acquisition request received from the imaging apparatus 108.

In step S2507, the imaging apparatus 108 displays the patient information received from the image processing apparatus 101, such as the patient's name and gender, on a display module of the imaging apparatus 108, such as the rear liquid crystal screen 2401.

In step S2508, the user checks the patient information displayed on the display module of the imaging apparatus 108. If the patient information is confirmed to match the patient to be imaged, the user makes a check completion operation on the imaging apparatus 108. In response to the check completion operation, the processing proceeds to step S2509.

In step S2509, the imaging apparatus 108 stores the patient information as the patient information about the imaging target. On the other hand, if the patient information displayed on the display module of the imaging apparatus 108 does not match the patient to be image, the processing returns to step S2501 and the imaging apparatus 108 performs the processing for capturing a correct patient ID barcode of the imaging target again.

Now, a method is described where the imaging apparatus 108 identifies the patient ID and acquires the patient information by making use of the fact that the display information displayed on the dental electronic medical record display terminal 103 in the examination space during examination is that of the patient under examination.

Figure 27:
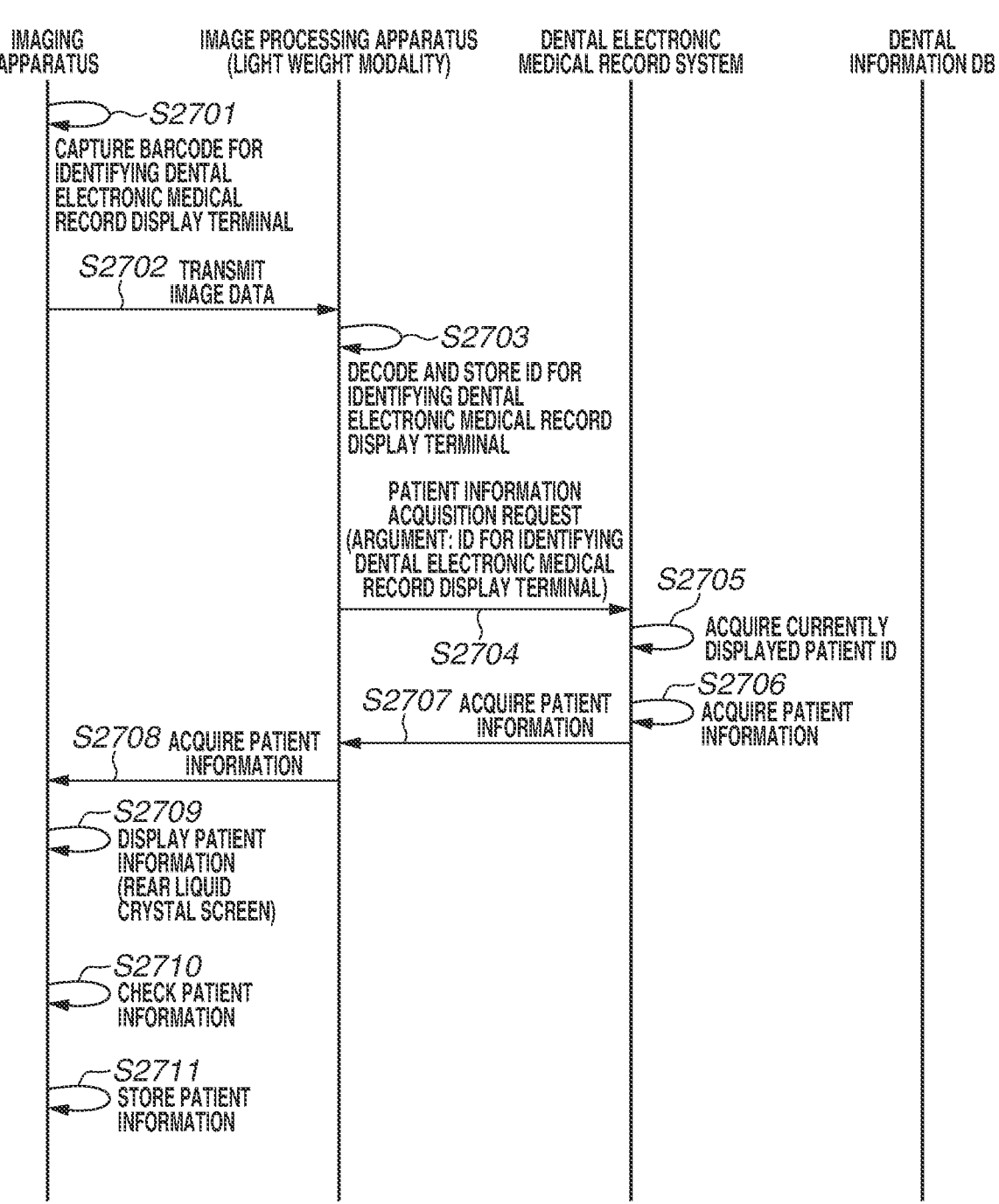
FIG. 27 is a sequence diagram for describing a procedure for identifying a patient ID and storing patient information according to the fifth exemplary embodiment.

The processing for identifying the patient ID and storing the patient information based on information captured by the imaging apparatus 108 will be described with reference to FIG. 27.

Figure 28A:
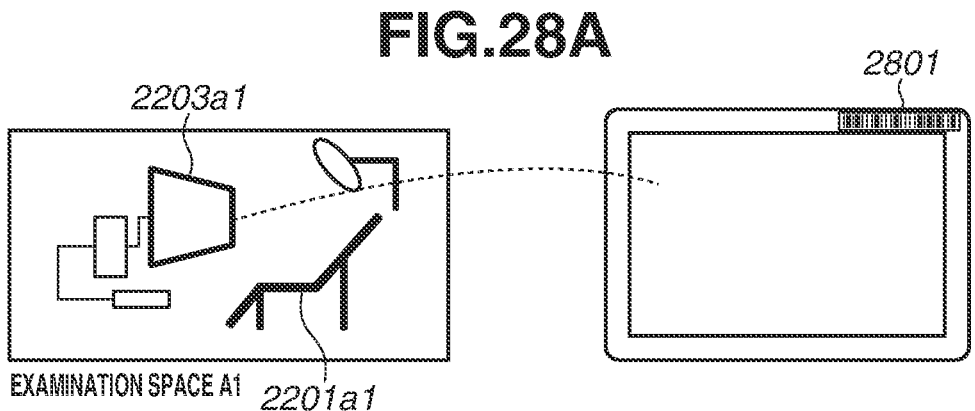
FIGS. 28A to 28C are diagrams for describing examples of information for identifying a dental electronic medical record display terminal according to the fifth exemplary embodiment.
Figure 28B:
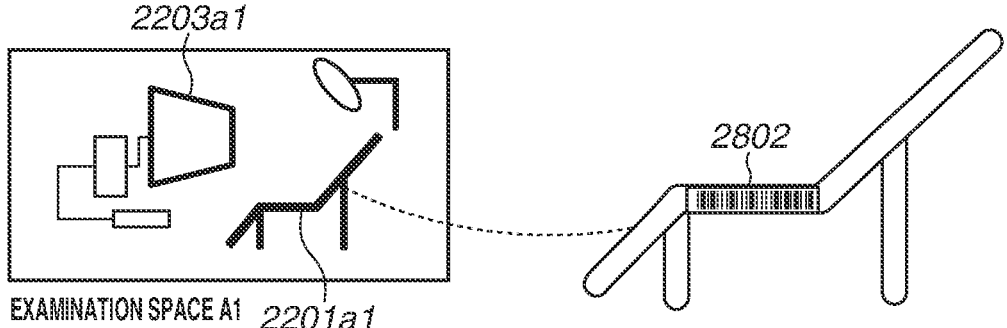
Figure 28C:
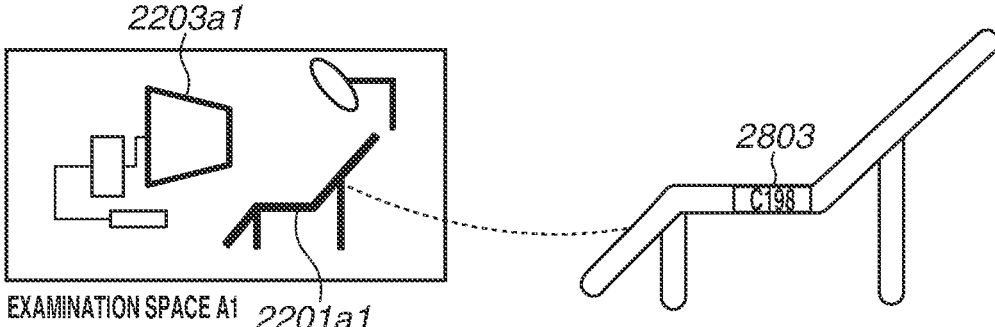

In step S2701, the imaging apparatus 108 captures information for identifying the dental electronic medical record display terminal 103. The information for identifying the dental electronic medical record display terminal 103 to be captured may be any information from which the dental electronic medical record display terminal 103 can be uniquely identified. As illustrated in FIGS. 28A to 28C, a barcode 2801 attached to the dental electronic medical record display terminal 103 may be used. Information for identifying a chair 2201a1 installed in the examination space where the dental electronic medical record display terminal 103 is disposed may be used. Specific examples include a barcode 2802 attached to the chair 2201a1 and a number 2803 for identifying the chair 2201a1. Processing where the image processing apparatus 101 decodes the information for identifying the dental electronic medical record display terminal 103 to be described below based on the image data obtained by the imaging apparatus 108 capturing the information is decoding processing corresponding to the type of information. In the present exemplary embodiment, a barcode is described as an example of the information for identifying the dental electronic medical record display terminal 103.

In step S2702, with the barcode for identifying the dental electronic medical record display terminal 103 captured, the image processing apparatus 108 transmits the image data to the image processing apparatus 101 along with a patient information acquisition request.

In step S2703, the image processing apparatus 101 performs barcode decoding processing on the image data received along with the patient information acquisition request received from the imaging apparatus 108. The image processing apparatus 101 then stores the decoding result, or the ID for identifying the dental electronic medical record display terminal 103.

In step S2704, the image processing apparatus 101 issues a patient information acquisition request to the dental electronic medical record system 104 with the stored ID for identifying the dental electronic medical record display terminal 103 as an argument.

In step S2705, the dental electronic medical record system 104 acquires the patient ID currently displayed on the identified dental electronic medical record display terminal 103 based on the ID for identifying the dental electronic medical record display terminal 103, received from the image processing apparatus 101.

In step S2706, the dental electronic medical record system 104 acquires the patient information based on the patient ID.

In step S2707, the dental electronic medical record system 104 transmits the acquired patient information to the image processing apparatus 101.

In step S2708, the image processing apparatus 101 transmits the received patient information to the image processing apparatus 108.

In step S2709, the imaging apparatus 108 displays the patient information received from the image processing apparatus 101, such as the patient's name and gender, on its own display module such as the rear liquid crystal screen 2401.

In step S2710, the user checks the patient information displayed on the display module of the imaging apparatus 108. If the patient information is confirmed to match the patient to be imaged, the user makes a check completion operation on the imaging apparatus 108. In response to the check completion operation, the processing proceeds to step S2711.

In step S2711, the imaging apparatus 108 stores the patient information as the patient information about the imaging target.

On the other hand, if the patient information displayed on the imaging apparatus 108 does not match the patient to be imaged, the processing returns to step S2701. The user checks the dental electronic medical record display terminal 103 and the imaging apparatus 108, and retries the processing from the capturing of the barcode.

The processing for selecting the target dental electronic medical record display terminal of the image processing apparatus 108 on the rear liquid crystal screen 2401 of the image processing apparatus 108, described with reference to FIG. 24, can be followed by steps S2704 to S2711 to acquire patient information.

Figure 29:
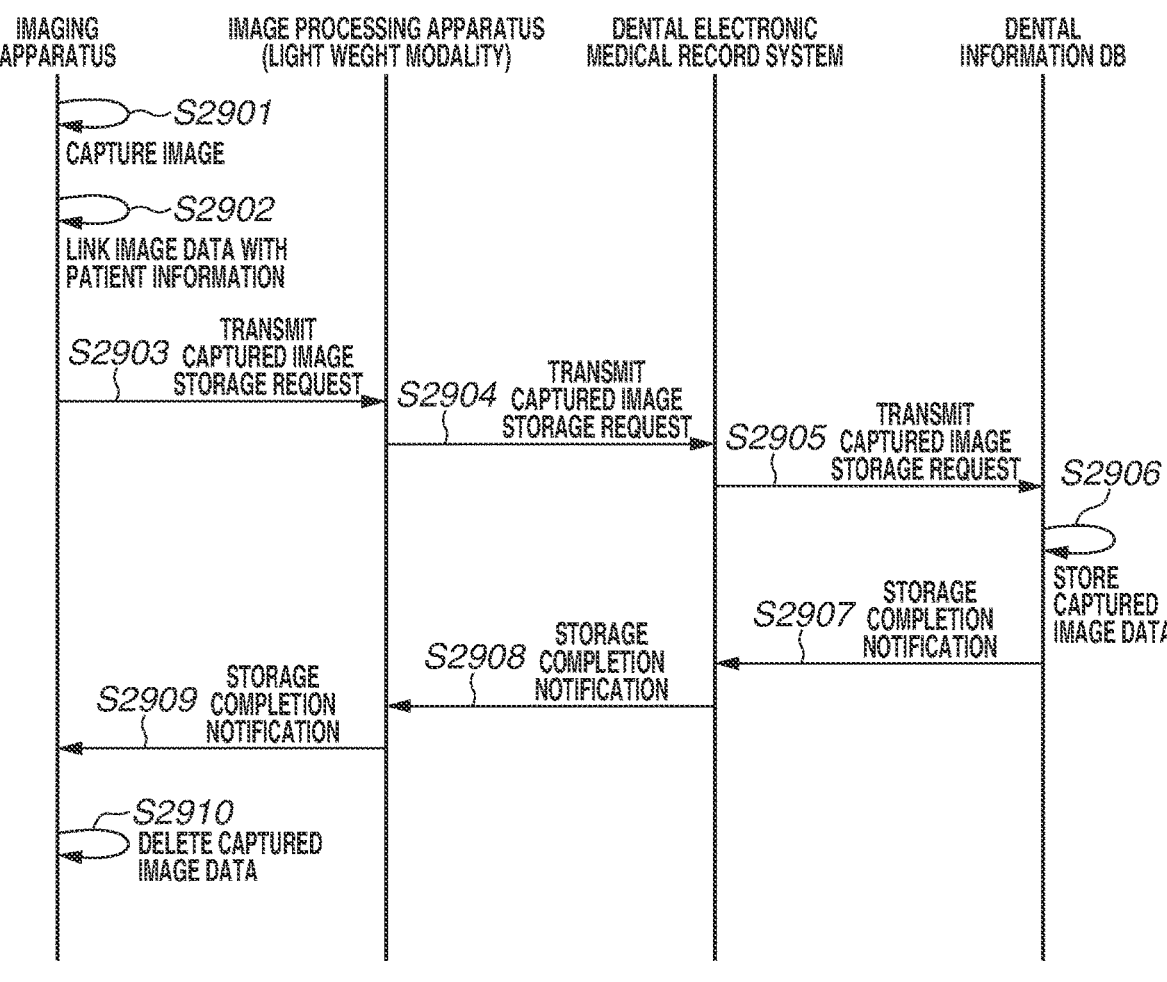
FIG. 29 is a sequence diagram for describing a procedure for linking image data with a patient ID according to the fifth exemplary embodiment.

Processing where the imaging apparatus 108 links the image data captured by the imaging apparatus 108 with the acquired patient information, or the patient ID in particular, and stores the resulting image data will be described with reference to FIG. 29.

As described above, in step S2508 or S2710, the imaging apparatus 108 checks that the patient to be imaged matches the acquired patient information.

In step S2901, the imaging apparatus 108 captures the patient's oral image based on the user's operations.

In step S2902, the image processing apparatus 108 links image data output by the imaging with the stored patient information, and stores the resulting image data.

In step S2903, the imaging apparatus 108 transmits a captured image storage request to the image processing apparatus 101.

In step S2904, the image processing apparatus 101 similarly transmits the captured image storage request received from the imaging apparatus 108 to the dental electronic medical record system 104.

In step S2905, the dental electronic medical record system 104 transmits the captured image storage request received from the image processing apparatus 101 and the captured image data received with the request to the dental information DB 105.

In step S2906, the dental information DB 105 stores the captured image storage request and the captured image data received from the dental electronic medical record system 104.

In step S2907, the dental information DB 105 transmits a storage completion notification about the captured image data to the dental electronic medical record system 104.

In step S2908, the dental electronic medical record system 104 transmits the storage completion notification about the captured image data to the image processing apparatus 101.

In step S2909, the image processing apparatus 101 transmits the storage completion notification about the captured image data to the imaging apparatus 108.

In step S2910, the imaging apparatus 108 deletes the captured image data based on the storage completion notification about the captured image data, received from the image processing apparatus 101.

In such a manner, the patient's image data captured by the imaging apparatus 108 can be linked with the patient information about the patient and stored.

Figure 30:
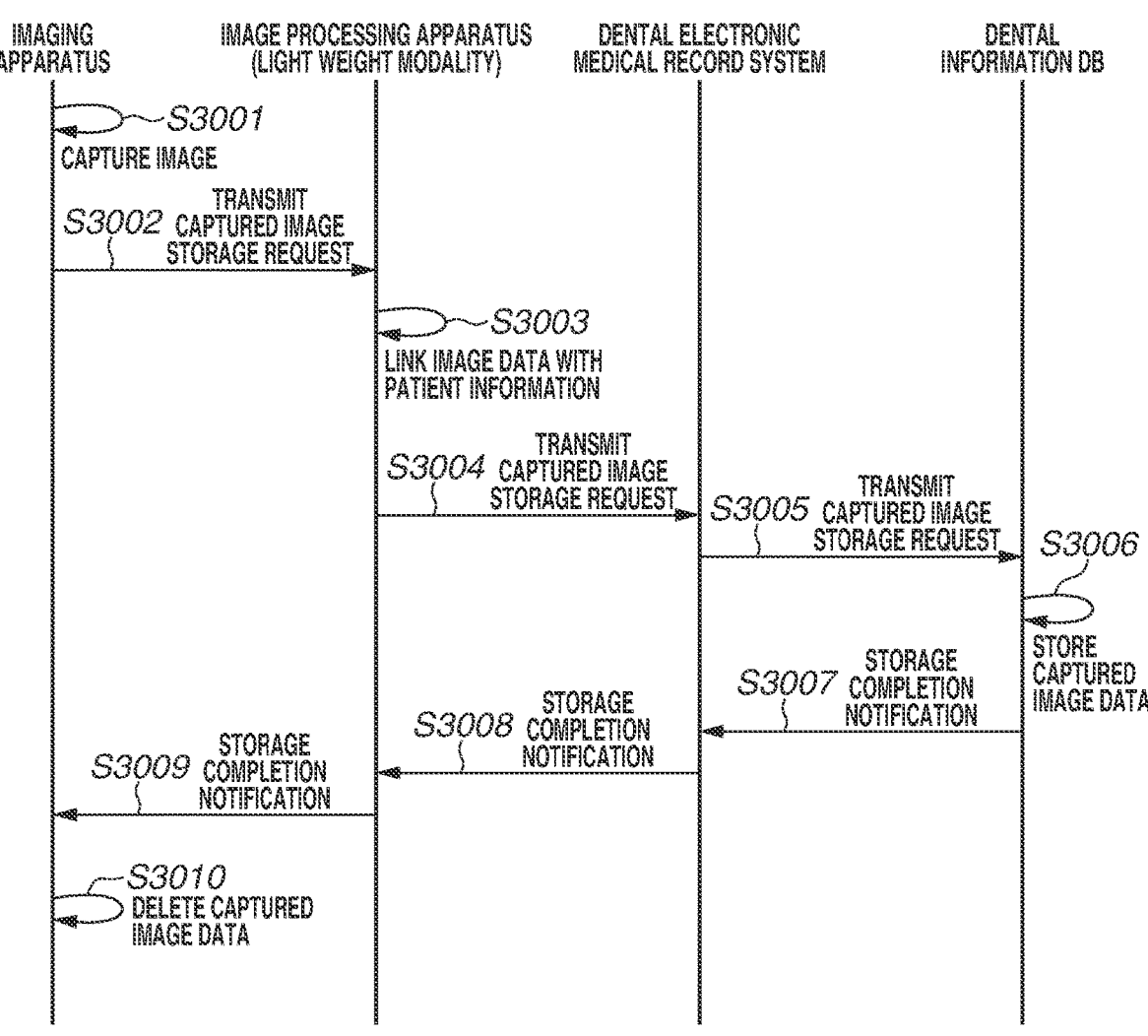
FIG. 30 is a sequence diagram for describing the procedure for linking image data with a patient ID according to the fifth exemplary embodiment.

Processing where the image processing apparatus 101 links the image data captured by the imaging apparatus 108 with the acquired patient information, or patient ID in particular, and stores the resulting image data will be described with reference to FIG. 30.

In step S3001, the imaging apparatus 108 captures the patient's oral image based on the user's operations.

In step S3002, the imaging apparatus 108 transmits a captured image storage request to the image processing apparatus 101.

In step S3003, the image processing apparatus 101 links the captured image data received from the imaging apparatus 108 with the patient information transmitted along with the captured image data, and stores the resulting image data.

In step S3004, the image processing apparatus 101 transmits the captured image storage request to the dental electronic medical record system 104 along with the linked data.

In step S3005, the dental electronic medical record system 104 transmits the captured image storage request received from the image processing apparatus 101 and the captured image data received with the request to the dental information DB 105.

In step S3006, the dental information DB 105 stores the captured image storage request and the captured image data received from the dental electronic medical record system 104.

In step S3007, the dental information DB 105 transmits a storage completion notification about the captured image data to the dental electronic medical record system 104.

In step S3008, the dental electronic medical record system 104 transmits the storage completion notification about the captured image data to the image processing apparatus 101.

In step S3009, the image processing apparatus 101 transmits the storage completion notification about the captured image data to the imaging apparatus 108.

In step S3010, the imaging apparatus 108 deletes the captured image data based on the storage completion notification about the captured image data, received from the image processing apparatus 101.

In such a manner, the patient's image data captured by the imaging apparatus 108 can be linked with the patient information about the patient and stored immediately after the image data is captured or before the captured image data is transmitted to the dental electronic medical record system 104.

The foregoing processing for linking the captured image data with the patient information may be performed by embedding the patient information into the actual file of the captured image data, or by generating a file describing the patient information aside from the actual file of the captured image data and associating the two files. Alternatively, the captured image data and the patient information may be associated with each other on the dental information DB 105 by the captured image storage processing performed in response to the captured image storage request.

In the foregoing exemplary embodiments, a machine learning model for determining the tooth state (tooth state determination model) is generated. To generate a tooth state determination model, training data is generated by collating diagnosis data generated by a doctor with oral images and labelling (hereinafter, referred to as annotating) the teeth in the oral images with respective tooth states. Tooth state learning processing is then performed to generate the tooth state determination model.

A large amount of training data is desirably used to train an accurate model. However, manually collating diagnosis results with images and annotating the teeth to prepare a large amount of training data takes a great deal of effort.

In a sixth exemplary embodiment, an image processing apparatus for generating a tooth state determination model of high accuracy without much effort by automatically generating such a large amount of training data will be described.

Figure 31:
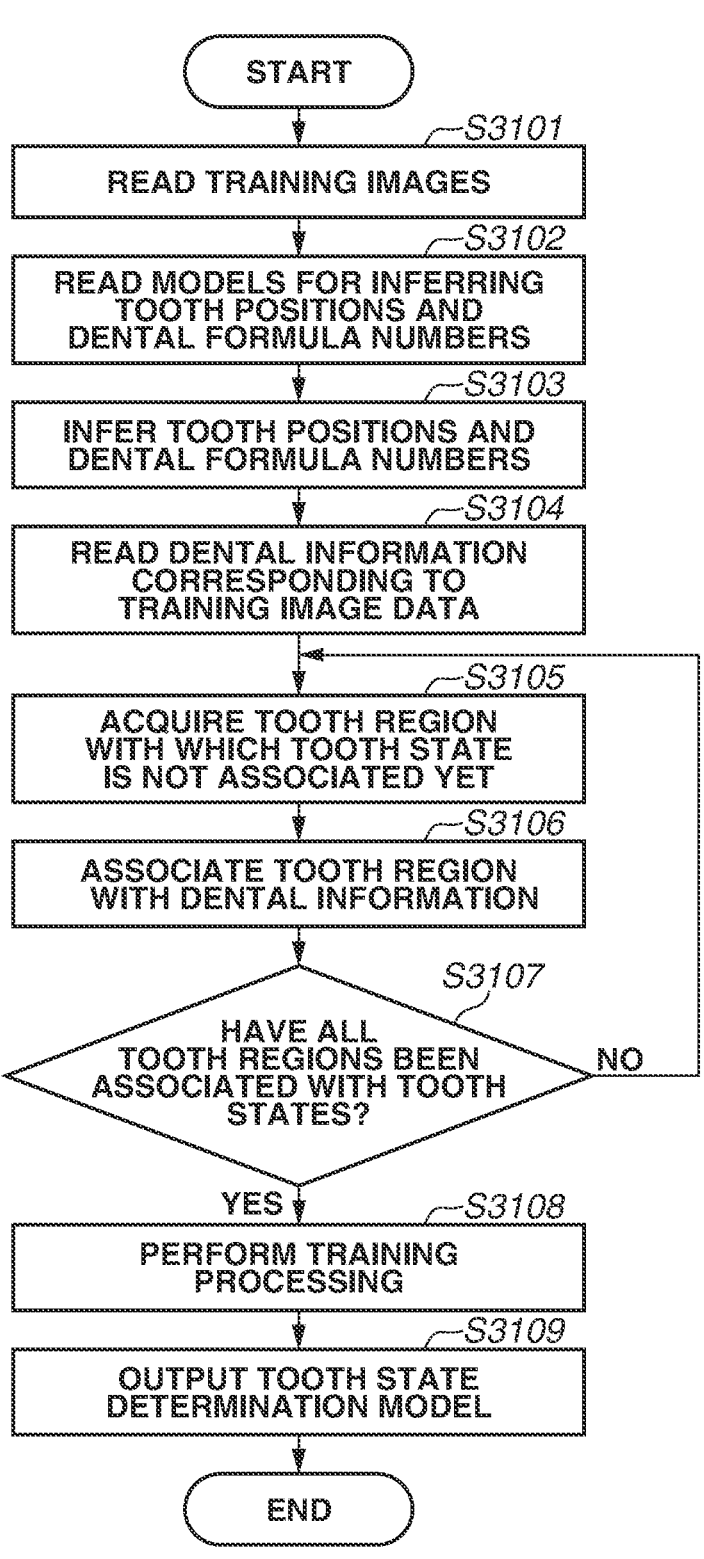
FIG. 31 is a flowchart illustrating training data generation processing according to a sixth exemplary embodiment.

FIG. 31 is a flowchart for describing training data generation processing according to the present exemplary embodiment. The image processing apparatus according to the present exemplary embodiment may be the same as the foregoing image processing apparatus 101, or another apparatus including a CPU. In the present exemplary embodiment, the training data generation processing is described to be performed by the image processing apparatus 101.

In step S3101, the CPU 301 reads training images. The images to be read may be oral images of patients, directly acquired from the imaging apparatus 108. The training images may be acquired from among oral images stored in the HDD 105 of the image processing apparatus 101.

In step S3102, the CPU 301 reads a model for inferring tooth positions and dental formula numbers. The model to be read here is the same as that read in step S402 of FIG. 4.

In step S3103, the CPU 301 infers tooth positions and dental formula numbers from the oral images acquired in step S3101, using the model read in step S3102. As a result, tooth regions are detected from the oral images, and inference results of the dental formula numbers corresponding to the respective detection results are obtained. Since the dental formula numbers can be erroneously inferred, the error calculation processing described in the fourth exemplary embodiment may be performed here.

Figure 32:
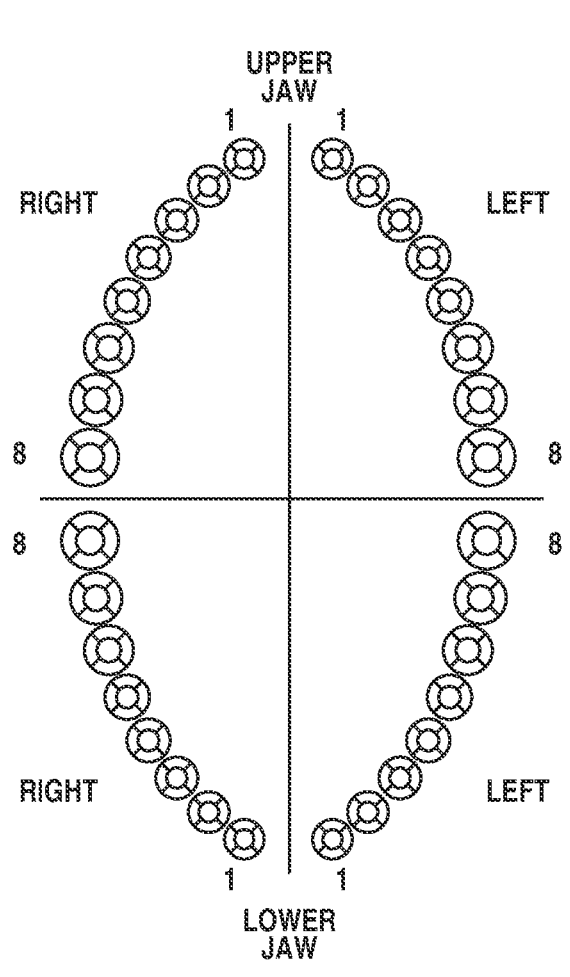
FIG. 32 is a diagram illustrating an example of dental information according to the sixth exemplary embodiment.

In step S3104, the CPU 301 accesses the dental information DB 105 storing the diagnoses of the patients made by dentists. The CPU 301 acquires the patients' dental information corresponding to the tooth image data read in step S3101 via the dental electronic medical record system 104. FIG. 32 illustrates an example of the acquired dental information. The dental information describes the dental formula numbers of a patient's teeth and tooth states such as decayed and prosthesis.

In step S3105, the CPU 301 acquires a tooth region with which a tooth state is not associated yet among the tooth regions detected in step S3103.

In step S3106, the CPU 301 associates the tooth region acquired in step S3105 with the dental information acquired in step S3104 based on the dental formula number, whereby training data is generated. FIG. 33 illustrates an example of associated training data. A tooth determined to be "left lower 7" in step S3103 is found to have a tooth state "C2" from the dental information acquired in step S3104, and is thus assigned label information "C2".

In step S3107, if all the tooth regions have been associated with tooth states (YES in step S3107), the processing proceeds to step S3108. If not (NO in step S3107), the processing proceeds to step S3105.

In step S3108, the CPU 301 performs training processing using a tooth state learning processing unit with the tooth state training data generated in the procedure of steps S3105 to S3107 as an input.

The machine learning algorithm is a commonly used one, and a description thereof will be omitted.

In step S3109, the CPU 301 stores the tooth state determination model generated by the training processing of step S3108 into the HDD 305. The tooth state determination model is used for tooth state determination in the first exemplary embodiment.

As described above, according to the present exemplary embodiment, oral images and corresponding diagnoses made by dentists are acquired from the dental electronic medical record system 104 for collation. Since a large amount of training data can thus be automatically generated, an accurate tooth state determination model can be generated without much effort.

The foregoing exemplary embodiments have dealt with a technique for inferring tooth positions and numbers in the dental formula inference processing step S240 using models generated by machine leaning. However, the models can be unable to infer correct dental formula numbers or states from a single image. In the fourth exemplary embodiment, a method for determining whether the inference results of the dental formula numbers are correct in terms of dentition and automatically correcting errors is described. However, errors are unable to be corrected if the tooth detection itself is failed. In the first exemplary embodiment, a method for determining the states of the teeth from the inference results in the occlusal view, front view, left side view, and right side view images in a comprehensive manner is described. However, the determination results can be inconsistent if some of the inference results of the states in the images are erroneous and incompatible for the same tooth. Furthermore, in the first exemplary embodiment, a method for correcting the inference results by the dentist's operations is described. However, if an inference result is erroneous and the error affects a plurality of teeth in the process of association between dental formula numbers and states, the dentist corrects the errors in all such teeth by himself/herself, which is inefficient.

A seventh exemplary embodiment deals with an image processing apparatus that makes corrections using inference results of other images if correct dental formula numbers or states are not successfully inferred as described above in the dental formula inference processing step S240. Moreover, the image processing apparatus automatically associates dental formula numbers and states based on corrections made by a dentist.

In the present exemplary embodiment, a description of portions similar to those of the foregoing exemplary embodiments is omitted, and a configuration characteristic of the present exemplary embodiment will mainly be described.

Figure 37:
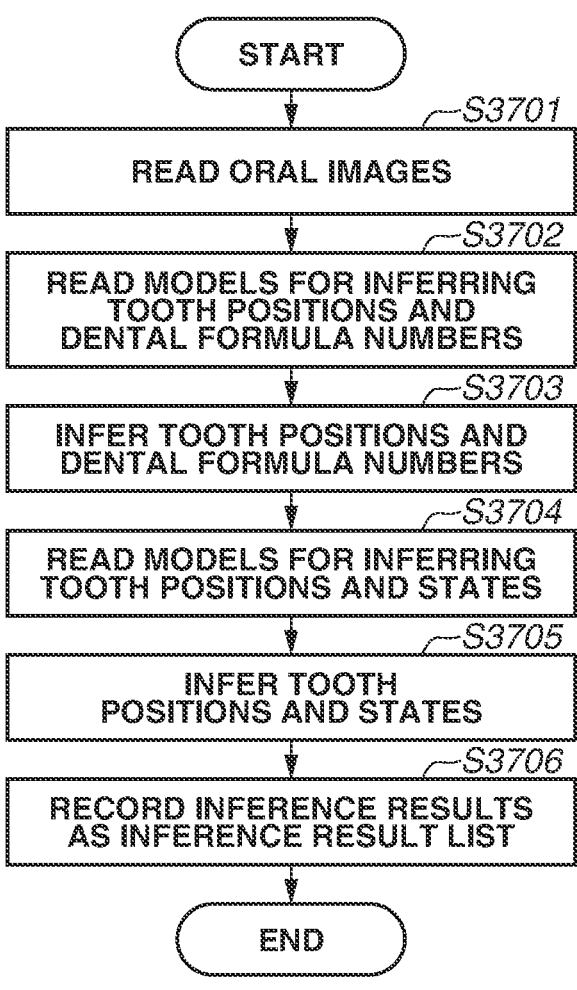
FIG. 37 is a flowchart illustrating an operation of an image processing apparatus in dental formula inference processing according to a seventh exemplary embodiment.

FIG. 37 is a flowchart illustrating an operation of the image processing apparatus 101 according to the present exemplary embodiment in the dental formula inference processing step S240 of FIG. 2C. The processing up to the output of the inference result list illustrated in FIG. 34 will be described with reference to FIG. 37.

In steps S3701 to S3705, the CPU 301 performs processing similar to that of steps S401 to S405 in FIG. 4, respectively.

In step S3706, the CPU 301 records the inference results of the dental formula numbers in step S3703 and the inference results of the states in step S3705 as the inference result list 3400 illustrated in FIG. 34.

Figure 38:
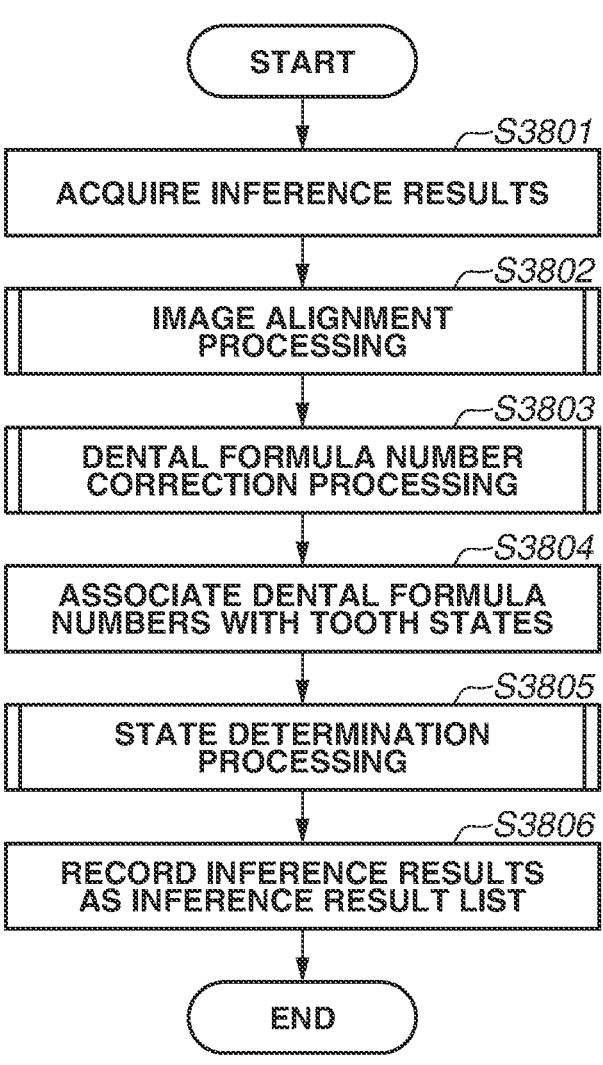
FIG. 38 is a processing flowchart for making comprehensive determinations according to the seventh exemplary embodiment.

Next, comprehensive determination processing according to the present exemplary embodiment will be described with reference to FIGS. 38 to 45.
<Comprehensive Determination Processing>
FIG. 38 illustrates a processing flowchart for making comprehensive determinations based on an inference result list that lists the results of the inference processing. The processing of this flowchart corresponds to that of step S241 in FIG. 2C.

In step S3801, the CPU 301 acquires the inference results of the dental formula numbers and the states of the teeth in each imaging plane from the inference result list 3400.

In step S3802, the CPU 301 performs image alignment processing. This processing corrects the inference result list 3400 so that the lateral positions and sizes of the same teeth in the respective imaging planes match. Detailed processing will be described below with reference to FIG. 39.

In step S3803, the CPU 301 performs dental formula number correction processing using information about a plurality of imaging planes. This processing corrects omission of detection and false detection of the dental formula numbers in each imaging plane in the inference result list 3400. Detailed processing will be described below with reference to FIGS. 42A and 42B.

In step S3804, the CPU 301 performs processing similar to that of step S406 in FIG. 4 to associate the positions and states of the respective teeth based on the detection results of the dental formula numbers and the detection results of the states. The results are recorded in the determination list 700.

In step S3805, the CPU 301 performs state determination processing using information about a plurality of imaging planes. The comprehensive determinations 708 in the determination list 700 are made by this processing so that the states of the same teeth in the respective imaging planes do not conflict. Detailed processing will be described below with reference to FIG. 44.
<Image Alignment Processing>
Next, the image alignment processing in step S3802 of FIG. 38 will be described with reference to the flowchart of FIG. 39. This processing converts the images and the inference results for the purpose of alignment since the position coordinates (X coordinates) of the respective teeth are desirably the same in a plurality of oral images to be used in the dental formula number correction processing using information about the plurality of imaging planes to be described below.

In step S3901, the CPU 301 performs distortion correction processing on a front view image and the inference results thereof. The front view image is a perspective projection of the dental arch and is thus distorted. The farther behind the teeth in the dental arch, the greater the distances from the lens and the smaller the teeth in the image. This causes a difference in the positional relationship of the teeth between the occlusal view and the front view. The difference is corrected by this distortion correction processing. Specifically, the following processing is performed. Assume that a dental arch can be approximated by a solid V formed by splitting an elliptic cylinder by half along the minor axis. Assume also that the major axis radius is L, the minor axis radius is S, the major axis is on the optical axis of the lens, and the in-focus position is located near the incisors at the end of the major axis. The major and minor axis radii L and S are set using the average size of the dental arch of an adult with normal occlusion. Information about the focal length f of the lens, the distance Z from the lens to the object (in-focus position), and the width and height of the sensor, $S_w \times S_h$, are acquired from the Exif tag of the image. Assume that 90% of the lateral width of the image is occupied by the area of the solid V.

Figure 41:
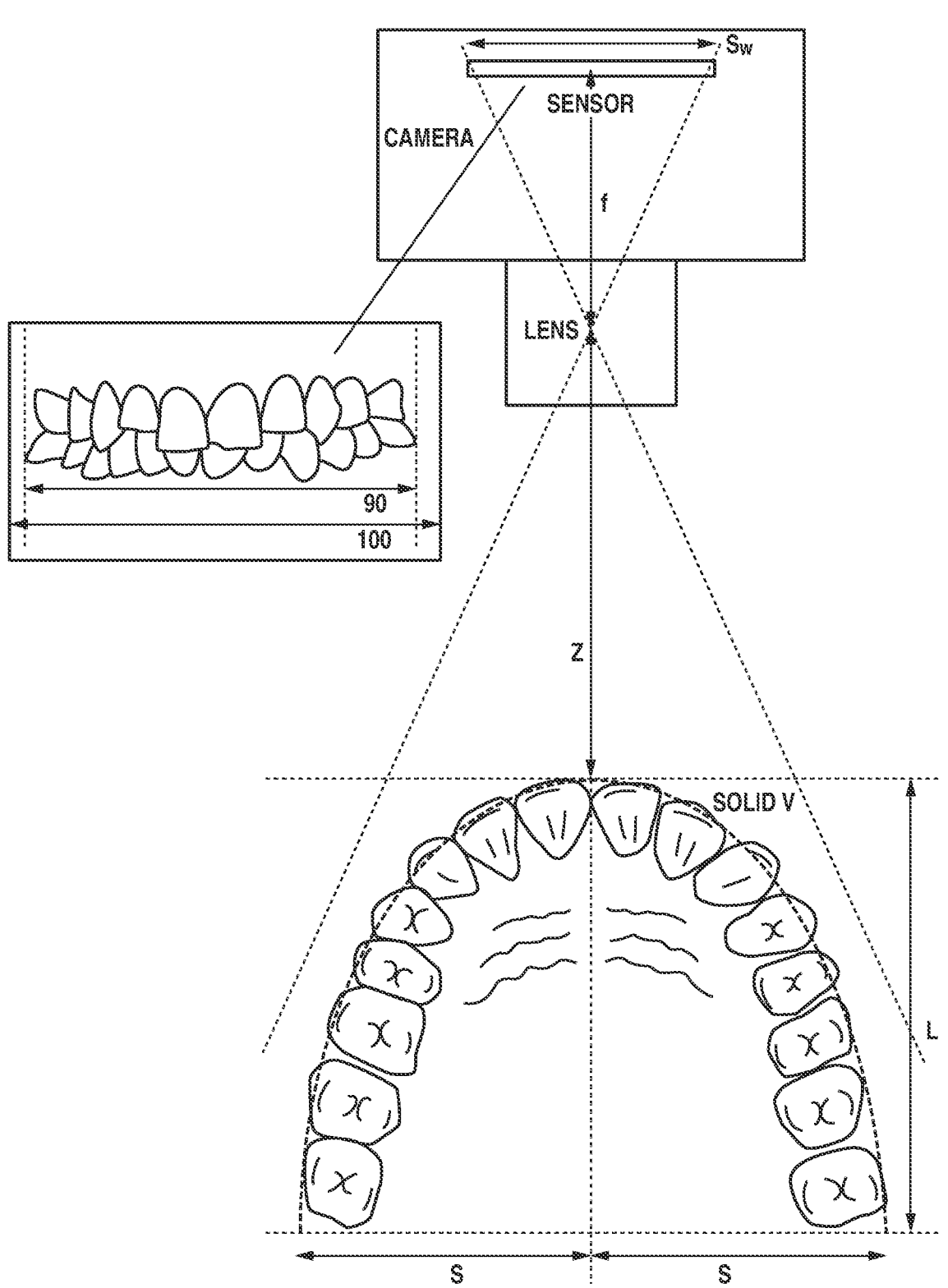
FIG. 41 is a diagram illustrating a front view image that is a perspective projection of a solid according to the seventh exemplary embodiment.

In such a case, the front view image can be regarded as a perspective projection of the solid V as illustrated in FIG. 41. The CPU 301 performs back calculation of the perspective projection on each pixel based on the information acquired in step S3901, and then performs parallel projection to transform the front view image into a distortion-free image. In the meantime, the CPU 301 recalculates the coordinates of the respective rectangles in the inference result list 3400 through calculations similar to those of the image. The left and right side view images can be similarly processed, whereas the processing may be omitted since differences in the distances from the respective teeth to the lens are relatively smaller than in the front view image. Alternatively, a step taking into account the differences in the positional relationship may be added to the processing of FIG. 42A to be described below instead of the processing of this step S3901. Details will be described below.

In step S3902, the CPU 301 performs position and size correction processing on the images using the inference results of a tooth of high inference detection accuracy. Specifically, the following processing is performed. The present exemplary embodiment deals with the case of aligning the X coordinate positions of the rectangles of inference results 4001 and 4002 of the right upper-1 tooth illustrated in FIG. 40A.

The CPU 301 initially calculates the length of the X side of the inference result 4001 of the right upper-1 tooth in the upper jaw image and that of the inference result 4002 of the right upper-1 tooth in the front view image. The former is a difference between the lower right X coordinate ($x_{max\_url}$) and the lower left X coordinate ($x_{min\_url}$) of the rectangle of the inference result of the right upper-1 tooth in the upper jaw image. The latter is a difference between the lower right X coordinate ($x_{max\_frl}$) and the lower left X coordinate ($x_{min\_frl}$) of the rectangle of the inference result of the right upper-1 tooth in the front view image. The former is denoted by $L_{url}$, and the latter $L_{frl}$. In other words, $L_{url}=(x_{max\_url})-(x_{min\_url})$, and $L_{frl}=(x_{max\_frl})-(x_{min\_frl})$. Next, the CPU 301 compares the calculated $L_{url}$ and $L_{frl}$. Here, $L_{url}<L_{frl}$, and the CPU 301 sets the magnification ratio of the upper jaw image, $R_{rl}$, to $L_{frl}/L_{url}$.

Figure 40B:
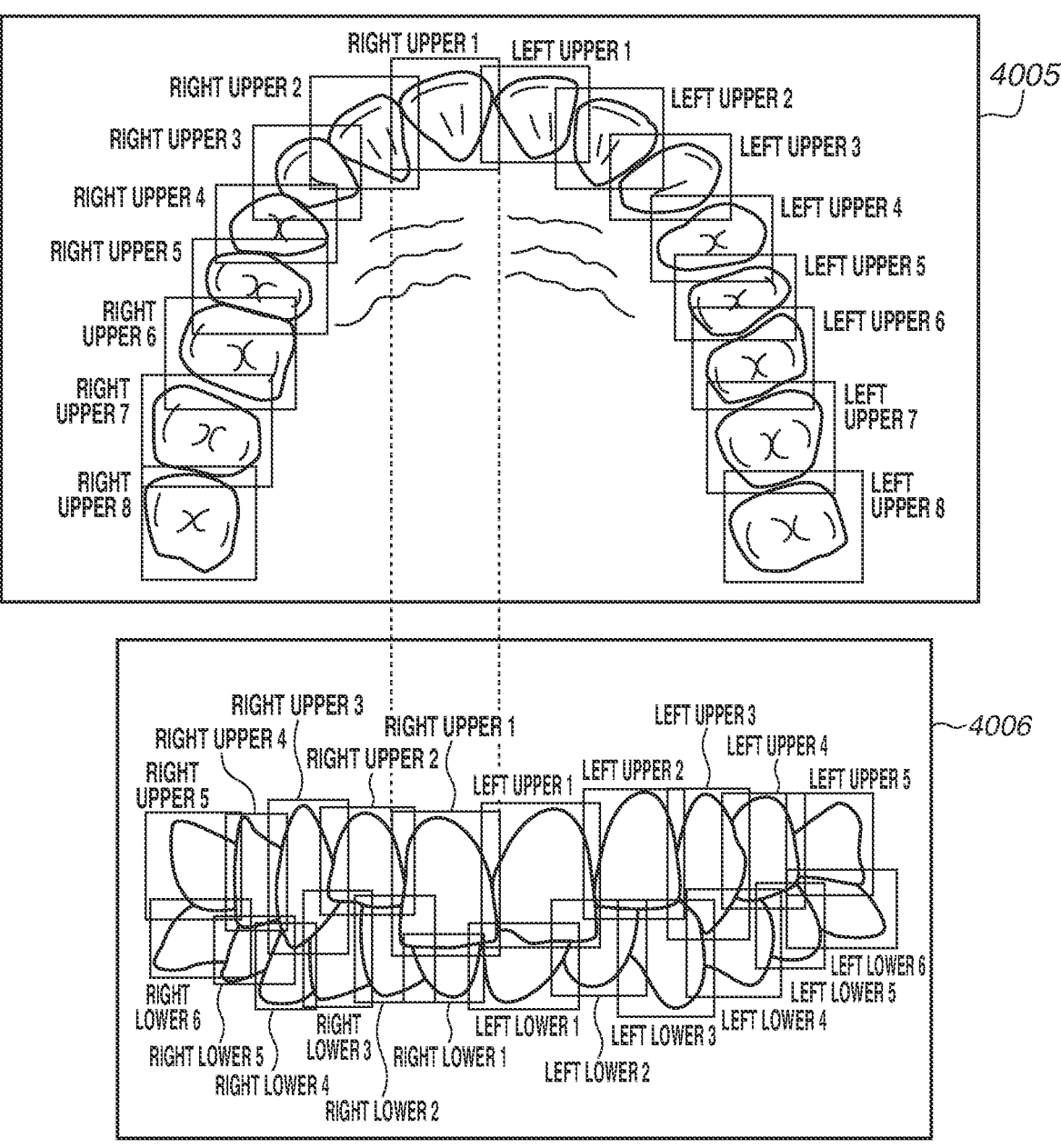

FIG. 40B illustrates a magnified upper jaw image 4005 obtained by applying the calculated magnification ratio $R_{rl}$ to the upper jaw image 4003. As a result, the rectangles of the inference results of the teeth in the upper jaw image 4005 and a front view image 4006 in FIG. 40B have coordinates of similar values. If an image is magnified (reduced), the coordinates of the rectangles of the inference results are modified by recalculating the coordinate information about the rectangles of the inference results using the foregoing magnification ratio $R_{rl}$.

Specifically, the inference result data output as described above with reference to FIG. 34 includes as many rectangles as the number of objects detected. The coordinate $x_{min}$ at the left end, the coordinate $x_{max}$ at the right end, the coordinate $y_{min}$ at the top end, and the coordinate $y_{max}$ at the bottom end of each of the rectangles are updated based on the foregoing magnification ratio $R_{rl}$. Moreover, image moving processing may be performed so that the X coordinate of the median in the front view image determined by a method similar to that of step S1508 of FIG. 15 agrees with the X coordinate of the median in the upper jaw image determined by a method similar to that of step S1510. The CPU 301 may further calculate the tilt of the upper jaw image by a method similar to that of step S1529, and rotate the upper jaw image based on the calculated tilt so that the upper jaw image is in proper orientation.

<Dental Formula Number Correction Processing>

Next, the dental formula number corresponding processing using information about a plurality of images in step S3803 of FIG. 38 will be described with reference to the flowcharts of FIGS. 42A and 42B. The dental formula number correction processing of both FIGS. 42A and 42B may be performed. The dental formula number correction processing of either one of FIGS. 42A and 42B may be performed.

Figures 42A, 42B:
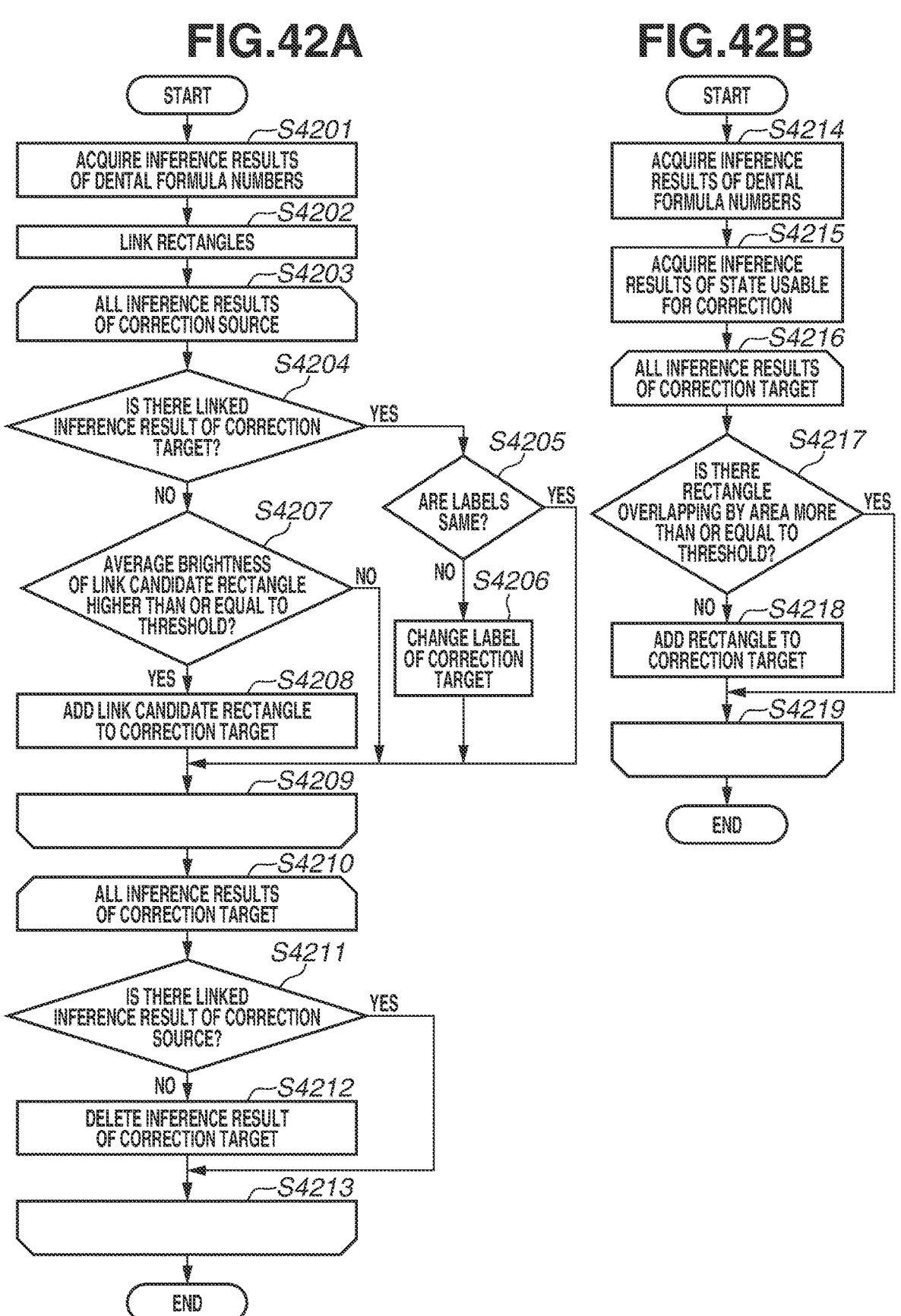
FIGS. 42A and 42B are flowcharts illustrating dental formula number correction processing using information about a plurality of images according to the seventh exemplary embodiment.

Referring to FIG. 42A, processing for correcting omission of detection of a dental formula number on an imaging plane by using the inference results on another imaging plane of a relatively high recognition rate will be described. This processing is based on the knowledge that the tooth recognition rate varies depending on the imaging planes. Note that if the fixed flag on the inference result to be corrected is set to true in the inference result list 3400, the CPU 301 does not correct the inference result, since the inference result is already corrected by the dentist and considered to not need to be corrected. The present exemplary embodiment describes an example where the inference results of dental formula numbers in a correction target are corrected with either one of the upper and lower occlusal views as a correction source and one of the front view, left side view, and right side view as the correction target.

In step S4201, the CPU 301 acquires the inference results of the dental formula numbers of the correction source and the correction target from the inference result list 3400.

In step S4202, the CPU 301 links the rectangles of the inference results of the correction source with those of the correction target based on position information. A specific method will be described with reference to FIGS. 43A and 43B. FIG. 43A illustrates an example of the linking method where the correction source is the occlusal view of the upper jaw and the correction target is the front view. The correction source image includes inference results 4301 to 4304, and the correction target image includes inference results 4305, 4307, and 4308. For ease of description, only some of the inference results of the correction source and the correction target are illustrated here. Of these, rectangles closest in terms of the position in the X-axis direction are linked with each other.

Rectangles having the closest X coordinates, like the rectangles of the inference results 4301 and 4305, may be selected to be linked. Ones with a maximum area of overlap between the left and right ends may be selected. In either case, the CPU 301 determines that there are no rectangles to be linked if a difference between the X coordinates of the centers is greater than or equal to a threshold or the overlap is smaller than or equal to a threshold.

To prevent the teeth in the lower jaw from being mistakenly linked, rectangles of which the centers are located below the image center among the rectangles of the correction target may be excluded from link targets. Only rectangles of the correction target that are inferred to be teeth in the upper jaw may be assumed as link targets. The farther behind the teeth in the dental arch, the greater the areas hidden behind the teeth in front in the front view. Such teeth can fail to be correctly linked due to increased deviations in the X coordinates of the centers. In this example, the rectangle 4304 is linked with the rectangle 4307 having the closest center X coordinate, whereas the correct link is with the rectangle 4308.

Take, for example, a rectangle 4310. The CPU 301 may then determine the center coordinates of the rectangle 4310 using the area located outside the left and right ends of a rectangle 4309 in front, and use the determined center coordinates for linking (to link the rectangle 4310 with a rectangle 4311). FIG. 43B illustrates an example of the linking method in a case where the correction source is the occlusal view of the upper jaw and the correction target is the left side view. The correction source image includes inference results 4312 to 4314, and the correction target image includes inference results 4315 to 4317. For ease of description, only some of the inference results of the correction source and the correction target are illustrated here.

The CPU 301 initially rotates the occlusal view image and the inference results of the correction source by a certain angle so that the upward direction of the image agrees with the position of the camera capturing the left side view image. In the present exemplary embodiment, the rotation angle is 45° counterclockwise, in view of a typical angle at which the left side view image is captured. The subsequent linking of the rectangles is performed as with the method described with reference to FIG. 43A.

Figure 39:
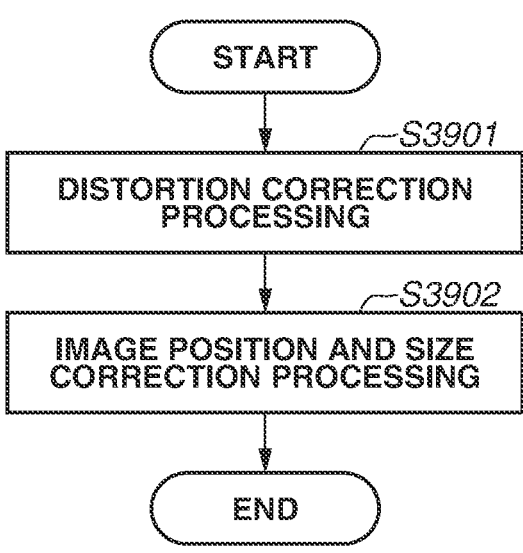
FIG. 39 is a processing flowchart about image alignment according to the seventh exemplary embodiment.

Instead of the position and size correction processing in step S3902 of FIG. 39, processing taking into account a deviation in the positional relationship due to distortion caused by perspective projection may be performed in this step S4202. Specifically, in comparing the positions in the X-axis direction, the CPU 301 compares the coordinates recalculated to accommodate the deviation instead of comparing the intact values. FIG. 43C illustrates such an example. Suppose that the focal length of the lens acquired from the Exif tag of the correction target image is f, the distance from the lens to the object (in-focus position) is Z, and the size of the object per pixel of the image acquired from the Exif tag of the correction source image is l. The CPU 301 determines pixel-equivalent values off and z by f'=f/l and Z'=Z/l, respectively. Assuming that the intersection of the top end of the topmost rectangle in the correction source image with the centerline dividing the image into left and right halves is the point of origin and the center coordinates of each rectangle are (x, y), recalculated coordinates (x', y') are given by x'=x×(Z'−y')/(Z'−y) and y'=Z'−f'. The CPU 301 can thus eventually calculate x'=x×f'/(Z'−y). In linking the rectangles, the CPU 301 compares the X coordinate of the center of the rectangle in the correction target with the foregoing calculation of the X coordinate of the center of the rectangle in the correction source.

Steps S4203 to S4209 constitute loops where the CPU 301 processes the inference results of the correction source in order. An inference result of the correction source will be referred to as a rectangle A.

In step S4204, if there is an inference result of the correction target linked with the rectangle A in step S4202 (YES in step S4204), the processing proceeds to step S4205. If not (NO in step S4204), the processing proceeds to step S4207. The linked inference result will be referred to as a rectangle B.

In step S4205, if the labels of the rectangles A and B are the same (YES in step S4205), the processing proceeds to step S4209. If not (NO in step S4205), the processing proceeds to step S4206.

In step S4206, the CPU 301 rewrites the label of the rectangle B with that of the rectangle A, and updates the inference result list 3400. Note that if the fixed flag of the rectangle B is true, the CPU 301 does not change the label of the rectangle B.

In step S4207, the CPU 301 sets a link candidate rectangle B' in the correction target. If the average brightness of the pixels in the link candidate rectangle B' is higher than or equal to a threshold (YES in step S4207), the processing proceeds to step S4208. If not (NO in step S4207), the processing proceeds to step S4209. Here, the left and right ends of the link candidate rectangle B' are located at the same positions as those of the rectangle A. The top and bottom ends are averages of those of two rectangles closest to the left and right ends among the inference results of the correction target. FIG. 43A illustrates a link candidate rectangle 4306 set for the rectangle 4302 in dotted lines.

In step S4208, the CPU 301 assumes the link candidate rectangle B' set in step S4207 as an omission of detection, sets the label of the correction source thereto, and adds the link candidate rectangle B' to the inference results of the correction target. The CPU 301 updates the inference result list 3400.

Steps S4210 to S4213 constitute loops where the CPU 301 processes the inference results of the correction target in order. An inference result of the correction target will be referred to as a rectangle C.

In step S4211, if there is an inference result of the correction source linked with the rectangle C in step S4202 (YES in step S4211), the processing proceeds to step S4213. If not (NO in step S4211), the processing proceeds to step S4212.

In step S4212, the CPU 301 assumes the rectangle C as a false detection result, deletes the rectangle C from the inference results of the correction target, and updates the inference result list 3400. If the fixed flag of the rectangle C is true, the CPU 301 does not delete the rectangle C.

<Inference Result Correction Processing>

FIG. 42B illustrates processing for correcting the inference results of the dental formula numbers in the same image using the inference results of the states in the same image. In the present exemplary embodiment, an omission of detection of a dental formula number is corrected based on the knowledge that if the inference results include a state detectable with a high recognition rate, there is highly likely to be a tooth at the same position.

In step S4214, the CPU 301 acquires the inference results of the dental formula numbers.

In step S4215, the CPU 301 acquires inference results usable for correction among the inference results of the states. The inference results of the states usable for correction refer to ones labeled with a recognition rate of the trained model higher than or equal to a threshold.

Steps S4216 to S4219 constitute loops where the CPU 301 processes the inference results of the states acquired in step S4215 in order. An inference result of a state will be referred to as a rectangle A.

In step S4217, if there is a rectangle overlapping the rectangle A by more than or equal to a threshold among the inference results of the dental formula numbers acquired in step S4214 (YES in step S4217), the processing proceeds to step S4219. If not (NO in step S4217), the processing proceeds to step S4218.

In step S4218, the CPU 301 sets a new rectangle at the same position as the rectangle A, sets a label consecutively numbered with the rectangles nearby among the other inference results of the dental formula numbers, and adds the rectangle to the inference results of the dental formula numbers.

<State Determination Processing Based on Plurality of Images>

Figure 44:
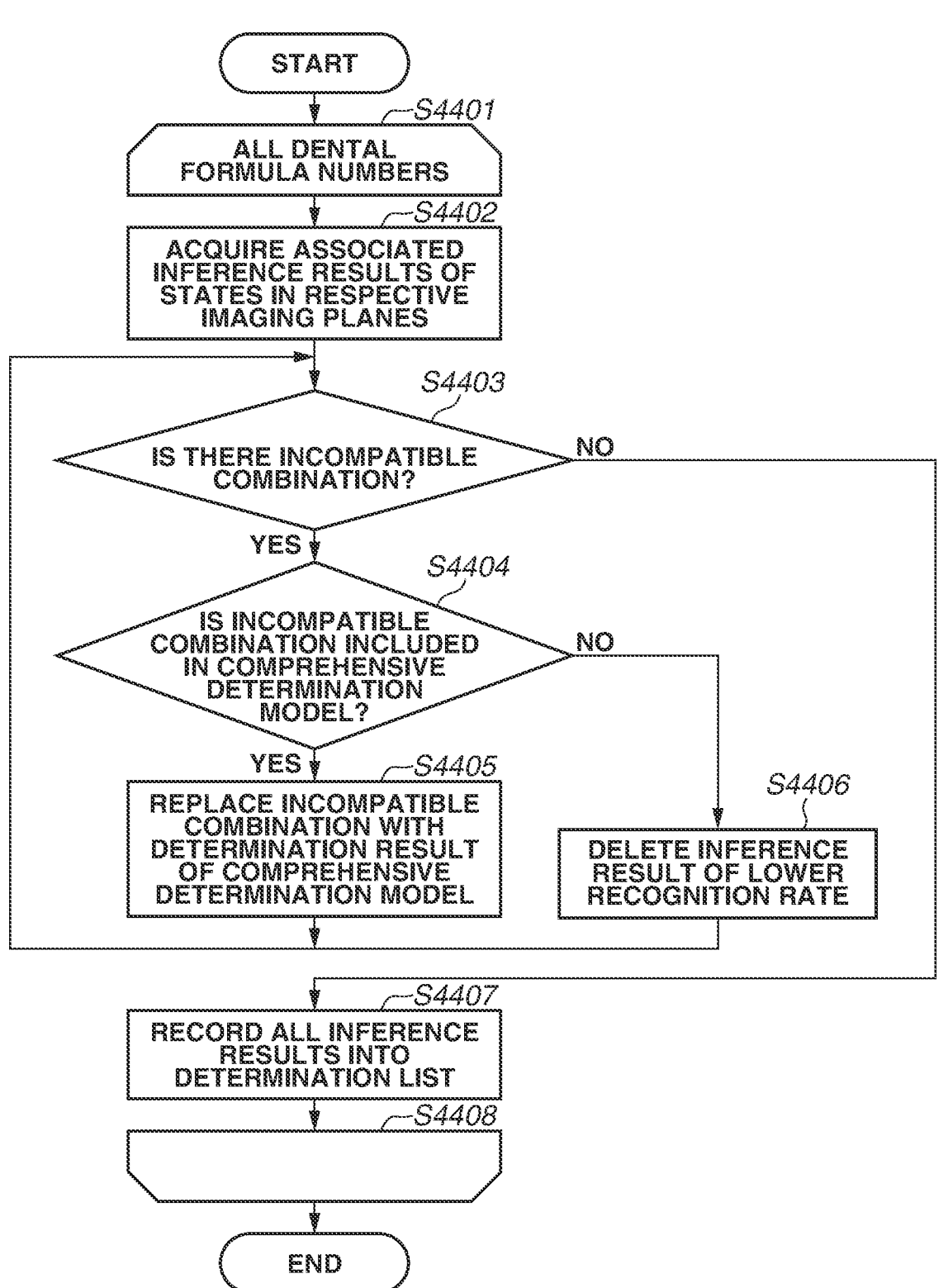
FIG. 44 is a flowchart of state determination processing using information about a plurality of imaging planes according to the seventh exemplary embodiment.

Next, the state determination processing using information about a plurality of imaging planes in step S3805 of FIG. 38 will be described with reference to the flowchart of FIG. 44.

Steps S4401 to S4408 constitute loops for processing all the dental formula numbers in order.

In step S4402, the CPU 301 acquires inference results of states associated with the target dental formula number in step S3804 in all the imaging planes.

In step S4403, if there is an incompatible combination among the inference results of the states acquired in step S4402 (YES in step S4403), the processing proceeds to step S4404. If not (NO in step S4403), the processing proceeds to step S4407. Examples of the incompatible combination include a combination of states that are unable to coexist on the same tooth, like a facing crown covering the entire tooth and a bridge. By contrast, examples of a compatible combination include gingivitis and a crown. A list of incompatible combinations may be described in a predetermined program in advance. For easy modification afterward, a list stored in a storage medium may be read.

In step S4404, if the incompatible combination extracted in step S4403 is included in a comprehensive determination model (YES in step S4404), the processing proceeds to step S4405. If not (NO in step S4404), the processing proceeds to step S4406. The comprehensive determination model is a model for inferring the state of a tooth in a comprehensive manner with the inference results of the states in the respective imaging planes as inputs, based on prior knowledge of differences in appearance such as the shape and surface color of the object to be inferred depending on the point of view. In the present exemplary embodiment, as illustrated in FIG. 45, the comprehensive determination model is a matrix for deriving a comprehensive determination from a combination of imaging planes and inference results. For example, if a resin-faced crown is inferred in the occlusal view and a tooth-colored crown is inferred in the front view, the comprehensive determination is a resin-faced crown. If a metal bridge is inferred in the occlusal view and a tooth-colored pontic is inferred in the front view, the comprehensive determination is a resin-faced pontic.

In step S4405, the CPU 301 replaces the incompatible combination extracted in step S4403 with the determination result of the comprehensive determination model.

In step S4406, the CPU 301 assumes that either one of the inference results in the incompatible combination extracted in step S4403 is erroneous, and deletes the inference result of which the recognition rate by the trained model is lower. The CPU 301 may delete the inference result of which the degree of certainly is lower in execution of inference by the trained model.

In step S4407, the CPU 301 records all the remaining inference results into the comprehensive determinations of the determination list 700.

<Correction of Inference Results>

Processing where the user corrects inference results by operating rectangles superimposed on an image using a dental electronic medical record display terminal UI for checking and correcting inference results will be described with reference to FIGS. 46A and 46B.

Figure 46A:
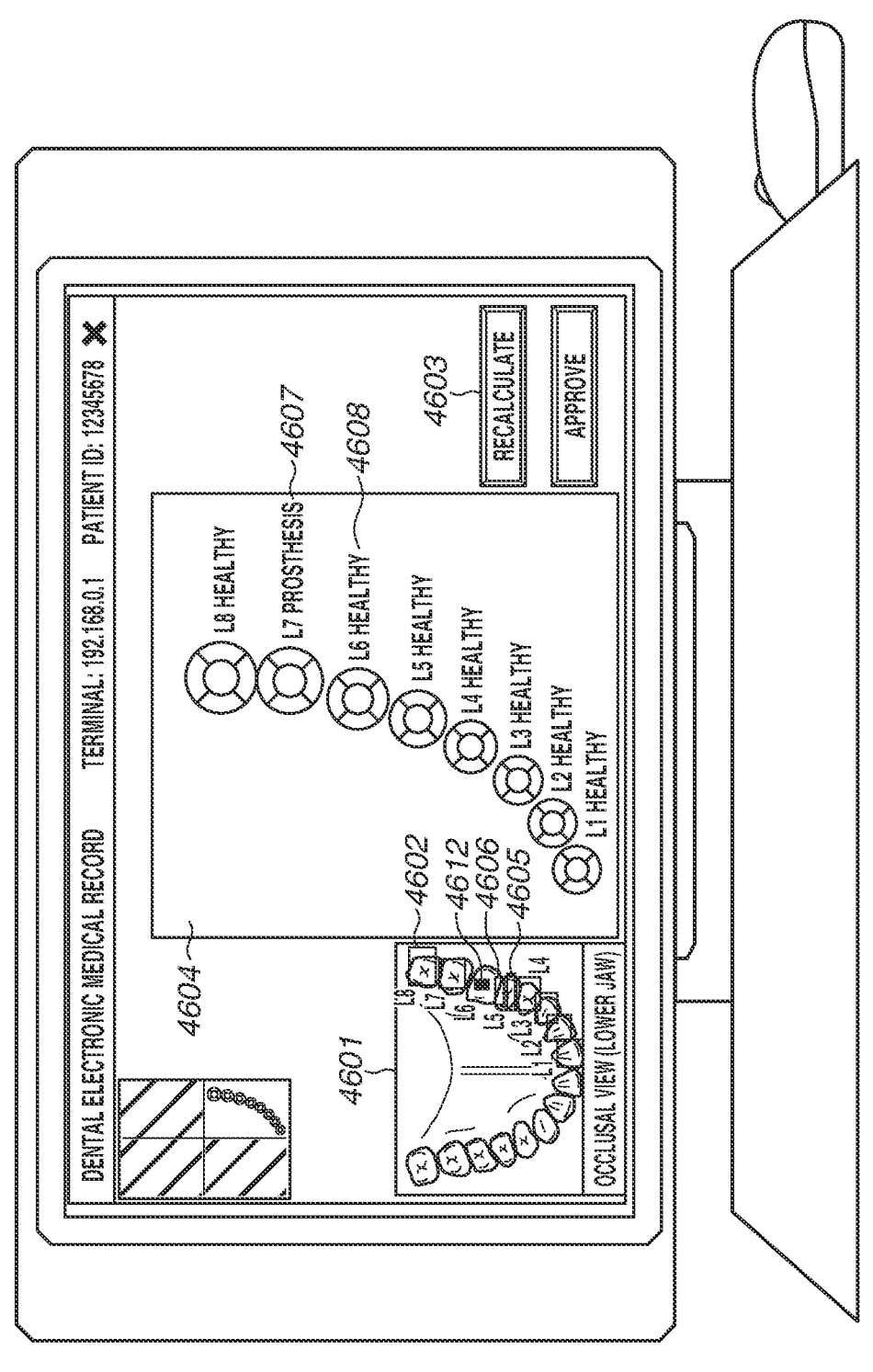
FIGS. 46A and 46B are diagrams illustrating a dental electronic medical record display terminal UI for checking and correcting inference results according to the seventh exemplary embodiment.
Figure 46B:
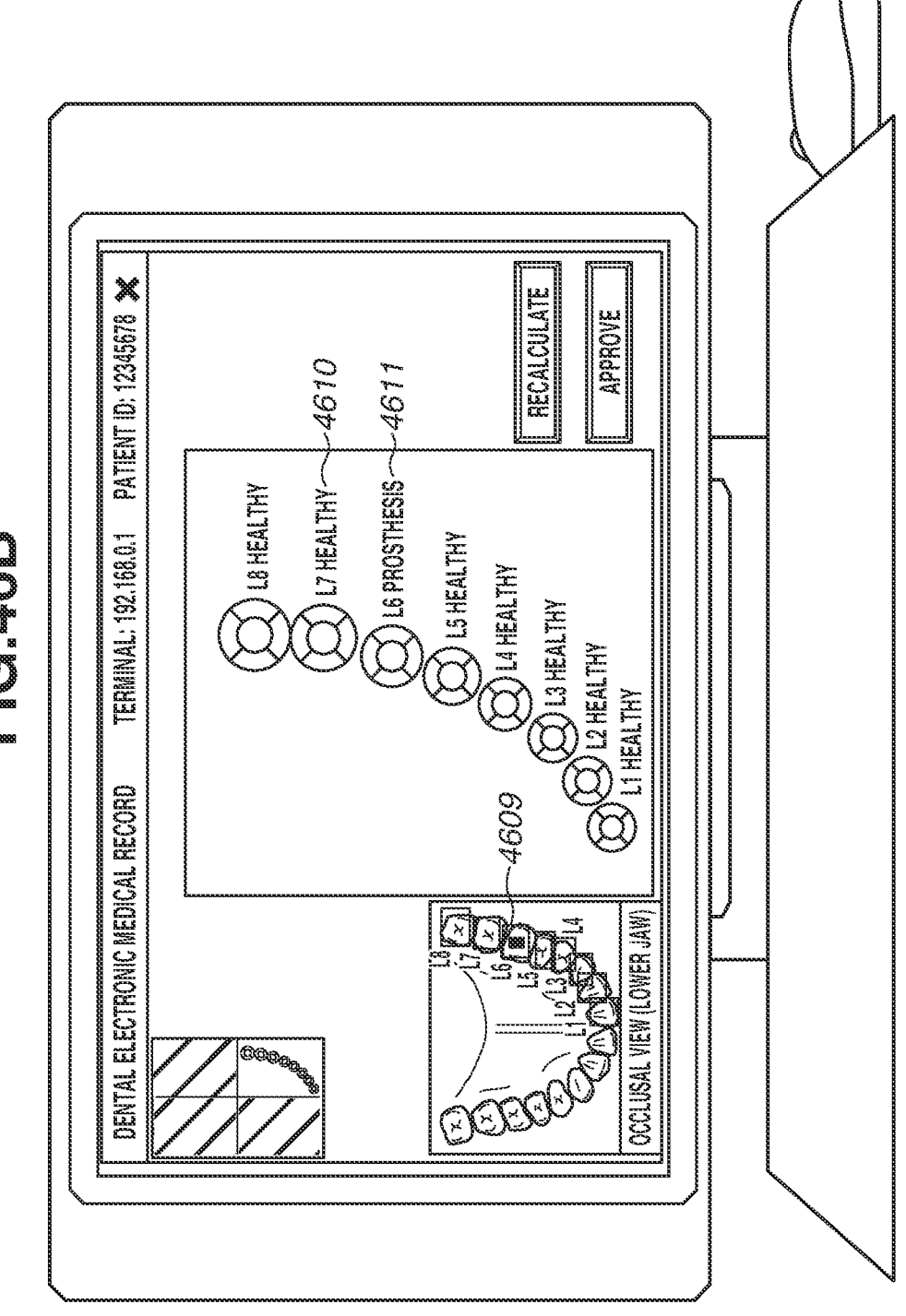

FIG. 46A illustrates the dental electronic medical record display terminal UI for checking and correcting inference results according to the present exemplary embodiment. The dental electronic medical record display terminal UI is similar to that of FIG. 9A unless otherwise specified. A UI 4601 displays the inference results of the dental formula numbers recorded in the inference result list 3400 on the image in a superimposed manner. Rectangles 4602, 4605, and 4606 represent inferred tooth positions and numbers. An inference result 4612 represents a prosthesis. The user can move a rectangle by clicking on and dragging and dropping the rectangle on the UI 4601. The user can select an end of a rectangle and drag and drop the end to enlarge or reduce the rectangle in that direction. Here, the CPU 301 updates the position information about the operated rectangle in the inference result list 3400, and sets the fixed flag to true. A UI 4604 displays the states of the respect teeth recorded in the comprehensive determination 708 of the determination list 700 as fitted to the dental chart. Character strings 4607 and 4608 indicate tooth states. The inference results can also be corrected by user operations on the UI 4604. Detailed processing will be described below with reference to FIG. 47. A recalculation button 4603 can be pressed by the user. If the recalculation button 4603 is pressed, the CPU 301 performs the comprehensive determination processing step S241 of FIG. 2C, and reflects the result on the UI 4604.

As an example, processing in a case where the user moves the rectangle 4606 to a position 4609 and presses the recalculation button 4603 will be described. Before the processing, the position of tooth L6 is erroneously inferred and the rectangle 4606 is displayed at a position overlapping tooth L5. The prosthesis 4612, which is supposed to be associated with tooth L6 in step S3804 of FIG. 38, is thus associated with tooth L7. Since the rectangle 4606 is expected to be superimposed not on tooth L5 but rather on tooth L6, the position of the rectangle 4606 is desirably corrected. The user therefore moves the rectangle 4606 to the position 4609 as illustrated in FIG. 46B. The user then presses the recalculation button 4603. Consequently, as illustrated in FIG. 46B, the CPU 301 changes the character string 4607 of the state from "prosthesis" to "healthy", and changes the character string 4608 of the state from "healthy" to "prosthesis" based on the results of the comprehensive determinations.

Next, processing where the user corrects inference results by operating the UI on the dental chart on the dental electronic medical record display terminal UI for checking and correcting inference results will be described with reference to FIGS. 47 to 51.

Figure 47:
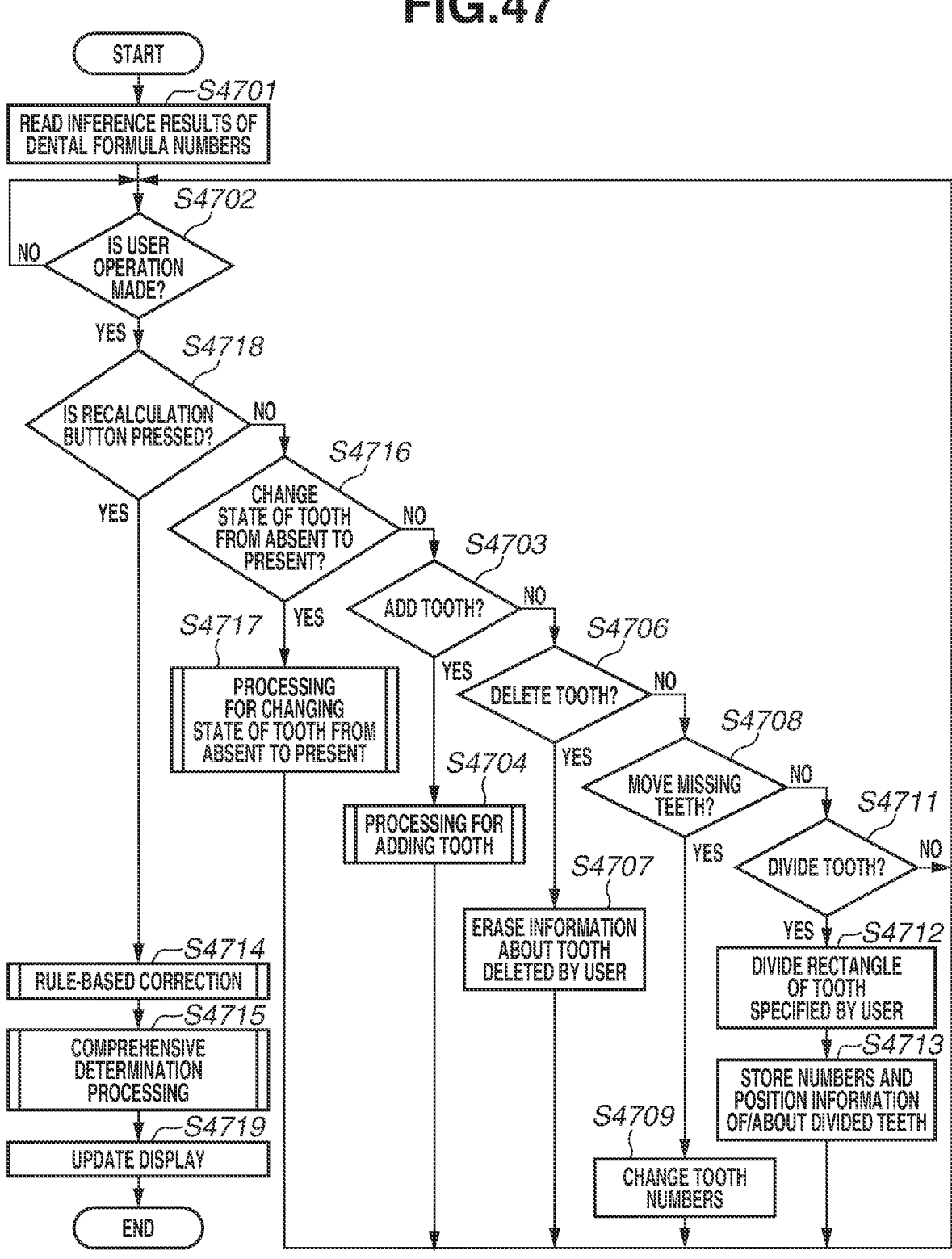
FIG. 47 is a flowchart of processing for correcting inference results according to the seventh exemplary embodiment.
Figure 49:
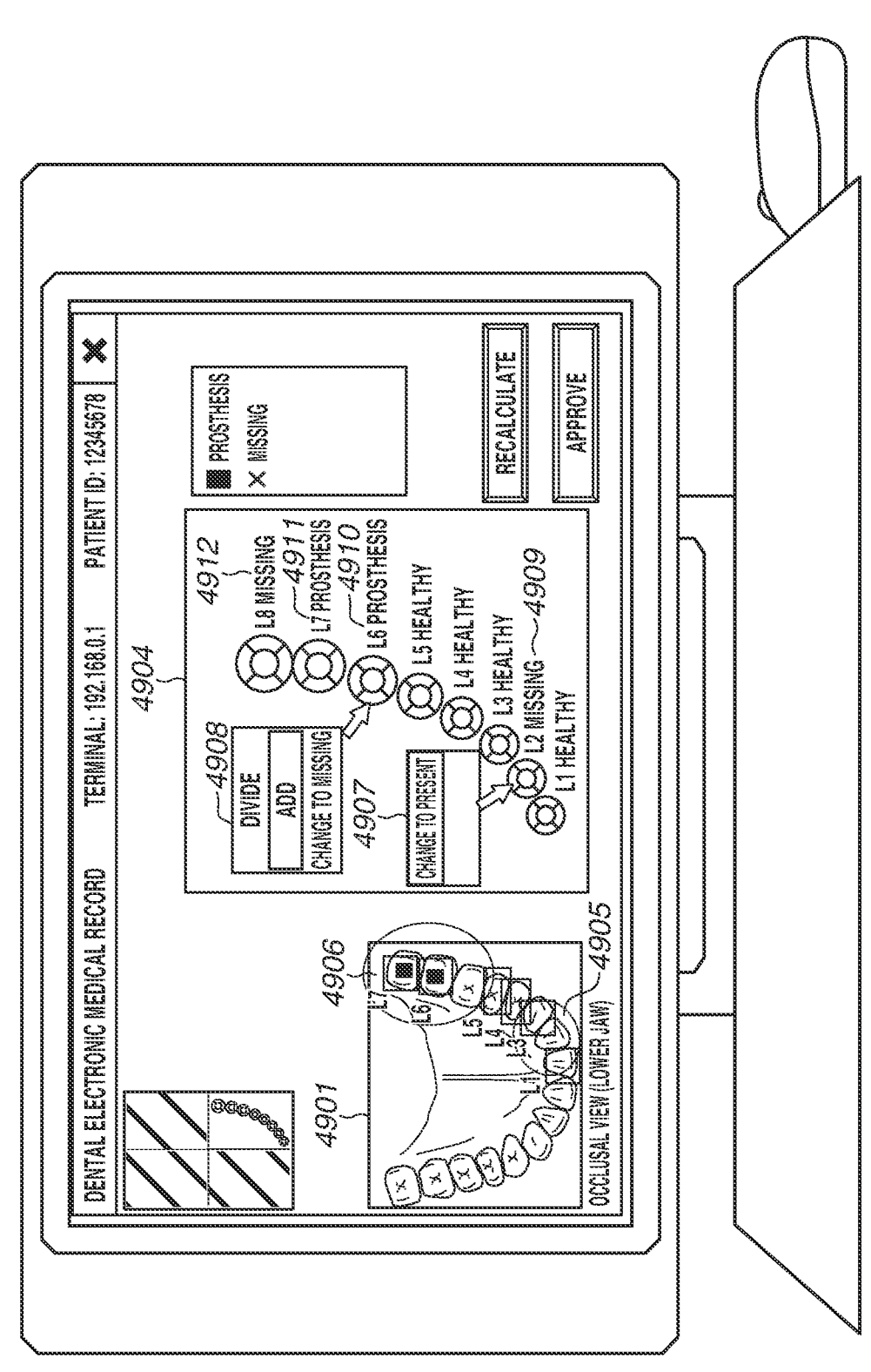
FIG. 49 is a diagram for describing an example of the display screen according to the seventh exemplary embodiment.

The processing in correcting inference results by user operations on the UI 4604 will be described with reference to the flowchart of FIG. 47. Referring to this flowchart, processing from when the dental electronic medical record display terminal UI is displayed to when the user presses the recalculation button 4603 will be described.

In step S4701, the CPU 301 reads the inference results of the dental formula numbers from the inference result list 3400 into the RAM 303, and displays the inference results on the dental electronic medical record display terminal UI 4604.

In step S4702, the CPU 301 determines whether a user operation is made. The user operation refers to an operation made on the UI 4604 using a pointing device such as a mouse. If a user operation is determined to be made (YES in step S4702), the processing proceeds to step S4718. If not (NO in step S4702), the processing proceeds to step S4702.

In step S4718, if an operation to press the recalculation button 4603 is determined to be made by the user (YES in step S4718), the processing proceeds to step S4714. If not (NO in step S4718), the processing proceeds to step S4716.

In step S4714, the CPU 301 performs the processing for correcting the tooth positions and numbers described with reference to FIG. 13, using the dental formula numbers and position information stored in the RAM 303. Conflicting dental formula numbers due to a correction made by user operations to be described below are thereby corrected.

In step S4715, the CPU 301 performs the comprehensive determination processing step S241 of FIG. 2C. As a result, the inferred tooth positions and states of closest center coordinates are linked with each other.

In step S4719, the CPU 301 updates the display of the dental electronic medical record display terminal UI with the corrected inference results. This enables the user to visually check the presence or absence of teeth and the states of the teeth.

In step S4716, if an operation to change the state of a tooth from absent to present is determined to be made by the user (YES in step S4716), the processing proceeds to step S4717. If not (NO in step S4716), the processing proceeds to step S4703. An example of the operation will be described with reference to FIG. 49. Portions not described in particular are similar to in FIGS. 46A and 46B. A UI 4901 corresponds to the UI 4601, and a UI 4904 corresponds to the UI 4604. An area 4905 indicates an omission of detection where tooth L2 is supposed to be detected. The user thus wants to make a correction so that tooth L2 is present at the position of the area 4905. For that purpose, the user right-clicks on tooth L2 in the UI 4904, and the CPU 301 displays a state change list 4907. The state change list 4907 is a UI for listing operations executable on the right-clicked tooth depending on the state of the tooth. While a right click is described as an example of the operation to display the state change list 4907, the state change list 4907 may be displayed based on a mouse-over or other operations. The state change list 4907 displays "change to present" if the target tooth is missing, and displays "change to missing" in other cases. If the number of teeth displayed in the UI 4904 other than missing is seven or less, the state change list 4907 further displays "divide" and "add". Displaying appropriate items depending on the state enables the user to select only appropriate operations. In this example, the tooth state is missing, and "change to present" is displayed. The user implements the operation by pressing "change to present". The CPU 301 may store the operation selected by the user for each tooth from the state change list 4907 into the RAM 303 as a history, and change the order of operations displayed on the state change list 4907 in descending order of the numbers of times the operations are stored in the history. This facilitates the user to find operations likely to be performed.

In step S4717, the CPU 301 performs processing for the case where the user changes the presence or absence of a tooth from "absent" to "present". The processing will be described in detail below with reference to FIG. 50. The user then presses the recalculation button, and the CPU 301 performs steps S4714 and S4715. As a result, a state 4909 is changed from missing to healthy.

In step S4703, if an operation to add a tooth is made by the user (YES in step S4703), the processing proceeds to step S4704. If not (NO in step S4703), the processing proceeds to step S4706. An example of the operation will be described with reference to FIG. 49. An area 4906 indicates an omission of detection where tooth L6 is supposed to be detected. Moreover, tooth L7 is detected as tooth L6, and tooth L8 is detected as tooth L7.

The user thus wants to make a correction so that tooth L6 is present at the position of the area 4906. For that purpose, the user right-clicks on tooth L6 in the UI 4904, and the CPU 301 displays a state change list 4908. The state change list 4908 has functions similar to those of the state change list 4907. In this example, "add" is displayed. The user implements the operation by pressing "add".

In step S4704, the CPU 301 performs processing for adding a tooth, and determines the position and number of tooth L6. The processing will be described in detail below with reference to FIG. 51. The user then presses the recalculation button, and the CPU 301 performs steps S4714 and S4715. As a result, a state 4910 is changed from prosthesis to healthy, a state 4911 is overwritten from prosthesis with information about the same prosthesis, and a state 4912 is changed from missing to prosthesis.

In step S4706, if an operation to delete a tooth is made (YES in step S4706), the processing proceeds to step S4707. If not (NO in step S4706), the processing proceeds to step S4708. An example of the operation will be described with reference to FIG. 48. Portions not described in particular are similar to in FIGS. 46A and 46B. A UI 4801 corresponds to the UI 4601, and a UI 4804 corresponds to the UI 4604. An area 4805 indicates that the image includes an object 4812 other than teeth at the position of tooth L1, and the object 4812 is erroneously inferred to be tooth L1. The user thus wants to make a correction so that tooth L1 is missing. For that purpose, the user implements the operation by dragging and dropping a symbol or state 4814 representing missing to tooth L1, 4816, from a state list 4813. Here, the CPU 301 displays the symbol of missing on tooth L1, 4816. While the state list 4813 displays prosthesis and missing as examples, other states such as decayed and WSD may be displayed.

In step S4707, the CPU 301 erases the information about the tooth deleted by the user. Here, the CPU 301 erases the dental formula number and position information of/about the teeth specified to be deleted by the user from the dental formula numbers and position information in the occlusal view, front view, left side view, and right side view read into the RAM 303 in step S4701, and stores the result into the RAM 303. The user then presses the recalculation button, and the CPU 301 performs steps S4714 and S4715. As a result, a state 4817 of tooth L1 is changed from healthy to missing.

In step S4708, if a missing tooth is moved (YES in step S4708), the processing proceeds to step S4709. If not (NO in step S4708), the processing proceeds to step S4711. The operation here will be described with reference to FIG. 48. An area 4806 indicates a state where the tooth supposed to be inferred as tooth L2 is inferred as tooth L3, and tooth L3 is missing. The user thus wants to make a correction so that tooth L2 is present and tooth L3 is missing. For that purpose, the user implements the operation by moving a missing-indicating symbol x, 4809, displayed on tooth L2 in the UI 4804 to tooth L3 using a drag-and-drop.

In step S4709, the CPU 301 changes the dental formula numbers of the teeth replaced by the user among the dental formula numbers and position information in the occlusal view, front view, left side view, and right side view read into the RAM 303 in step S4701, and stores the result into the RAM 303. Specifically, the CPU 301 changes the dental formula number of the tooth changed from present to missing to that of the tooth changed from missing to present. If the operation described in step S4708 is performed, the CPU 301 changes L3 to L2 among the dental formula numbers read in step S4701. The user then presses the recalculation button, and the CPU 301 executes steps S4714 and S4715. As a result, a state 4811 of tooth L3 is changed from healthy to missing, and a state 4810 of tooth L2 is changed from missing to healthy.

In step S4711, if a tooth is divided (YES in step S4711), the processing proceeds to step S4712. If not (NO in step S4711), the processing proceeds to step S4702. The operation here will be described with reference to FIG. 48. An area 4807 indicates a state where teeth L5 and L6 are erroneously inferred to be a single tooth L5. The user thus wants to divide the inference result of tooth L5 into two so that teeth L5 and L6 are both present. For that purpose, the user right-clicks on tooth L5 in the UI 4804, and the CPU 301 displays a state change list 4818. The state change list 4818 has functions similar to those of the state change list 4907. In this example, the state change list 4818 displays "divide". The user implements the operation by pressing "divide".

In step S4712, the CPU 301 divides the tooth specified by the user. The CPU 301 divides the tooth specified to be divided by the user into two based on the dental formula numbers and positions read into the RAM 303 in step S4701. The dental formula numbers after the division are the same as that of the tooth specified to be divided by the user. The coordinates of the divided rectangles are determined in the following manner. If the number of the tooth specified to be divided by the user is 1 to 3, the X coordinates are divided at the center. The Y coordinate is the same. If the number of the tooth specified to be divided by the user is 4 to 8, the Y coordinates are divided at the center. The X coordinate is the same. This enables tooth division without the user specifying the coordinates. The user then presses the recalculation button, and the CPU 301 performs steps S4714 and S4715. As a result, a state 4819 of tooth L5 is changed from prosthesis to healthy, and a state 4820 of tooth L6 is changed from missing to prosthesis.

In step S4713, the CPU 301 overwrites the dental formula numbers and position information in the occlusal view read into the RAM 303 in step S4701 with the dental formula numbers and position information of/about the teeth divided in step S4712, and stores the result into the RAM 303.

Figure 50:
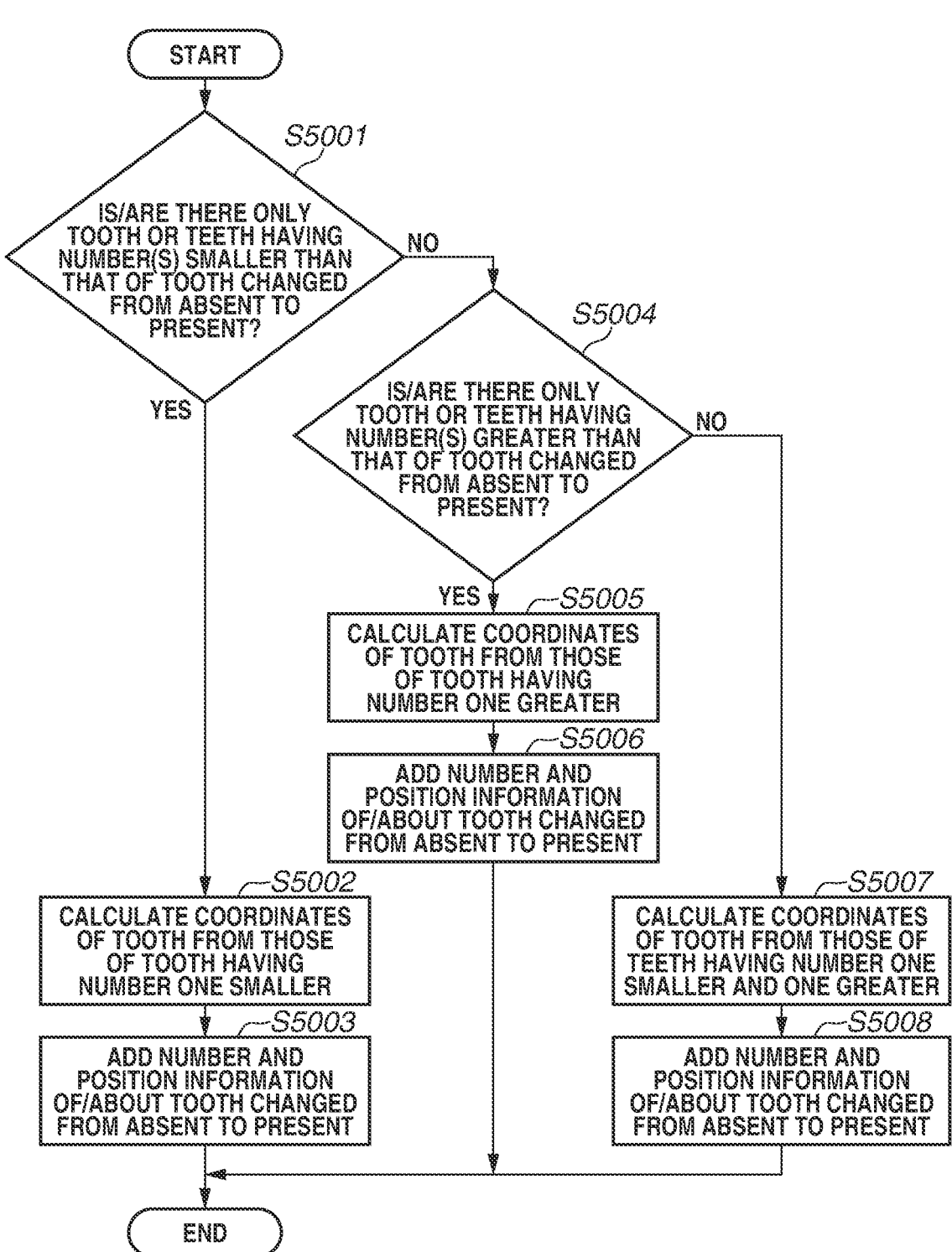
FIG. 50 is a flowchart of processing in a case where the presence or absence of a tooth is changed according to the seventh exemplary embodiment.

Next, the processing in the case where the presence or absence of a tooth is changed from "absent" to "present" in step S4717 of FIG. 47 will be described with reference to the flowchart of FIG. 50.

In step S5001, if there is/are only a tooth or teeth having a number or numbers smaller than that of the tooth changed from absent to present by the user (YES in step S5001), the processing proceeds to step S5002. If not (NO in step S5001), the processing proceeds to step S5004.

In step S5004, if there is/are only a tooth or teeth having a number or numbers greater than that of the tooth changed from absent to present by the user (YES in step S5004), the processing proceeds to step S5005. If not (NO in step S5004), the processing proceeds to step S5007.

In step S5007, the CPU 301 calculates the dental formula number and position information of/about the tooth changed from absent to present by the user. The dental formula number to be calculated is that of the tooth changed from absent to present by the user.

Suppose that the coordinates of the tooth changed from absent to present by the user is A(Ax min, Ax max, Ay min, Ay max), the coordinates of the tooth having a number one smaller than that of the tooth changed from absent to present by the user is B(Bx min, Bx max, By min, By max), and the coordinates of the tooth having a number one greater than that of the tooth changed from absent to present by the user is C(Cx min, Cx max, Cy min, Cy max). The upper left coordinates A(Ax min, Ay min) are given by Eq. 1. The lower right coordinates A(Ax max, Ay max) are given by Eq. 2. The following Eqs. 1 and 2 are equations in making corrections in the left half of the lower jaw:

$$Ax\ min = Bx\ min,\ and$$

$$Ay\ min = Cy\ max. \qquad \text{Eq. 1}$$

$$Ax\ max = Cx\ max,\ and$$

$$Ay\ max = By\ min. \qquad \text{Eq. 2}$$

In making corrections in the left half of the upper jaw, Cy max is replaced with By max, and By min with Cy min. In making corrections in the right half of the lower jaw, Bx min is replaced with Cx min, and Cx max with Bx max. In making corrections in the right half of the upper jaw, Bx min is replaced with Cx min, Cx max with Bx max, Cy max with By max, and By min with Cy max.

The processing proceeds to step S5008. In step S5008, the CPU 301 adds the dental formula number and position information calculated in step S5007 to the dental formula numbers and position information read into the RAM 303 in step S4701.

In step S5002, the CPU 301 calculates the dental formula number and position information of/about the tooth changed from absent to present by the user. Here, the dental formula number to be calculated is that of the tooth changed from absent to present by the user. Suppose that the coordinates of the tooth changed from absent to present by the user are A(Ax min, Ax max, Ay min, Ay max), and the coordinates of the tooth having a number one smaller than that of the tooth changed from absent to present by the user are B(Bx min, Bx max, By min, By max). The upper left coordinates A(Ax min, Ay min) are given by Eq. 3. The lower right coordinates A(Ax max, Ay max) are given by Eq. 4. The following Eqs. 3 and 4 are equations in making corrections in the left half of the lower jaw:

$$Ax\ min = Bx\ min,\ and$$

$$Ay\ min = By\ min - (By\ max - By\ min). \qquad \text{Eq. 3}$$

$$Ax\ max = Bx\ max,\ and$$

$$Ay\ max = By\ min. \qquad \text{Eq. 4}$$

In making corrections in the upper jaw, Ay min=By max, and Ay max=By max+(By max–By min).

The processing proceeds to step S5003. In step S5003, the CPU 301 adds the dental formula number and position information calculated in step S5002 to the dental formula numbers and position information read into the RAM 303 in step S4701.

In step S5005, the CPU 301 calculates the dental formular number and position information of/about the tooth changed from absent to present by the user. The dental formula number to be calculated is that of the tooth changed from absence to present by the user.

Suppose that the coordinates of the tooth changed from absent to present by the user are A(Ax min, Ax max, Ay min, Ay max), and the coordinates of the tooth having a number one greater than that of the tooth changed from absent to present by the user are B(Bx min, Bx max, By min, By max). The upper left coordinates A(Ax min, Ay min) are given by Eq. 5. The lower right coordinates A(Ax max, Ay max) are given by Eq. 6. The following Eqs. 5 and 6 are equations in making corrections in the left half of the lower jaw:

$$Ax\ min = Bx\ min,\ and$$

$$Ay\ min = By\ max. \qquad \text{Eq. 5}$$

$$Ax\ max = Bx\ max,\ and$$

$$Ay\ max = By\ max + (By\ max - By\ min). \qquad \text{Eq. 6}$$

In making corrections in the upper jaw, Ay min=By min–(By max–By min), and Ay max=By min.

The processing proceeds to step S5006. In step S5006, the CPU 301 adds the dental formula number and position information calculated in step S5005 to the dental formula numbers and position information read into the RAM 303 in step S4701.

Figure 51:
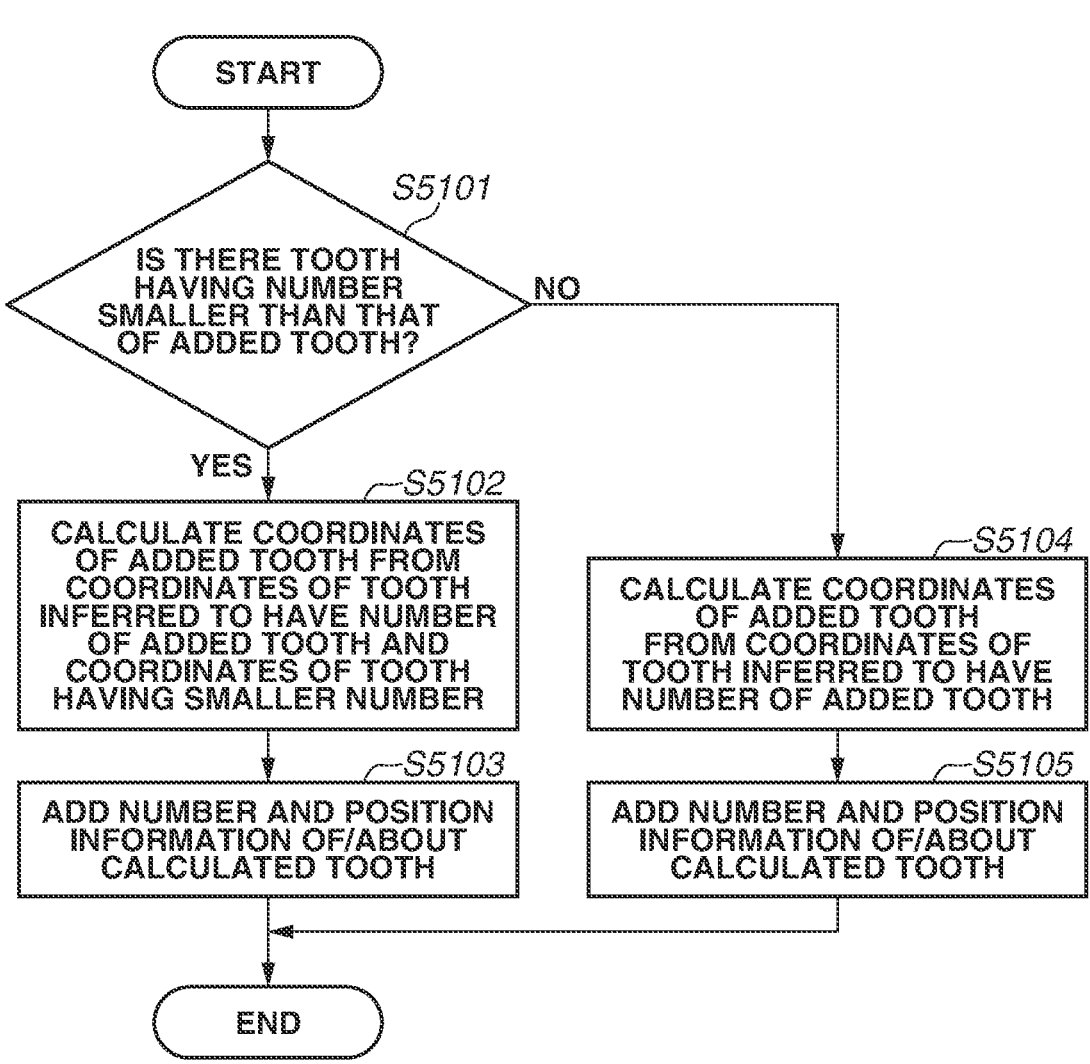
FIG. 51 is a flowchart of processing in a case where a tooth is added according to the seventh exemplary embodiment.

Next, the processing in the case where a tooth is added in step S4704 of FIG. 47 will be described with reference to the flowchart of FIG. 51.

In step S5101, if there is a tooth having a number smaller than that of the added tooth (YES in step S5101), the processing proceeds to step S5102. If not (NO in step S5101), the processing proceeds to step S5104.

In step S5102, the CPU 301 calculates the dental formula number and position information of/about the tooth added by the user. The dental formula number to be calculated is that of the tooth added by the user. Suppose that the coordinates of the tooth added by the user are A(Ax min, Ax max, Ay min, Ay max), the coordinates of the tooth having a number one smaller than that of the tooth added by the user are B(Bx min, Bx max, By min, By max), and the coordinates of the tooth inferred with the dental formula number of the tooth added by the user are C(Cx min, Cx max, Cy min, and Cy max). The upper left coordinates A(Ax min, Ay min) are given by Eq. 7. The lower right coordinates A(Ax max, Ay max) are given by Eq. 8. The following Eqs. 7 and 8 are equations in making corrections in the left half of the lower jaw:

$$Ax\ min=Bx\ min,\ and$$

$$Ay\ min=Cy\ max. \hspace{2cm} \text{Eq. 7}$$

$$Ax\ max=Cx\ max,\ and$$

$$Ay\ max=By\ min. \hspace{2cm} \text{Eq. 8}$$

In making corrections in the left half of the upper jaw, Cy max is replaced with By max, and By min with Cy min. In making corrections in the right half of the lower jaw, Bx min is replaced with Cx min, and Cx max with Bx max. In making corrections in the right half of the upper jaw, Bx min is replaced with Cx min, Cx max with Bx max, Cy max with By max, and By min with Cy max.

The processing proceeds to step S5103. In step S5103, the CPU 301 adds the dental formula number and position information calculated in step S5102 to the dental formula numbers and position information read into the RAM 303 in step S4701.

In step S5104, the CPU 301 calculates the dental formula number and position information of/about the tooth added by the user. The dental formula number to be calculated is that of the tooth added by the user. Suppose that the coordinates of the tooth added by the user are A(Ax min, Ax max, Ay min, Ay max), and the coordinates of the tooth inferred with the dental formula number of the tooth added by the user are B(Bx min, Bx max, By min, By max). The upper left coordinates A(Ax min, Ay min) are given by Eq. 9. The lower right coordinates A(Ax max, Ay max) are given by Eq. 10. The following Eqs. 9 and 10 are equations in making corrections in the left half of the lower jaw:

$$Ax\ min=Bx\ min,\ and$$

$$Ay\ min=By\ max. \hspace{2cm} \text{Eq. 9}$$

$$Ax\ max=Bx\ max,\ and$$

$$Ay\ max=By\ max+(By\ max-By\ min). \hspace{1cm} \text{Eq. 10}$$

In making corrections in the upper jaw, Ay min=By min−(By max−By min), and Ay max=By min.

The processing proceeds to step S5105. In step S5105, the CPU 301 adds the dental formula number and position information calculated in step S5104 to the dental formular numbers and position information read into the RAM 303 in step S4701.

As described above, in the present exemplary embodiment, the model-based inference results are corrected using inference results based on a different point of view or model and a knowledge-based determination model. As a result, dental formula numbers and states can be appropriately corrected even if correct dental formula numbers or states are unable to be inferred from a single image. In addition, after a tooth position is corrected by the dentist, the dental formula numbers and states of the teeth are automatically associated with each other. Consistent results can thus be obtained without the dentist correcting all the inference results.

OTHER EMBODIMENTS

An exemplary embodiment of the present invention can be implemented by processing for supplying a program for implementing one or more functions of the foregoing exemplary embodiments to a system or an apparatus via a network or a storage medium, and executing the program by one or more processors of a computer of the system or apparatus. A circuit for implementing one or more functions (for example, application specific integrated circuit [ASIC]) can also be used for implementation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, the state of a mouth cavity difficult to determine from an X-ray photograph can be easily determined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
at least one memory storing a program;
at least one processor that, upon execution of the stored programs, is caused to
read a first image, captured by an imaging apparatus that reads a visible light image of an occlusal surface in a mouth cavity;
read a second image, captured by the image apparatus that reads a visible light image in a state where teeth are occluded;
associate an imaging plane information with each of the first image and second image;
determine, based on inference processing performed using one or more trained models, dentition and health states of the respective teeth based on the imaging plane associated with the first image, the imaging plane associated with the second image wherein the one or more trained models are tooth specific and have been trained to classify a health state of a particular tooth present in the first image and second image based on the imaging plane information associated therewith, wherein a model used in determining the dentition is different from a model used in determining the health state of the particular tooth; and
output a result of a determination by generating a graphical user interface (GUI) displaying the dentition and result of the inference processing on each tooth displayed in the GUI, wherein each tooth displayed in the GUI includes a dental formula number and inferred health state.

2. The image processing apparatus according to claim 1, execution of the stored program further configures the one or more processors to perform correction processing to correct a determination result of the dentition.

3. The image processing apparatus according to claim 2, wherein the correction processing performed includes changing order of the teeth based on the determination result of the dentition.

4. The image processing apparatus according to claim 2, wherein the correction processing performed includes determining a median of the dentition based on the determination result of the dentition.

5. The image processing apparatus according to claim 2, wherein the correction processing includes correcting a determination result of the dentition in the first image with a determination result of the dentition in the second image.

6. The image processing apparatus according to claim 1, wherein the inference regarding states of the teeth are determined based on whether the result of a determination is one with respect to the first image or one with respect to the second image.

7. The image processing apparatus according to claim 1, wherein in a case where a correction is made to the result of the determination by a user operation, the trained model is updated based on content of the correction.

8. A method for controlling an image processing apparatus, the method comprising:
reading a first image, captured by an imaging apparatus that reads a visible light image of an occlusal surface in a mouth cavity;
reading a second image, captured by the imaging apparatus that reads a visible light image in a state where teeth are occluded;
associating imaging plane information with each of the first image and the second image;
determining, based on inference processing performed using one or more trained models, dentition and health states of the respective teeth based on the imaging plane associated with the first image, the imaging plane associated with the second image, wherein the one or more trained models are tooth specific and have been trained to classify a health state of a particular tooth present in the first image and second image based on the imaging plane information associated therewith, wherein a model used in determining the dentition is different from a model used in determining the health state of the particular tooth; and
outputting a result of the determination by generating a graphical user interface (GUI) displaying the dentition and result of the inference processing on each tooth displayed in the GUI, wherein each tooth displayed in the GUI includes a dental formula number and inferred health state.

9. A non-transitory computer-readable storage medium which stores a program for causing a computer to execute a method, the method comprising:
reading a first image, captured by an imaging apparatus that reads a visible light image of an occlusal surface in a mouth cavity;
reading a second image, captured by the imaging apparatus that reads a visible light image in a state where teeth are occluded;
associating imaging plane information with each of the first image and the second image;
determining, based on inference processing performed using one or more trained models, dentition and health states of the respective teeth based on the imaging plane associated with the first image, the imaging plane associated with the second image, wherein the one or more trained models are tooth specific and have been trained to classify a health state of a particular tooth present in the first image and second image based on the imaging plane information associated therewith, wherein a model used in determining the dentition is different from a model used in determining the health state of the particular tooth; and
outputting a result of the determination by generating a graphical user interface (GUI) displaying the dentition and result of the inference processing on each tooth displayed in the GUI, wherein each tooth displayed in the GUI includes a dental formula number and inferred health state.

* * * * *